US007949232B2

(12) United States Patent
Toyoda et al.

(10) Patent No.: US 7,949,232 B2
(45) Date of Patent: May 24, 2011

(54) APPARATUS, METHOD AND CONTROL SYSTEM FOR INPUTTING A REPRODUCTION SPEED OF A VIDEO SIGNAL

(75) Inventors: Masaharu Toyoda, Kanagawa (JP); Osamu Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1394 days.

(21) Appl. No.: 11/400,238

(22) Filed: Apr. 10, 2006

(65) Prior Publication Data

US 2007/0077024 A1 Apr. 5, 2007

(30) Foreign Application Priority Data

Apr. 15, 2005 (JP) ................................ 2005-118957

(51) Int. Cl.
*G09G 5/00* (2006.01)
(52) U.S. Cl. ...................................... 386/343; 345/173
(58) Field of Classification Search .................. 386/46, 386/83, 52, 68, 69, 343; 345/156, 173, 684; 715/719, 726, 723, 720
See application file for complete search history.

(56) References Cited

U.S. PATENT DOCUMENTS

| | | | | |
|---|---|---|---|---|
| 4,719,524 A | * | 1/1988 | Morishima et al. | 360/73.05 |
| 5,202,961 A | * | 4/1993 | Mills et al. | 715/720 |
| 5,832,173 A | * | 11/1998 | Terasawa et al. | 386/69 |
| 6,115,037 A | * | 9/2000 | Sumiyoshi et al. | 715/726 |
| 6,271,829 B1 | * | 8/2001 | Ricotta et al. | 345/156 |
| 6,608,965 B1 | | 8/2003 | Tobimatsu et al. | |
| 6,690,387 B2 | * | 2/2004 | Zimmerman et al. | 345/684 |
| 7,046,230 B2 | * | 5/2006 | Zadesky et al. | 345/156 |
| 7,355,620 B2 | * | 4/2008 | Ikehata et al. | 348/14.03 |

FOREIGN PATENT DOCUMENTS

| | | |
|---|---|---|
| JP | 61-40735 | 3/1986 |
| JP | 61-89717 | 5/1986 |
| JP | 63-254506 | 10/1988 |
| JP | 3-103912 | 4/1991 |
| JP | 6-67796 | 3/1994 |
| JP | 9-198223 | 7/1997 |
| JP | 11-32304 | 2/1999 |
| JP | 2000-122779 | 4/2000 |
| JP | 2002-083456 * | 3/2002 |
| JP | 2002-83456 | 3/2002 |
| WO | WO98/27554 A1 | 6/1998 |

OTHER PUBLICATIONS

Machine generated translation of JP 2002-083456 to Yamazaki which was published on Mar. 2002.*
U.S. Appl. No. 11/400,209, filed Apr. 10, 2006, Toyoda, et al.

* cited by examiner

*Primary Examiner* — David E Harvey
(74) *Attorney, Agent, or Firm* — Oblon, Spivak, McClelland, Maier & Neustadt, L.L.P.

(57) ABSTRACT

An input apparatus that inputs a reproduction speed of a video signal is disclosed. The input apparatus has a position detection section and a control section. The position detection section linearly detects a position that a user's finger has touched. The control section detects a moving speed of the user's finger that has touched the position detection section corresponding to a first position and a second position detected by the position detection section and outputs reproduction speed information corresponding to the moving speed. After the first position has been detected and a predetermined time period has elapsed, the second position is detected by the position detection section.

15 Claims, 37 Drawing Sheets

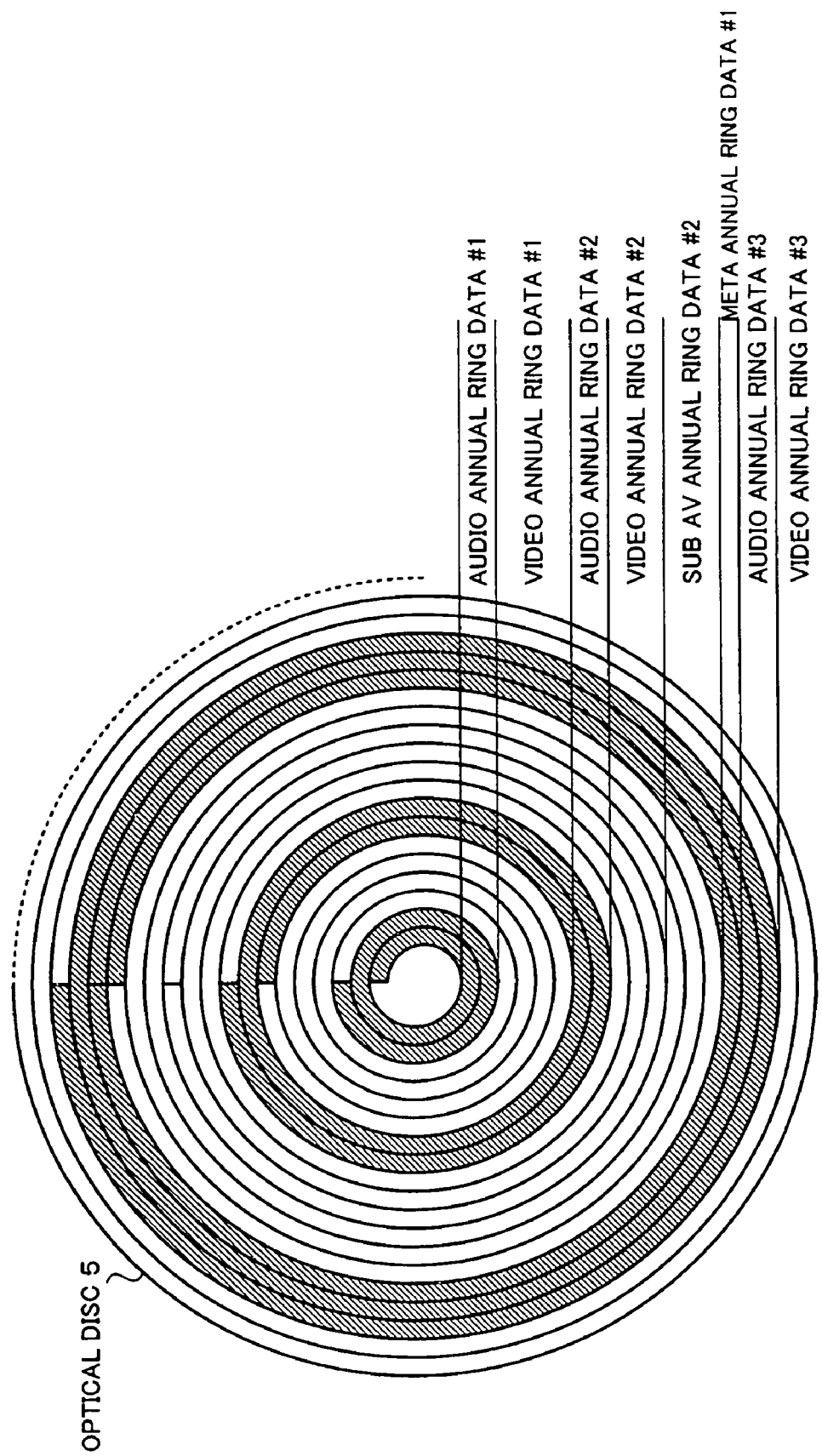

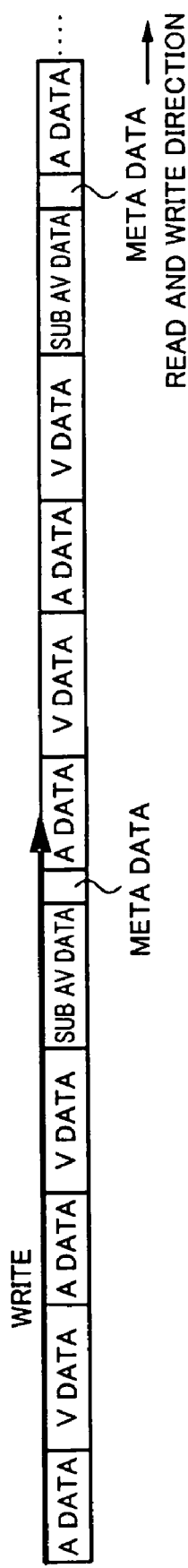
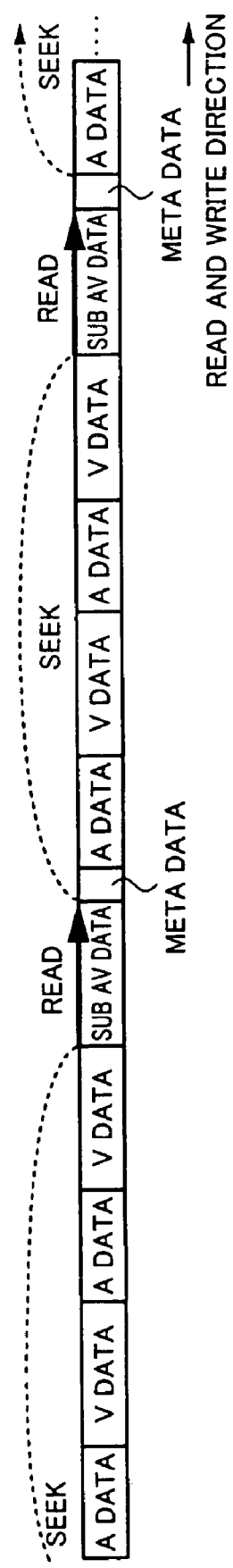

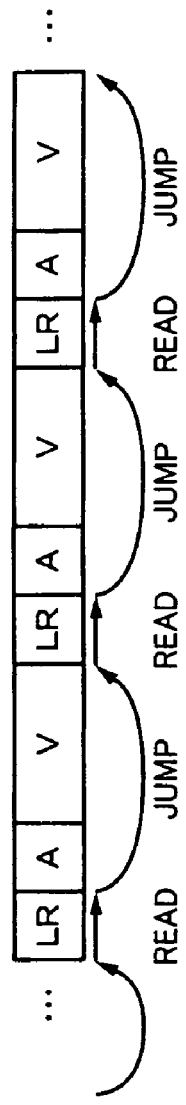
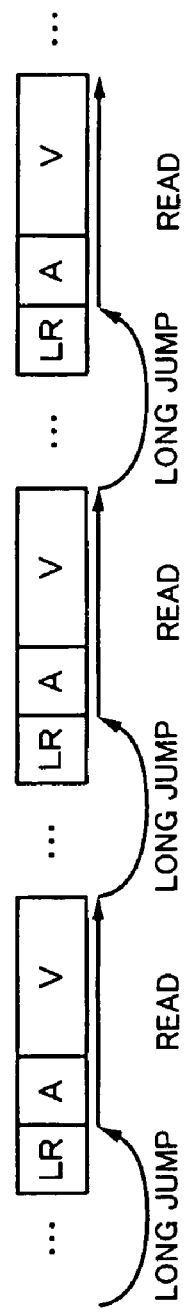
Fig. 3A
Fig. 3B
Fig. 3C

Fig. 15

| No. | KEY | ON | | OFF | |
|---|---|---|---|---|---|
| 1 | F1 | A | 0x41 | a | 0x61 |
| 2 | F2 | B | 0x42 | b | 0x62 |
| 3 | F3 | C | 0x43 | c | 0x63 |
| 4 | F4 | D | 0x44 | d | 0x64 |
| 5 | F5 | E | 0x45 | e | 0x65 |
| 6 | PAGE | F | 0x46 | f | 0x66 |
| 7 | DISPLAY | G | 0x47 | g | 0x67 |
| 8 | MENU | H | 0x48 | h | 0x68 |
| 9 | CLIP | I | 0x49 | i | 0x69 |
| 10 | THUMBNAIL | J | 0x4a | j | 0x5a |
| 11 | SET | K | 0x4b | k | 0x5b |
| 12 | RESET | L | 0x4c | l | 0x5c |
| 13 | PREV | M | 0x4d | m | 0x5d |
| 14 | PLAY | N | 0x4e | n | 0x5e |
| 15 | NEXT | O | 0x4f | o | 0x5f |
| 16 | STOP | P | 0x50 | p | 0x60 |
| 17 | REC | Q | 0x51 | q | 0x61 |
| 18 | JOG | R | 0x52 | r | 0x62 |
| 19 | SLOW | S | 0x53 | s | 0x63 |
| 20 | SHUTTLE | T | 0x54 | t | 0x64 |
| 21 | ↑ | U | 0x55 | u | 0x65 |
| 22 | ← | V | 0x56 | v | 0x66 |
| 23 | → | W | 0x57 | w | 0x67 |
| 24 | ↓ | X | 0x58 | x | 0x68 |

Fig. 17

| POSITION INFORMATION | RANGE OF DATA VALUES | | |
|---|---|---|---|
| | From | To | Step |
| -10 | 0 | 10 | 11 |
| -9 | 11 | 21 | 11 |
| -8 | 22 | 32 | 11 |
| -7 | 33 | 43 | 11 |
| -6 | 44 | 54 | 11 |
| -5 | 55 | 65 | 11 |
| -4 | 66 | 76 | 11 |
| -3 | 77 | 87 | 11 |
| -2 | 88 | 98 | 11 |
| -1 | 99 | 114 | 16 |
| STILL | 115 | 140 | 26 |
| +1 | 141 | 156 | 16 |
| +2 | 157 | 167 | 11 |
| +3 | 168 | 178 | 11 |
| +4 | 179 | 189 | 11 |
| +5 | 190 | 200 | 11 |
| +6 | 201 | 211 | 11 |
| +7 | 212 | 222 | 11 |
| +8 | 223 | 233 | 11 |
| +9 | 234 | 244 | 11 |
| +10 | 245 | 255 | 11 |

Fig. 18A

JOG MODE

| POSITION INFORMATION | -10 | -9 | -8 | -7 | -6 | -5 | -4 | -3 | -2 | -1 | STILL | +1 | +2 | +3 | +4 | +5 | +6 | +7 | +8 | +9 | +10 |
|---|---|---|---|---|---|---|---|---|---|---|---|---|---|---|---|---|---|---|---|---|---|
| REPRODUCTION SPEED | -1.0 | -1.0 | -0.75 | -0.5 | -0.33 | -0.25 | -0.18 | -0.12 | -0.06 | -0.03 | STILL | +0.03 | +0.06 | +0.12 | +0.18 | +0.25 | +0.33 | +0.5 | +0.75 | +1.0 | +1.0 |

Fig. 18B

SHUTTLE MODE

| POSITION INFORMATION | -10 | -9 | -8 | -7 | -6 | -5 | -4 | -3 | -2 | -1 | STILL | +1 | +2 | +3 | +4 | +5 | +6 | +7 | +8 | +9 | +10 |
|---|---|---|---|---|---|---|---|---|---|---|---|---|---|---|---|---|---|---|---|---|---|
| REPRODUCTION SPEED | -20.0 | -10.0 | -5.0 | -2.0 | -1.0 | -0.5 | -0.25 | -0.12 | -0.06 | -0.03 | STILL | +0.03 | +0.06 | +0.12 | +0.25 | +0.5 | +1.0 | +2.0 | +5.0 | +10.0 | +20.0 |

Fig. 18C

SLOW MODE

| POSITION INFORMATION | -10 | -9 | -8 | -7 | -6 | -5 | -4 | -3 | -2 | -1 | STILL | +1 | +2 | +3 | +4 | +5 | +6 | +7 | +8 | +9 | +10 |
|---|---|---|---|---|---|---|---|---|---|---|---|---|---|---|---|---|---|---|---|---|---|
| REPRODUCTION SPEED | STILL | STILL | STILL | STILL | STILL | STILL | STILL | STILL | STILL | STILL | STILL | +0.03 | +0.06 | +0.12 | +0.18 | +0.25 | +0.33 | +0.5 | +0.75 | +1.0 | +1.0 |

Fig. 31A
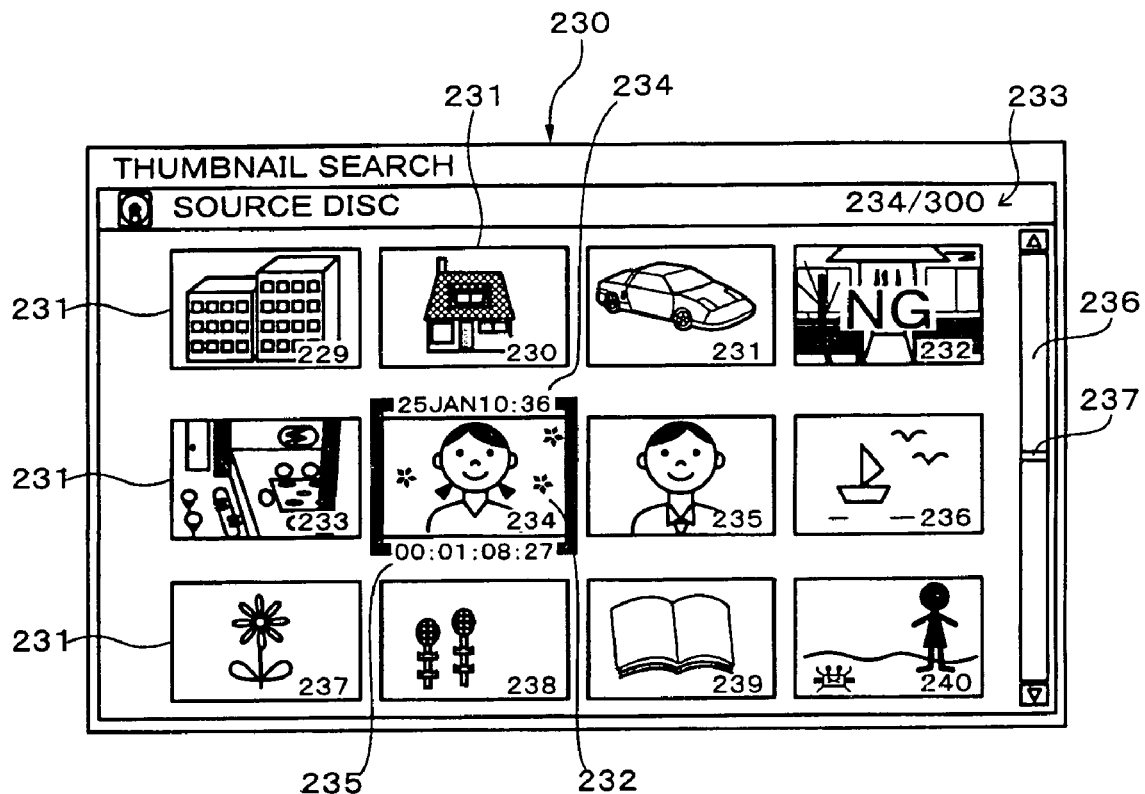
Fig. 31B
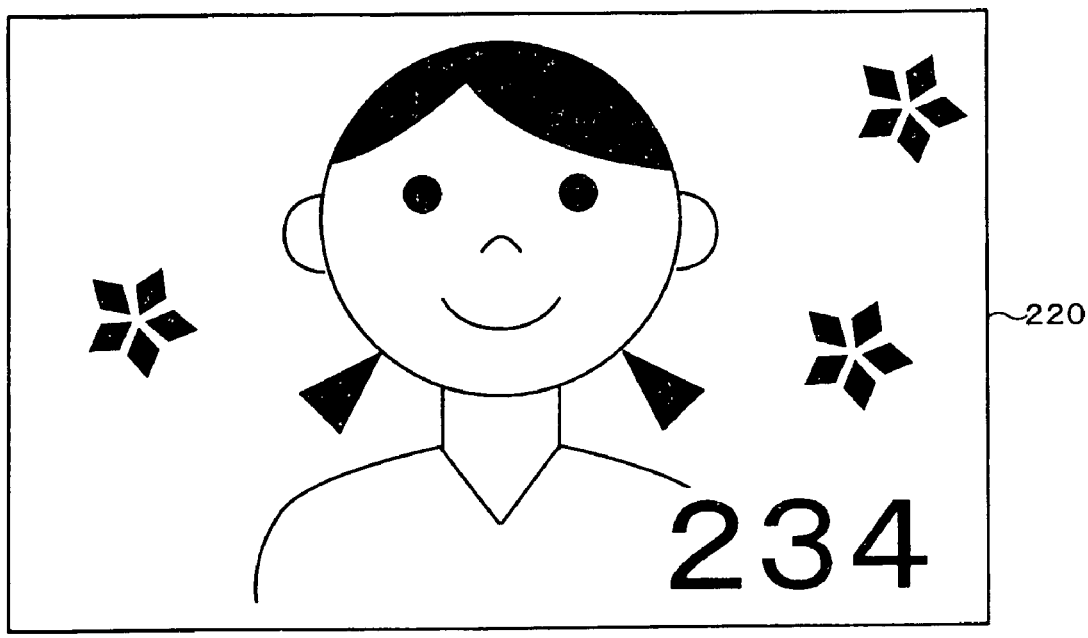

Fig. 32

| POSITION INFORMATION | -10 | -9 | -8 | -7 | -6 | -5 | -4 | -3 | -2 | -1 | STILL | +1 | +2 | +3 | +4 | +5 | +6 | +7 | +8 | +9 | +10 |
|---|---|---|---|---|---|---|---|---|---|---|---|---|---|---|---|---|---|---|---|---|---|
| NUMBER OF JUMPED THUMBNAIL PICTURES | END | -24 | -24 | -24 | -12 | -12 | -12 | -1 | -1 | -1 | PICTURE | +1 | +1 | +1 | +12 | +12 | +12 | +24 | +24 | +24 | TOP |

Fig. 33

| POSITION INFORMATION | RANGE OF DATA VALUES | | | NUMBER OF JUMPED THUMBNAIL PICTURES |
|---|---|---|---|---|
| | FROM | TO | STEP | |
| −5 | 0 | 7 | 8 | END |
| −4 | 8 | 17 | 10 | −36 |
| −3 | 18 | 37 | 20 | −24 |
| −2 | 38 | 67 | 30 | −12 |
| −1 | 68 | 107 | 40 | −1 |
| STILL | 108 | 147 | 40 | PICTURE |
| +1 | 148 | 187 | 40 | +1 |
| +2 | 188 | 217 | 30 | +12 |
| +3 | 218 | 237 | 20 | +24 |
| +4 | 238 | 247 | 10 | +36 |
| +5 | 248 | 255 | 8 | TOP |

1″

APPARATUS, METHOD AND CONTROL SYSTEM FOR INPUTTING A REPRODUCTION SPEED OF A VIDEO SIGNAL

CROSS REFERENCES TO RELATED APPLICATIONS

The present invention contains subject matter related to Japanese Patent Application No. 2005-118957 filed in the Japanese Patent Office on Apr. 15, 2005, the entire contents of which being incorporated herein by reference.

BACKGROUND OF THE INVENTION

1. Field of the Invention

The present invention relates to an input apparatus, an input method, an input control program, a reproduction apparatus, a reproduction control method, and a reproduction control program that allow a reproduction control to be quickly and accurately performed with a sensuous operation.

2. Description of the Related Art

In a video device used for a broadcasting station and a video soft production company, since editing operations need to be frequently changed while a reproduction screen is being checked, operation switches and dials need to be rotationally disposed on an operation panel and they need to be able to be sensuously operated. Thus, the video device needs to allow the operation switches and dials to be accurately operated to perform a reproduction control without need to watch them.

In a reproduction operation, reproduction speeds and reproduction directions are frequently controlled such as high speed reproduction, low speed reproduction, and frame-by-frame reproduction in the forward and reverse directions. While watching pictures that are reproduced, the user performs the reproduction control to search for pictures and designate edit points such as IN points and OUT points.

In the past, the reproduction speed and the reproduction direction were controlled by a dial operation. For example, a rotary encoder that outputs a value corresponding to a rotation angle was disposed on an operation panel. The reproduction direction and the reproduction speed were controlled corresponding to the rotation of the rotary encoder. Hereinafter, the rotary encoder that controls the reproduction speed and the reproduction direction is referred to as a jog dial. Of course, the jog dial can perform other controls using a rotation besides the reproduction speed and the reproduction direction.

The reproduction control using the jog dial can be categorized as a first mode in which the reproduction speed and the reproduction direction are varied corresponding to the rotation angle when the user releases his or her hand from the dial, the currently displayed frame is paused and a second mode in which the reproduction is continued at the speed and the direction corresponding to the rotation angle of the dial that is stopped. In the following description, the first mode is referred to as the jog mode. The second mode is referred to as the shuttle mode. The jog mode and the shuttle mode are alternately selected by operating an operation switch that is disposed separately. For example, International Publication No. WO98/27554 discloses an editing device that edits video data using the jog dial.

SUMMARY OF THE INVENTION

However, in recent years, random accessible type record mediums such as an optical disc, a hard disk, and a semiconductor memory instead of serial access type record mediums have been widely used to record and reproduce AV (Audio/Video) data. As an example of a random accessible type record medium, a single-side, one-layer optical disc that uses a blue-purple laser having a wavelength of 405 nm as a light source and that has a record capacity of 23 GB (gigabytes) has been accomplished. When such a random accessible type record medium is used to record and reproduce AV data, the reproduction direction and reproduction speed can be changed very quickly.

On the other hand, in the reproduction control using the jog dial of the related art, when the reproduction control is performed by intermittently varying a value, the response is slow. Thus, when a random accessible record medium is used, the foregoing characteristic of the record medium cannot be sufficiently fulfilled.

When data are reproduced at a reproduction speed B different from a current reproduction speed A with the jog dial of the related art, the jog dial needs to be rotated from the rotation angle corresponding to the current reproduction speed A to the rotation angle corresponding to the target reproduction speed B and the reproduction speed needs to be continuously varied from the reproduction speed A to the reproduction speed B.

Likewise, when the reproduction direction is reversed, the jog dial needs to be rotated from a rotation position corresponding to the current reproduction direction and speed to a rotation angle corresponding to a target reproduction speed in the reverse direction through a rotation angle at which the reproduction speed is 0. As a result, the reproduction speed needs to be continuously varied from the current speed in the current reproduction direction to the target reproduction speed in the reverse reproduction direction through a point of which the reproduction speed is 0.

Although the jog dial can be continuously varied, when the current rotation angle is changed to another rotation angle, the jog dial needs to pass through their intermediate point. Thus, the response of the jog dial delays.

In addition, in the reproduction control using the jog dial of the related art, since the reproduction speed varies corresponding to the rotation angle, it is difficult to intuitionally correlate the variation of the reproduction speed with the operation of the jog dial.

The operation that rotates the jog dial and keeps the rotation angle needs the user to twist his or her wrist and finger and keep the twisted state. It is thought that this operation is unnatural for human's hand. Thus, there is a risk of which the jog dial causes the user to perform an uneasy operation.

In view of the foregoing, it would be desirable to provide an input apparatus, an input method, an input control program, a reproduction apparatus, a reproduction control method, and a reproduction control program that allow a response to intermittent variation of a value to be high and an intuitional operation to be performed in reproduction control without causing the user to perform an uneasy operation.

According to an embodiment of the present invention, there is provided an input apparatus that inputs a reproduction speed of a video signal. The input apparatus has a position detection section and a control section. The position detection section linearly detects a position that a user's finger has touched. The control section detects a moving speed of the user's finger that has touched the position detection section corresponding to a first position and a second position detected by the position detection section and outputs reproduction speed information corresponding to the moving speed. After the first position has been detected and a predetermined time period has elapsed, the second position is detected by the position detection section.

According to an embodiment of the present invention, there is provided an input method of inputting a reproduction speed of a video signal. A position that a user's finger has touched is linearly detected. Reproduction speed information is output corresponding to the detected moving speed.

According to an embodiment of the present invention, there is provided an input control program that causes a computer device to execute an input method of inputting a reproduction speed of a video signal. A position that a user's finger has touched is linearly detected. Reproduction speed information is output corresponding to the detected moving speed.

According to an embodiment of the present invention, since the moving speed at which the user's finger has been linearly moved on the position detection section is detected. Reproduction speed information corresponding to the detected moving speed is output. As a result, the user can feel as if he or she manually moved a film or a magnetic tape and operated the reproduction speed. Thus, the user can more intuitively perform a reproduction control.

According to an embodiment of the present invention, there is provided a reproduction apparatus. The reproduction apparatus has a reproduction section, a position detection section, a control section, and a reproduction control section. The reproduction section reproduces at least a video signal recorded on a record medium. The position detection section linearly detects a position that a user's finger has touched. The control section detects a moving speed of the user's finger that has touched the position detection section corresponding to a first position and a second position detected by the position detection section and outputs reproduction speed information corresponding to the moving speed. After the first position has been detected by the position detection section and a predetermined time period has elapsed, the second position is detected by the position detection section. The reproduction control section controls a reproduction speed of the video signal reproduced by the reproduction section corresponding to the reproduction speed information that is output from the control section.

According to an embodiment of the present invention, there is provided a reproduction control method. A moving speed of a position that a user's finger has touched is linearly detected. Reproduction speed information is output corresponding to the detected moving speed. A reproduction speed of at least a video signal recorded on a record medium is controlled corresponding to the output reproduction speed information.

According to an embodiment of the present invention, there is provided a reproduction control program that causes a computer device to execute a reproduction control method. A moving speed of a position that a user's finger has touched is linearly detected. Reproduction speed information is output corresponding to the detected moving speed. A reproduction speed of at least a video signal recorded on a record medium is controlled corresponding to the output reproduction speed information.

According to an embodiment of the present invention, since the moving speed at which the user's finger has been linearly moved on the position detection section is detected. The reproduction speed of at least a video signal recorded on the record medium is controlled corresponding to reproduction speed information that denotes the detected moving speed. As a result, the user can feel as if he or she manually moved a film or a magnetic tape and operated the reproduction speed. Thus, the user can more intuitively perform a reproduction control.

According to an embodiment of the present invention, there is provided an input apparatus that inputs an output speed of data corresponding to time information thereof. The input apparatus has a position detection section and a control section. The position detection section linearly detects a position that a user's finger has touched. The control section detects a moving speed of the user's finger that has touched the position detection section corresponding to a first position and a second position detected by the position detection section and outputs speed information corresponding to the moving speed and the time information. After the first position has been detected by the position detection section and a predetermined time period has elapsed, the second position is detected by the position detection section.

According to an embodiment of the present invention, there is provided an input method of inputting an output speed of data corresponding to time information thereof. A position that a user's finger has touched is linearly detected. Speed information that denotes the time information is output corresponding to the detected moving speed and the time information.

According to an embodiment of the present invention, there is provided an input program that causes a computer device to execute an input method of inputting an output speed of data corresponding to time information thereof. A position that a user's finger has touched is linearly detected. Speed information that denotes the time information is output corresponding to the detected moving speed and the time information.

According to an embodiment of the present invention, since the moving speed at which the user's finger has been linearly moved on the position detection section is detected, speed information corresponding to time information that data have is output corresponding to the detected moving speed. As a result, the user can more intuitively control an output of real time meta data and an output speed of an animation of computer graphics.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which:

FIG. 1 is a schematic diagram showing an example of the state in which annual ring data are formed on an optical disc;

FIG. 2A and FIG. 2B are schematic diagrams showing an example of the state in which data are read and written from and to an optical disc on which annual ring data are formed;

FIG. 3A, FIG. 3B, and FIG. 3C are schematic diagrams describing that the continuity of annual rings needs to be assured;

FIG. 15 is a schematic diagram showing an example of a list of codes of which 24 key outputs are converted by a control module;

FIG. 17 is a schematic diagram showing an example of which position information and data values corresponding to the positions on the search bar are correlated;

FIG. 18A, FIG. 18B, and FIG. 18C are schematic diagrams showing an example of the relationship of the position on the search bar and the reproduction speed in each of a jog mode, a shuttle mode, and a slow mode;

FIG. 31A and FIG. 31B are schematic diagrams describing a thumbnail search screen;

FIG. 32 is a schematic diagram showing an example of the relationship of position information of the search bar and the number of jumped thumbnail pictures from a currently selected thumbnail picture to a newly selected thumbnail picture;

FIG. 33 is a schematic diagram showing another example of the relationship of position information of the search bar and the number of jumped thumbnail pictures from a currently selected thumbnail picture to a newly selected thumbnail picture;

DETAILED DESCRIPTION OF THE PREFERRED EMBODIMENTS

Figure 4A:
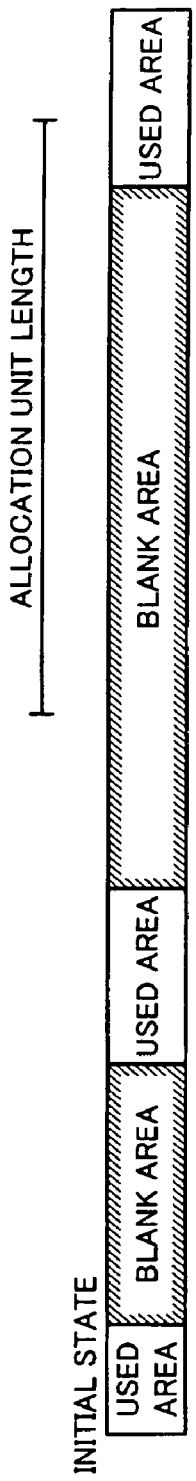
FIG. 4A, FIG. 4B, FIG. 4C, and FIG. 4D are schematic diagrams describing an allocation unit.
Figure 4B:
Figure 4C:
Figure 4D:

Next, embodiments of the present invention will be described in the following order.
1. Record and reproduction apparatus and system according to embodiment of present invention
1-1. Data
1-2. Disc format
1-3. Accessing disc
1-4. Data management structure
1-5. Structure of record and reproduction apparatus
2. Structure of front panel
2-1. Layout of front panel
2-2. Circuit structure of front panel
3. Search bar
3-1. Structure of search bar
3-2. Reproduction control using search bar
3-3. Indications of search bar
3-4. Switching of operation modes of search bar
4. Display screens of display section
4-1. Display screens
4-2. Switching operation of display screens
4-3. Structure of video process circuit
4-4. Switching operation of display modes
5. Thumbnail display
5-1. Example of thumbnail display and display method
5-2. Selection of thumbnail picture using search bar
6. Reproduction control using search bar by another method
6-1. Outline of reproduction control by another method
6-2. Example of more specific process of reproduction control by another method
7. Others
1. Record and Reproduction Apparatus and System According to Embodiment of Present Invention
1-1. Data For easy understanding, a record and reproduction apparatus and a system according to an embodiment of the present invention will be described. In this system, video data and audio data that are broadcast and edited are recorded on a disc shaped record medium. In addition, sub video data, sub audio data, and meta data corresponding to the main video data and main audio data are recorded on the same disc.

In the following description, video data and audio data that are actually broadcast and edited are referred to as main AV (Audio/Video) data. On the other hand, sub video data and sub audio data are referred to as sub AV data. Video data of sub AV data are referred to as sub video data. Audio data of sub AV data are referred to as sub audio data.

For example, video data of the main AV data are data of which base band video data have been compression-encoded according to the MPEG2 (Moving Picture Experts Group 2) system and that have a bit rate of 50 Mbps (Mega bits per second) and/or a bit rate of 25 Mbps. Audio data of the main AV data are data whose sampling frequency is 48 kHz and that have 24 quantizer bits and/or 16 quantizer bits. According to this embodiment of the present invention, video data and audio data of the main AV data that have different bit rates and different quantizer bits can be recorded on the same disc.

On the other hand, the sub AV data are audio/video data having low bit rates based on the main AV data. When the main AV data are recorded on the disc, the sub AV data are generated by the main AV data. The sub video data are compression-encoded according to for example the MPEG4 system. In contrast, the sub audio data are compression-encoded by for example A-Law or sample thin-out process. Thus, the bit rate of the sub AV data is decreased from the bit rate of the main AV data to for example several Mbps.

As well known, according to the MPEG system, video data are compression-encoded by an intra-frame compression encoding scheme using DCT (Discrete Cosine Transform) and an inter-frame compression-encoding scheme using a prediction encoding scheme in the time series direction. In this system, a B (Bidirectionally) picture and a P (Predictive) picture that are predictively encoded in the time series direction and an I (Intra) picture that is complete with one screen (one frame) are defined. A GOP (Group Of Picture) is a completed group containing at least one I picture. The GOP is the minimum accessible unit of an MPEG stream.

The meta data are high level data with respect to particular data. The meta data function as an index that represents contents of various types of data. The meta data can be categorized as time series meta data (sometimes may be referred to as real time meta data) that occur along the time series of the foregoing main AV data and non-time series meta data (sometimes may be referred to as non-real time meta data) that occur in a predetermined region such as each scene of the main AV data.

1-2. Disc Format

Next, a data allocation to a disc shaped record medium (hereinafter referred to as the disc) according to this embodiment of the present invention will be described. According to the embodiment of the present invention, data are recorded like annual rings formed on the disc. The annual ring data are data recorded on the disc in the unit of a data amount represented by a reproduction time period for data. With respect to the main audio data and main video data, audio data and video data corresponding to a reproduction time zone are alternately allocated and recorded in a predetermined reproduction time unit having a data size larger than one circular track. When the main audio data and main video data are recorded in such a manner, sets of main audio data and main video data corresponding to reproduction time zones are layered in time series and annual rings are formed.

According to the embodiment of the present invention, in addition to main audio data and main video data corresponding to reproduction time zones, sets of sub AV data corresponding thereto and time series meta data are recorded as annual rings on an optical disc 5.

Data that compose an annual ring are referred to as annual ring data. The annual ring data have a data amount that is an integer multiple of a sector which is the minimum record unit of the disc. The annual rings are recorded so that their boundaries match the boundaries of sectors of the disc.

FIG. 1 shows an example of the state in which annual ring data are formed on the optical disc 5. In the example shown in FIG. 1, audio annual ring data #1, video annual ring data #1, audio annual ring data #2, video annual ring data #2, and sub AV annual ring data #1, and time series meta annual ring data #1 are successively recorded from the innermost periphery of the optical disc 5. In this cycle, annual ring data are handled. On the outer periphery of the time series meta annual ring data #1, a part of the next cycle annual ring data is represented as audio annual ring data #3 and video annual ring data #3.

In the example shown in FIG. 1, the reproduction time zone for one annual ring of the time series meta annual ring data corresponds to the reproduction time zone for one annual ring of the sub AV annual ring data. The reproduction time zone for one annual ring of the time series meta annual ring data corresponds to the reproduction time zone for two annual rings of the audio annual ring data. Likewise, the reproduction time zone for one annual ring of the time series meta annual ring data corresponds to the reproduction time zone for two annual rings of the video annual ring data. The relationship of the reproduction time zones and cycles of various types of annual ring data is designated corresponding to for example their data rates and so forth. It is preferred that the reproduction time for one annual ring of the video annual ring data and audio annual ring data be in the range from 1.5 seconds to 2 seconds as an empirical value.

FIG. 2A and FIG. 2B show an example of which data are read and written from and to the optical disc 5 having annual rings as shown in FIG. 1. When the optical disc 5 has a large and successive blank and non-defect area, as exemplified in FIG. 2A, audio annual ring data, video annual ring data, sub AV annual ring data, and real time meta annual ring data generated from data series of audio data, video data, sub AV data, and real time meta data corresponding to a reproduction time zone are written to the blank area of the optical disc 5 as if they were written in a single stroke so that a boundary of each type of data matches a boundary of each sector of the optical disc 5. Data are read from the optical disc 5 in the same manner as they are written thereto.

On the other hand, when a particular data series is read from the optical disc 5, a record position of the data series is sought and the data are read therefrom. This operation is repeated. FIG. 2B shows a state of which an sub AV data series is selectively read. With reference to also FIG. 1, after the sub AV annual ring data #1 have been read, the real time meta annual ring data #1, the audio annual ring data 3, the video annual ring data #3, the audio annual ring data #4, and the video annual ring data #4 (not shown) are skipped and the sub AV annual data #2 of the next cycle are read.

In such a manner, data are recorded on the optical disc 5 in a unit of a reproduction period as cyclic annual ring data corresponding to a reproduction time zone. Thus, since audio annual ring data and video annual ring data of the same reproduction time zone are closely allocated on the optical disc 5, audio data and video data corresponding thereto can be quickly read and reproduced from the optical disc 5. In addition, since data are recorded so that a boundary of an annual ring matches a boundary of a sector, only audio data or video data can be read from the optical disc 5. As a result, only audio data or video data can be quickly edited.

In addition, as described above, each of the audio annual ring data, video annual ring data, sub AV annual ring data, and real time meta annual ring data has a data amount that is a multiple of a data amount of a sector of the optical disc 5. In addition, data are recorded so that a boundary of annual ring data matches a boundary of a sector. Thus, when only one of audio annual ring data, video annual ring data, sub AV annual ring data, and real time meta annual ring data is needed, it can be read without other types of data.

1-3. Accessing Disc

To conveniently use data allocation of annual rings, data need to be recorded on the optical disc 5 so that continuity of annual rings is assured. Next, with reference to FIG. 3A to FIG. 3B, this operation will be described. Now, it is assumed that only sub annual ring data (denoted by "LR" in FIG. 3A to FIG. 3C) are read.

When data are recorded, if a sufficient blank area has been allocated, a plurality of annual rings can be successively recorded. In this case, as shown in FIG. 3A, sub AV annual ring data that are chronologically successive can be read by the minimum number of track jumps. In other words, after the sub AV annual ring data are read, sub AV annual ring data of the next cycle can be read. As a result, the distance for which the pickup jumps becomes the shortest.

In contrast, when data are recorded, if a successive blank area has not been allocated, chronologically successive sub AV data are recorded in different areas of the optical disc 5. In this case, as exemplified in FIG. 3B, after first sub AV annual ring data are read, the pickup needs to jump a distance for a plurality of cycles of annual rings and read the next sub AV annual ring data. Since this operation is repeated, the read speed for the sub AV annual ring data decreases in comparison with the case shown in FIG. 3A. In addition, as exemplified in FIG. 3C, non-edited AV data (AV clip) may not be quickly reproduced.

To assure continuity of annual rings, according to this embodiment of the present invention, an allocation unit that has a plurality of annual rings is defined. When data are recorded to annual rings, a successive blank area that is larger than the allocation unit length is allocated.

Next, with reference to FIG. 4A to FIG. 4D, this operation will be specifically described. The allocation unit length is pre-set. The allocation unit length is set to a multiple of a total reproduction period of each type of data recorded in one annual ring. When the reproduction period of one annual ring is 2 seconds, the allocation unit length is set to 10 seconds. The allocation unit length is used as a ruler with which the length of a blank area of the optical disc 5 is measured (see an upper right portion of FIG. 4A). As shown in FIG. 4A, it is assumed that there are three used areas that are not successive on the optical disc 5 and that blank areas are sandwiched by used areas.

When AV data having a predetermined length and sub AV data corresponding to the AV data are recorded on the optical disc 5, the allocation unit length and the length of the blank area are compared. A blank area that has a length larger than the allocation unit length is allocated as a reserved area (see FIG. 4B). In the example shown in FIG. 4A, a right blank area of the two blank areas is larger than the allocation unit length and allocated as a reserved area. Annual ring data are successively and continuously recorded from the beginning of the reserved area (see FIG. 4C). In this manner, the annual ring data are recorded. When the length of the blank area of the reserved area is smaller than one annual ring of the annual ring data (see FIG. 4D), the reserved area is deallocated. As shown in FIG. 4A, the allocation unit length is applied to another blank area of the optical disc 5 to look for a reserved area.

Since a blank area for a plurality of annual rings is sought and the annual rings are recorded in the blank area, continuity of annual rings is assured to some extent. As a result, annual ring data can be smoothly reproduced. In the foregoing example, the allocation unit length is 10 seconds. However, the allocation unit length is not limited to 10 seconds. Instead, a length larger than this reproduction period can be set as the allocation unit length. Specifically, it is preferred that the allocation unit length be set in the range from 10 seconds to 30 seconds.

1-4. Data Management Structure

Figure 5:
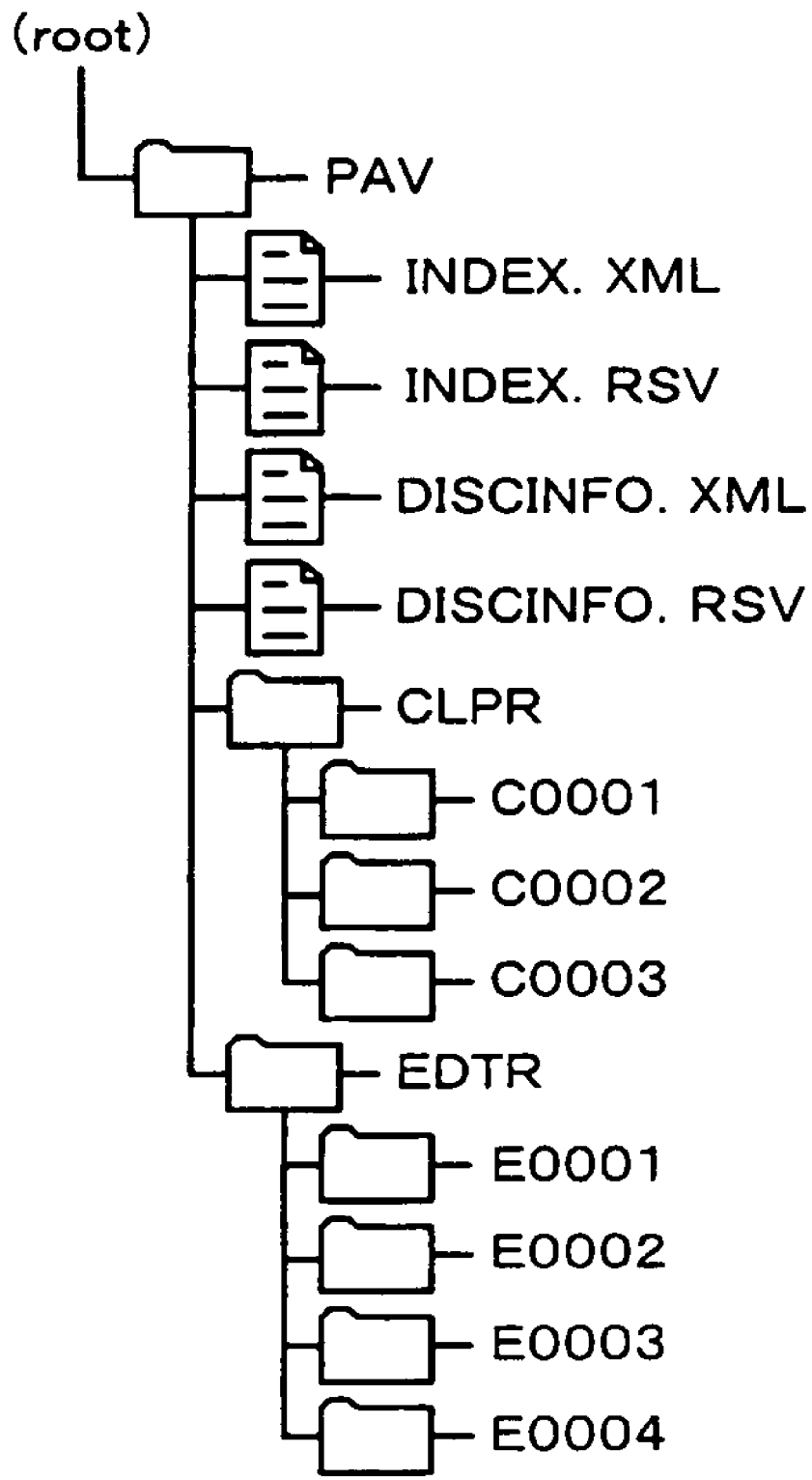
FIG. 5 is a schematic diagram describing a data management structure according to an embodiment of the present invention.

Next, with reference to FIG. 5, FIG. 6, and FIG. 7, a management structure of data according to an embodiment of the present invention will be described. According to this embodiment of the present invention, data are managed in a directory structure. As exemplified in FIG. 5, a directory PAV is disposed immediately under a root directory (root) by using for example UDF (Universal Disk Format) as a file system. According to this embodiment, directories under the directory PAV are defined as follows.

Audio data and video data of a plurality of types of signals coexistively recorded on one disc are defined under the directory PAV. Any data can be recorded in the directory PAV for which a data management according to this embodiment of the present invention is not performed.

Disposed immediately under the directory PAV are four files (INDEX.XML, INDEX.BUP, DISCINFO.XML, and DISCINFO.BUP) and two directories (CLPR and EDTR).

The directory CLPR manages clip data. A clip is a block of data generated after a photographing operation is started until it is stopped. For example, when a video camera is operated, one clip is a block of data generated after an operation start button thereof is pressed until an operation stop button thereof is pressed (the operation start button is released).

One block of data is composed of main audio data and video data, sub AV data generated from the audio data and video data, and real time meta data and non-real time meta data corresponding to the audio data and video data as described above. In each of directories "C0001," "C0002," and so forth disposed immediate under the directory CLPR, a block of data that composes a clip is stored.

Figure 6:
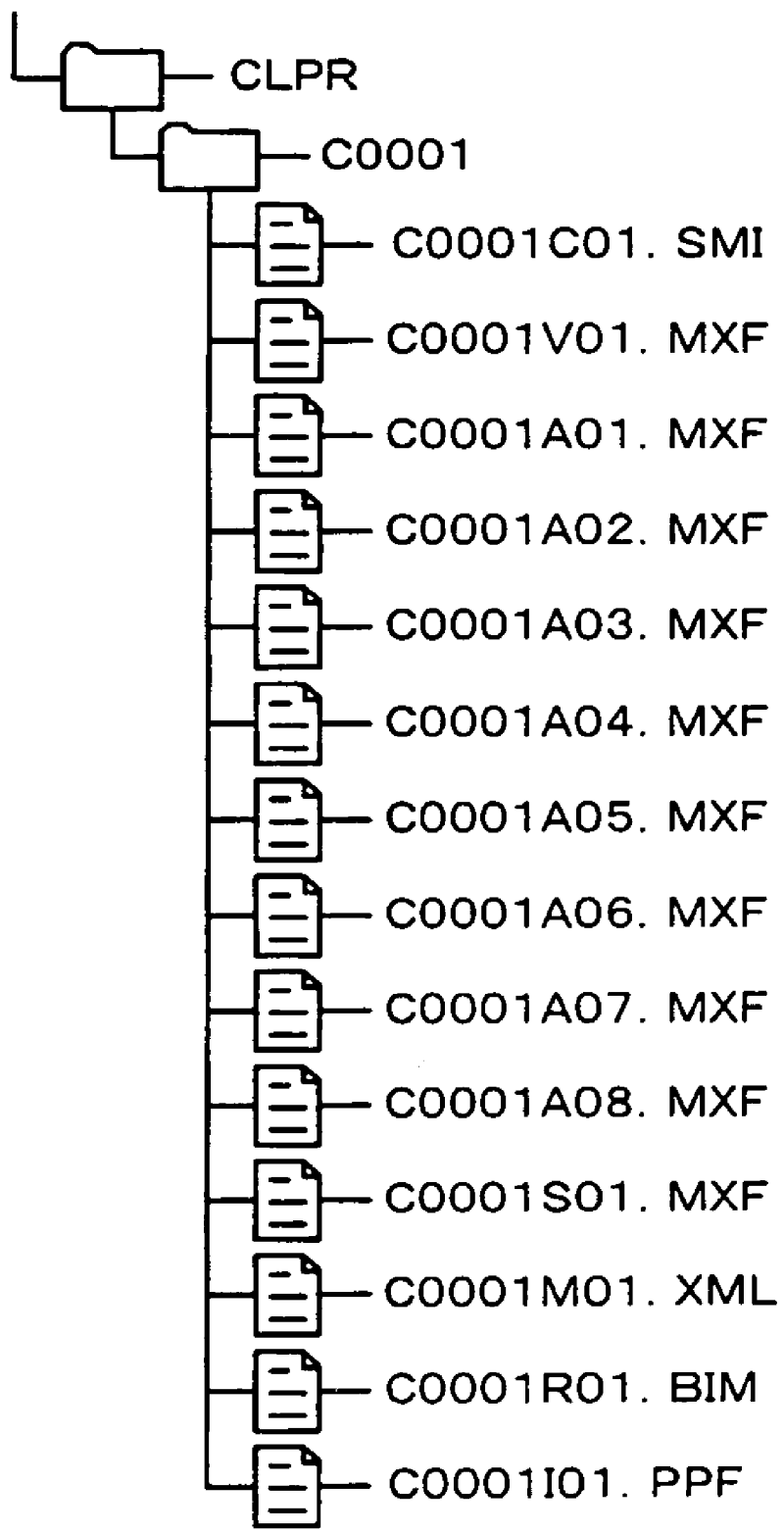
FIG. 6 is a schematic diagram describing a data management structure according to an embodiment of the present invention.

FIG. 6 shows an example of a structure of the directory "C0001" corresponding to one clip "C0001." Hereinafter, a directory corresponding to one clip immediately under the directory CLPR is referred to as a clip directory. In the clip directory "C0001," the foregoing types of data are identified by file names and stored. In the example shown in FIG. 6, a file name is composed of 12 digits. First five digits of eight digits followed by a delimiter "." are used to identify a clip. Three digits immediately followed by the delimiter are used to identify a type of data such as audio data, video data, or sub AV data. Three digits immediately preceded by the delimiter are an extension that represents a format of data.

Specifically, in the example shown in FIG. 6, as files as a block that composes the clip "C0001," a file "C0001C01.SMI" that represents clip information, a main video data file "C0001V01.MXF," main audio data files "C0001A01.MXF" to "C0001A08.MXF" of eight channels, a sub AV data file "C0001S01.MXF," a non-real time meta data file "C0001M01.MML," a real time meta data file "C0001R01.BIM," and a pointer information file "C0001I01.PPF" are stored in the clip directory "C0001."

According to this embodiment of the present invention, a plurality of types of data signals can coexistively stored in clip directories under the directory CLPR. For example, with respect to signals of main video data, a single GOP, 50 Mbps video data is stored in the clip directory "C0001," whereas long GOP, 25 Mbps video data is stored in the clip directory "C0002." On the other hand, in a clip directory, a plurality of types of data signals of each type of data cannot be coexistively stored. A file of which video data are recorded from the beginning to a particular point at 50 Mbps and from the particular point to the end at 25 Mbps cannot be stored in a clip directory.

With respect to single GOP data, each frame is composed of an I picture and a relationship of 1 GOP=1 frame is satisfied. Each frame can be edited in high quality. With respect to long GOP data, each frame is composed of an I picture, a P picture, and a B picture and one GOP is composed of a plurality of frames that end with an I picture. The long GOP data may have no B picture.

Returning to FIG. 5, the directory EDTR manages edit information. According to this embodiment of the present invention, an edit result is recorded as an edit list and a play list. Disposed immediately under the directory EDTR are directories "E0001," "E0002," and so forth each of which stores a block of data that composes an edit result.

An edit list is a list that describes edit points (IN point, OUT point, and so forth) of a clip, a reproduction order, and so forth. An edit list is composed of a non-destructive edit result of a clip and a play list that will be described later. When the non-destructive edit result of the edit list is reproduced, files stored in the clip directory are referenced corresponding to the list. Reproduced pictures are successively obtained from a plurality of clips as if one edited stream were reproduced. However, in the non-destructive edit result, files are referenced from the list regardless of locations of files on the optical disc 5. Thus, continuity of reproduced data is not assured.

When the edit result shows that it is difficult to successively reproduce files and parts thereof referenced by a play list, the files and parts thereof are reallocated to a predetermined area on the optical disc 5. As a result, continuity of data is assured when an edit list is reproduced.

When management information (for example, an index file "INDEX.XML" that will be described later) for files to be edited is referenced corresponding to a result of an edit list created by an edit operation, it is estimated whether files can be non-destructively reproduced corresponding to the edit operation, namely the files stored in clip directories can be successively reproduced corresponding to the edit result. When the result shows that the files can be successively reproduced, these files are copied to a predetermined area of the optical disc 5. The files reallocated to the predetermined area are referred to as bridge essence files. A list of which an edit result is affected to bridge essence files is referred to as a play list.

If an edit result complicatedly references clips, when one clip is changed to another clip, the pickup may not be able to seek the other clip in time. In this case, a play list is created. Bridge essence files are recorded to a predetermined area of the optical disc 5.

Figure 7:
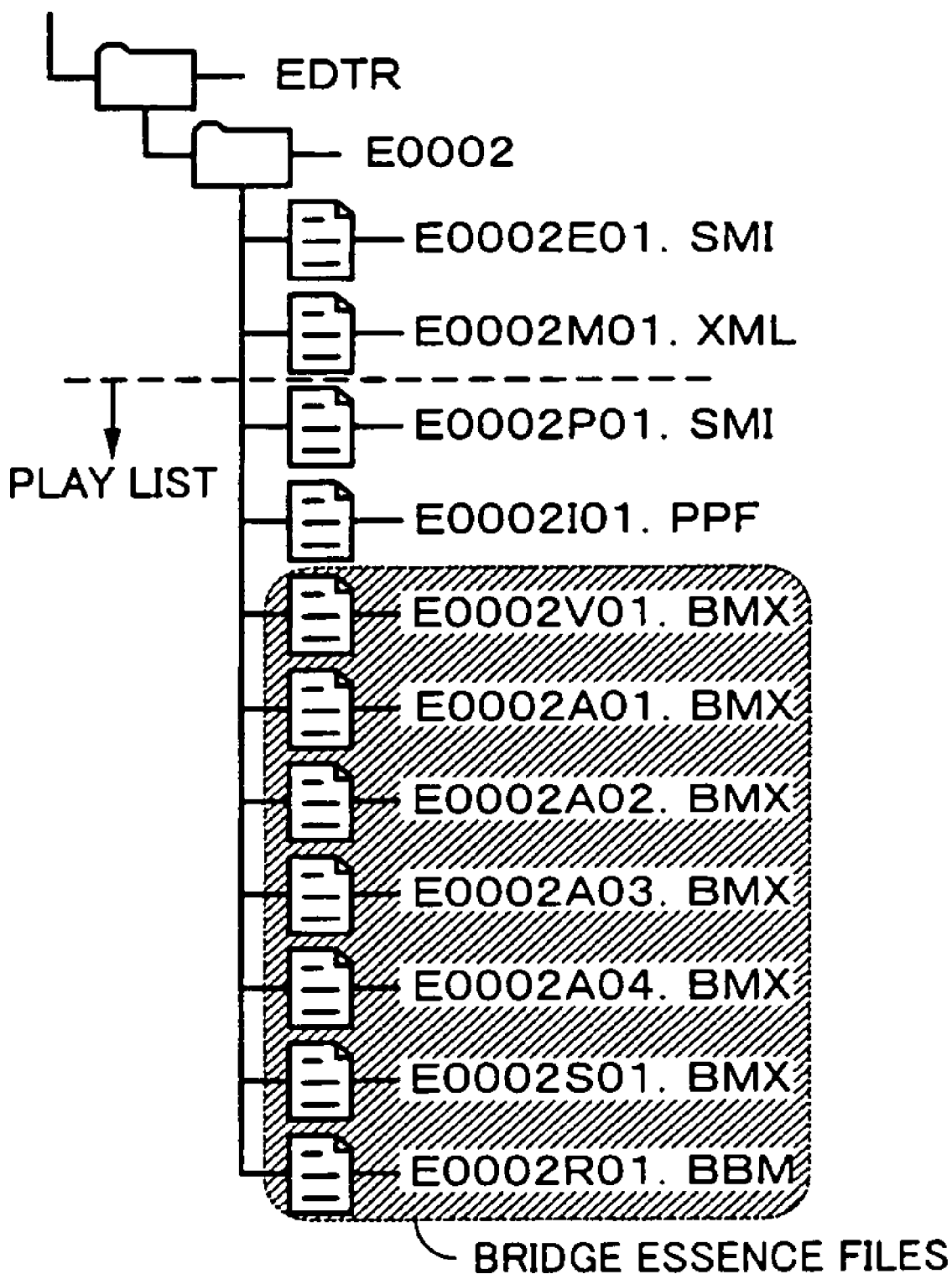
FIG. 7 is a schematic diagram describing a data management structure according to an embodiment of the present invention.

FIG. 7 shows an example of a structure of a directory "E0002" corresponding to one edit result "E0002" disposed immediately under the directory EDTR. A directory corresponding to one edit result immediately under the directory EDTR is referred to as an edit directory. Data generated as the edit result are identified by file names and stored in the edit directory "E0002." A file name is composed of 12 digits. First five digits of eight digits followed by a delimiter "." are used to identify an edit operation. The remaining three digits of the eight digits are used to identify a type of data. Three digits preceded by the delimiter are an extension that identifies a format of data.

More specifically, in the example shown in FIG. 7, as files that compose the edit result "E0002," an edit list file "E0002E01.SMI," a file "E0002M01.XML" that describes information of real time and non-real time meta data, a play list file "E0002P01.SMI," bridge essence files "E0002V01.BMX" and "E0002A01.BMX" to "E0002A04.MBX" of main data, a bridge essence file "E0002S01.BMX" of sub AV data, and a bridge essence file "E0002R01.BMX" of real time and non-real time meta data are stored in the edit directory "E0002."

Shaded files of files stored in the edit directory "E0002," namely the bridge essence files "E0002V01.BMX" and "E002A01.BMX" to "E0002A04.BMX," the bridge essence file "E0002S01.BMX" of sub AV data, and the bridge essence file "E0002R01.BMX" of real time and non-real time meta data are files that belong to the play list.

As described above, for example video data stored in a clip directory are referenced corresponding to an edit list. Since different types of data signals can be coexistently stored in different clip directories, different types of data signals can be coexistently contained in an edit list.

Returning to FIG. 5, the file "INDEX.XML" is an index file that manages material information stored in directories under the directory PAV. In this example, the file "INDEX.XML" is described in XML (Extensible Markup Language) format. The file "INDEX.XML" manages each of the foregoing clips and edit lists. The file "INDEX.XML" manages for example a conversion table for file names and UMIDs, duration information, a reproduction order of each material reproduced from the optical disc 5, and so forth. In addition, the file "INDEX.XML" manages video data, audio data, sub AV data, and so forth that belong to each clip. Moreover, the file "INDEX.XML" manages clip information for files in a clip directory.

The file "DISCINFO.XML" manages information about the disc. The file "DISCINFO.XML" also stores reproduction position information and so forth.

1-5. Structure of Record and Reproduction Apparatus

Figure 8:
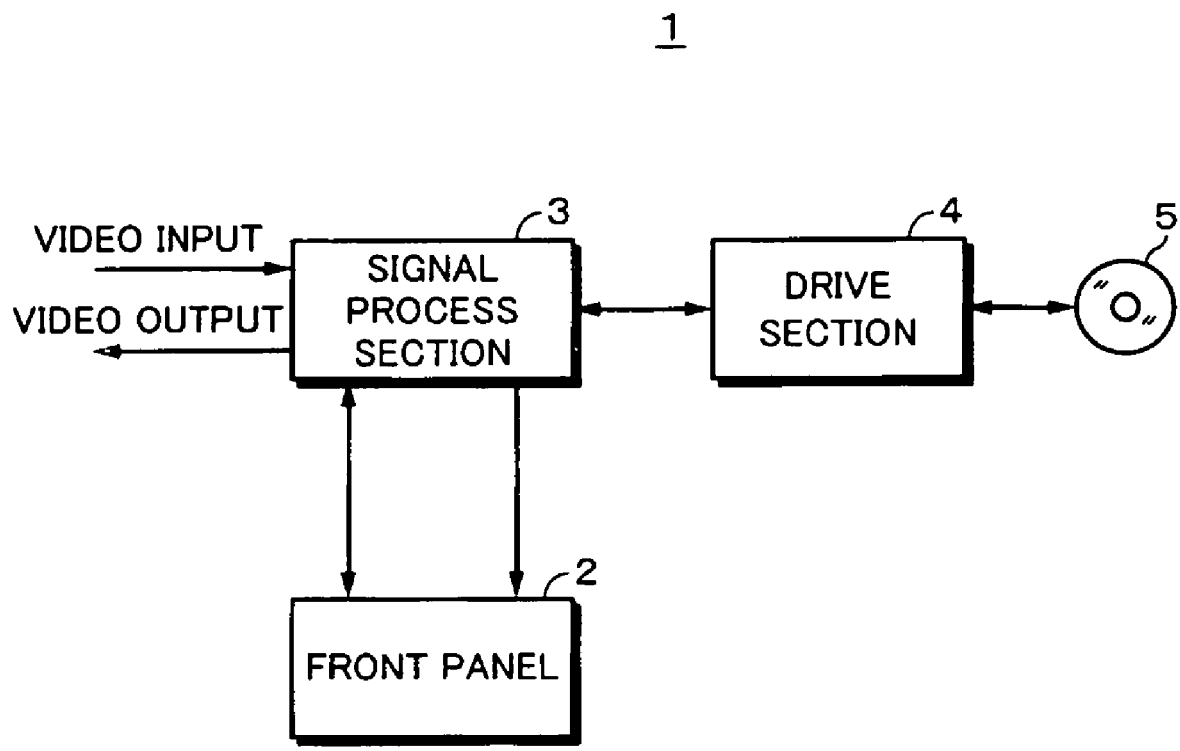
FIG. 8 is a block diagram showing an example of the structure of a record and reproduction apparatus 1 according to an embodiment of the present invention.

FIG. 8 shows an example of an outline of the structure of a record and reproduction apparatus 1 according to an embodiment of the present invention. Video data and audio data (not shown) supplied from the outside of the record and reproduction apparatus 1 are supplied to a signal process section 3. For example, video data and audio data are output from a video camera (not shown) and supplied to the signal process section 3 through an input terminal disposed in the record-and reproduction apparatus 1.

The signal process section 3 compression-encodes the supplied video data and audio data according to for example the MPEG2 system and generates the foregoing main AV data and sub AV data having a lower resolution and a lower bit rate than the main AV data. The main AV data and sub AV data are supplied to a drive section 4. The drive section 4 performs an error correction code encode process, a record encode process, and so forth for the supplied main AV data and sub AV data and generates record data. The record data are modulated in a predetermined manner. The modulated record data are recorded as a record signal on the optical disc 5.

The optical disc 5 applicable to the record and reproduction apparatus 1 is for example an optical disc that has a single-sided single-layer structure and a record capacity of 23 GB (Gigabytes) and that uses a blue-purple laser that emits a laser beam having a wavelength of 405 nm as a light source.

When data are reproduced from the optical disc 5, a reproduction signal reproduced from the optical disc 5 is supplied to the drive section 4. The drive section 4 demodulates the reproduction signal and outputs reproduction data. The reproduction data are decoded by a record code decoding process, an error correction code decoding process, and so forth. The decoded reproduction data are supplied to the signal process section 3. The signal process section 3 decodes the compression code of the supplied signal and outputs main AV data and sub AV data. The main AV data are output from for example the signal process section 3 to the outside of the record and reproduction apparatus 1.

The signal process section 3 has a system controller composed of for example a microprocessor, a ROM (Read Only Memory), a RAM (Random Access Memory), and so forth. The signal process section 3 controls the overall record and reproduction apparatus 1 using the RAM as a work memory according to a program stored in the ROM.

A-front panel 2 composes a user interface of the record and reproduction apparatus 1. The front panel 2 has various operation switches with which the record and reproduction apparatus 1 is operated, a display device that displays video data that are input to the record and reproduction apparatus 1 and video data that are reproduced from the optical disc 5, and so forth. The operation switches include a non-contact type touch panel that detects the position at which the user's finger has touched and detects whether his or her finger has touched the panel and mechanical switches. A control signal corresponding to an operation of an operation switch is supplied to for example a system controller of the signal process section 3. The system controller controls the operation of the record and reproduction apparatus 1 corresponding to the control signal.

The display device is for example an LCD (Liquid Crystal Display). The display device displays video data that are input from the outside and video data that are reproduced from the optical disc 5, various types of status information of the record and reproduction apparatus 1, information about video data that are displayed, and so forth.

Figure 9:
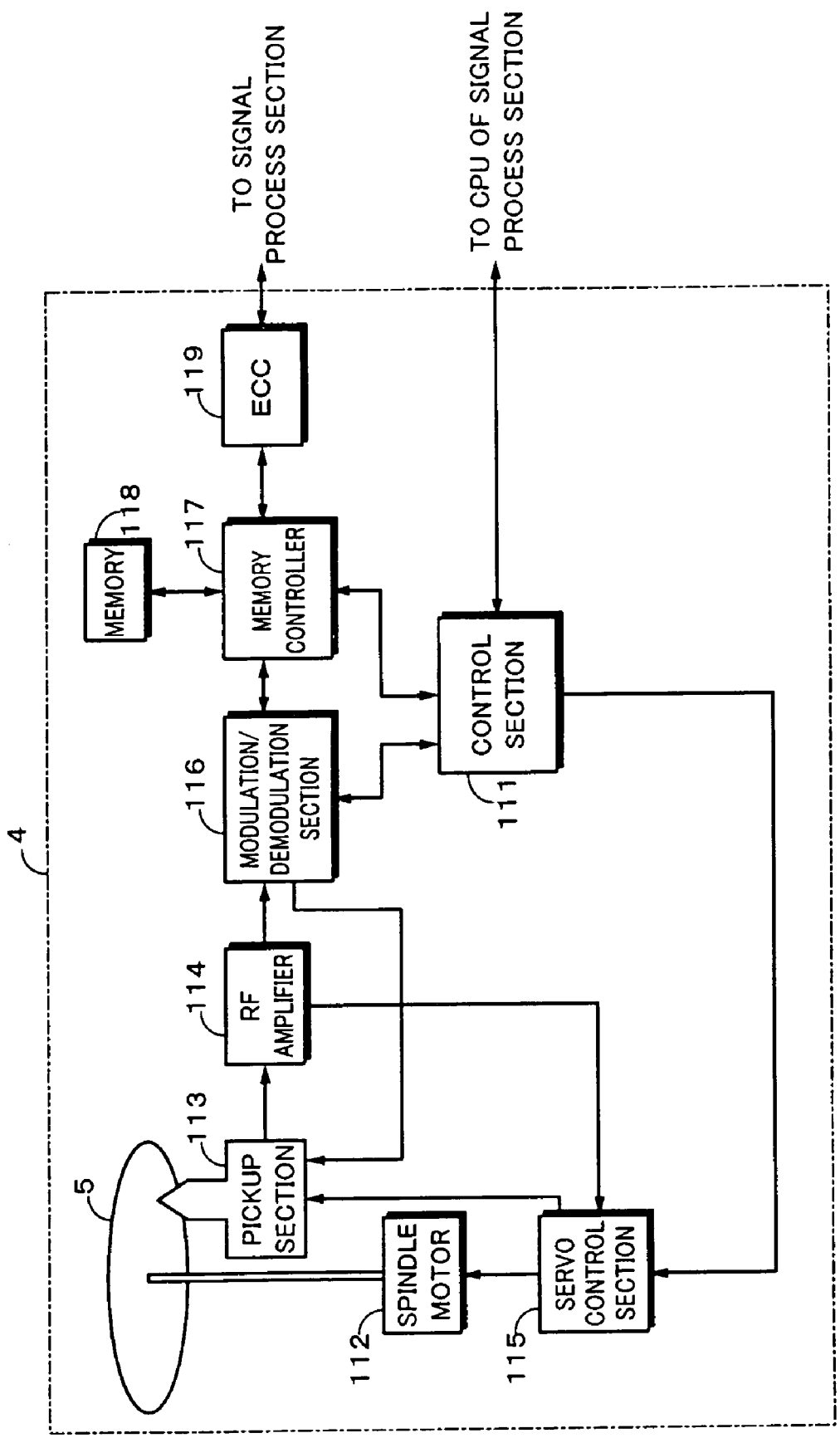
FIG. 9 is a block diagram showing an example of the structure of a drive section of the record and reproduction apparatus.

FIG. 9 shows an example of the structure of the drive section 4 of the record and reproduction apparatus 1. When data are recorded, record data supplied from the signal process section 3 is stored in a memory 118 through an ECC (Error Correction Coding) section 119 and a memory controller 117. The memory controller 117 access-controls the memory 118 under the control of a control section 111. The control section 111 is composed of a microcomputer. The control section 111 controls the drive section 4 corresponding to a control signal supplied from the signal process section 3.

The ECC section 119 generates an error correction code in each error correction unit of record data stored in the memory 118. An error correction code for video data and audio data is a product code. With the product code, video data or audio data are encoded with an outer code and an inner code in the vertical direction and horizontal direction of a two-dimensional arrangement thereof so that data symbols are dually encoded. As the outer code and inner code, a Reed-Solomon code can be used. A data unit that is complete with the product code is referred to as an ECC block. An ECC block has a size of for example 64 kbytes (65536 bytes). The memory controller 117 reads an ECC block from the memory 118 and supplies it as record data to a modulation/demodulation section 116. The modulation/demodulation section 116 modulates the record data, generates a record signal, and supplies the record signal to a pickup section 113.

The pickup section 113 controls a laser beam output corresponding to the record signal supplied from the modulation/demodulation section 116 and records the record signal on the optical disc 5 driven and rotated by a spindle motor 112.

The pickup section 113 converts light reflected from the optical disc 5 into a current signal and supplies it to an RF (Radio Frequency) amplifier 114. The RF amplifier 114 generates a focus error signal, a tracking error signal, and a reproduction signal corresponding to the current signal supplied from the pickup section 113 and supplies the tracking error signal and the focus error signal to a servo control section 115. In addition, when data are reproduced, the RF amplifier 114 supplies a reproduction signal to the modulation/demodulation section 116.

A radiation position of the laser beam is controlled at a predetermined position with a servo signal supplied from the servo control section 115 to the pickup section 113. In other words, the servo control section 115 controls a focus servo operation and a tracking servo operation. Specifically, the servo control section 115 generates a focus servo signal and a tracking servo signal corresponding to the focus error signal and the tracking error signal supplied from the RF amplifier 114 and supplies the generated signals to an actuator (not shown) of the pickup section 113. In addition, the servo control section 115 generates a spindle motor drive signal with which the spindle motor 112 is driven and controls a spindle servo operation that rotates the optical disc 5 at a predetermined rotation speed.

In addition, the servo control section 115 performs a thread control that causes the pickup section 113 to be moved in the radius direction of the optical disc 5 to change the radiation position of the laser beam. The control section 111 sets a signal read position of the optical disc 5 corresponding to the control signal supplied from the signal process section 3 and controls the position of the pickup section 113 so that a signal is read from the read position.

The spindle motor 112 drives and rotates the optical disc 5 at CLV (Constant Linear Velocity) or CAV (Constant Angular Velocity) corresponding to the spindle motor drive signal supplied from the servo control section 115. The drive system of the spindle motor 112 can be alternately selected between the CLV and the CAV corresponding to the control signal supplied from the signal process-section 3.

According to this embodiment of the present invention, there are four switchable drive modes for the spindle motor 112 that are CLV×1, CLV×2, CLV×2.4, and CAV×1. The mode CLV×1 is a mode that occurs only when the drive section 4 is started. Thus, this mode is not used in other states. The data rate of the mode CLV×2 is twice the data rate of the mode CLV×1. Data are written to the optical disc 5 in the mode CLV×2. The mode CLV×2.4 is used for reproduction operations for example the normal reproduction operation and the shuttle reproduction operation. The mode CAV×1 is used when thumbnails are displayed.

When data are reproduced, the pickup section 113 concentrates a laser beam to the optical disc 5 and supplies a current signal into which light reflected from the optical disc 5 is converted to the RF amplifier 114. The modulation/demodulation section 116 demodulates the reproduction signal supplied from the RF amplifier 114, generates reproduction data, and supplies the reproduction data to the memory controller 117. The memory controller 117 writes the supplied reproduction data to the memory 118. Reproduction data are read from the memory 118 in the unit of one ECC block and supplied to the ECC section 119.

The ECC section 119 decodes an error correction code of reproduction data supplied in the unit of one ECC block and corrects errors of the supplied reproduction data. When the ECC section 119 detects an error that exceeds an error correction capability of the error correction code, the ECC section 119 does not correct the error. In this case, the ECC section 119 places an error flag in the error correction unit. Reproduction data that are output from the ECC section 119 are supplied to the signal process section 3.

Figure 10:
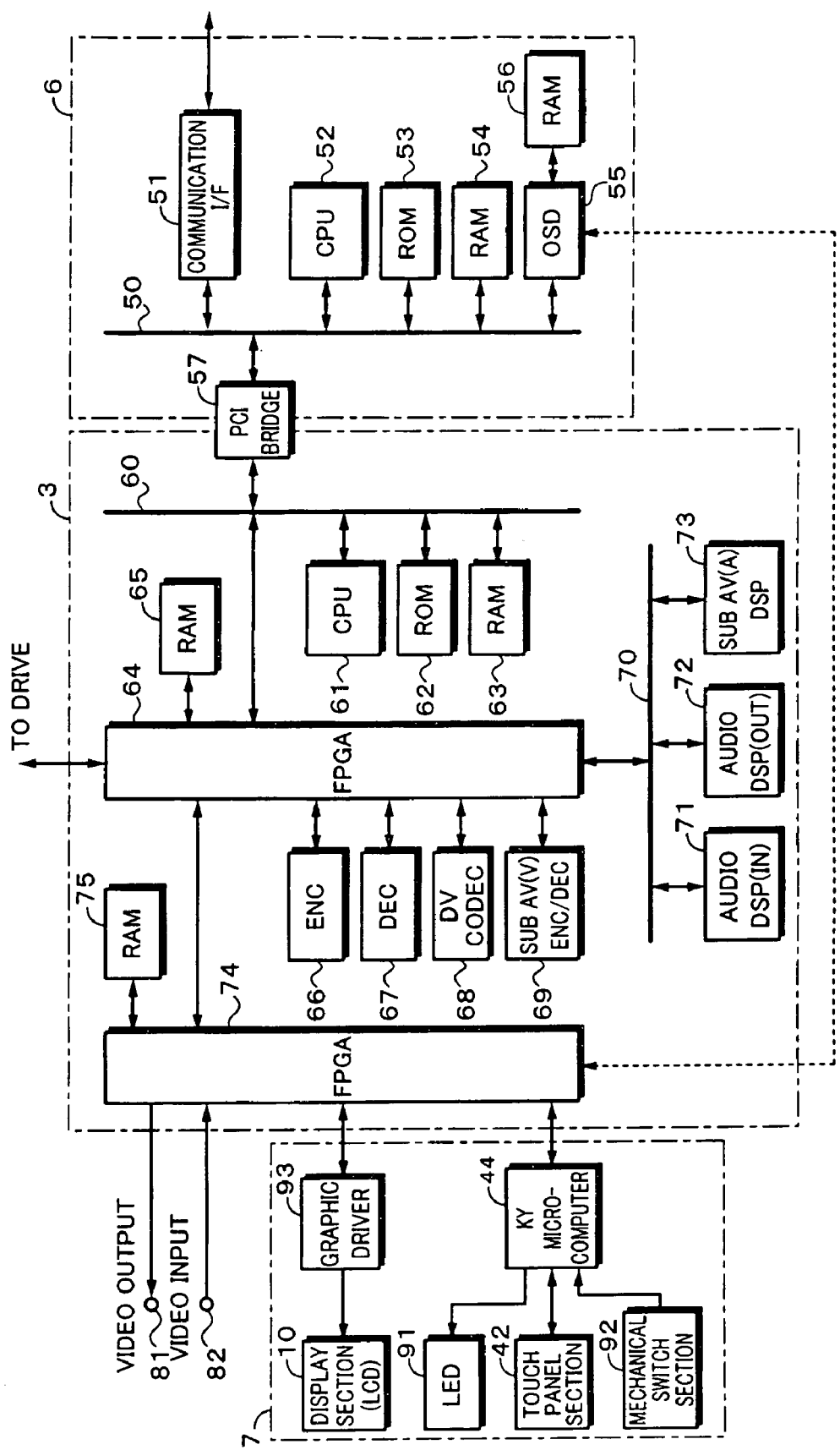
FIG. 10 is a block diagram showing an example of the overall structure of the record and reproduction apparatus.

FIG. 10 shows an example of the overall structure of the record and reproduction apparatus 1 according to an embodiment of the present invention. Connected to the signal process section 3 are the drive section 4 (not shown), an interface section 6, and a user interface section 7. The user interface section 7 is disposed in for example the front panel section 2.

In the signal process section 3, the drive section 4 is connected to an FPGA (Field Programmable Gate Array) 64. Record data and reproduction data are exchanged between the drive section 4 and the signal process section 3. Control signals are exchanged between the control section 111 of the drive section 4 and the signal process section 3 through the FPGA 64.

Connected to the FPGA 64 are a RAM 65, an encoder 66, a decoder 67, a DV codec 68, and a sub AV data encoder/decoder 69. The sub AV data encoder/decoder 69 encodes sub video data. Connected to the FPGA 64 is also a bus 70. Connected to the bus 70 are an input data audio DSP (Digital Signal Processor) 71, an output data audio DSP 72, and a sub AV data audio DSP 73. Connected to the FPGA 64 are also a bus 60 and an FPGA 74. The FPGA 64 functions as a memory controller for the RAM 65. In addition, the FPGA 64 controls a data flow among individual sections connected thereto.

Connected to the FPGA 74 is a RAM 75. Connected to the FPGA 74 are also a graphic driver 93, an output terminal 81, and an input terminal 82. Connected to the FPGA 74 is also a KY microcomputer 44 that is a microcomputer of the user interface section 7. The graphic driver 93 generates a display drive signal with which a display section 10 composed of for example an LCD (Liquid Crystal Display) corresponding to video data supplied from the FPGA 74. Like the foregoing FPGA 64, the FPGA 74 functions as a memory controller for the RAM 75. In addition, the FPGA 74 controls a data flow among individual sections connected thereto.

The bus 60 is for example a PCI (Peripheral Component Bus). Connected to the bus 60 are a CPU (Central Processing Unit) 61, a ROM (Read Only Memory) 62, and a RAM (Random Access Memory) 63. The RAM 63 is used as a work memory of the CPU 61. The ROM 62 is composed of two rewritable flash memories. One flash memory is used to start the system. The other flash memory is used to pre-store a program and data that are used after the system is started. The RAM 63 and the other ROM are connected to the CPU 61 through a CPU bus (not shown).

The CPU 61 controls the signal process section 3 corresponding to the program stored in the other ROM. In addition, the CPU 61 controls the drive section 4 to access the optical disc 5 and accesses the memory 118. The CPU 61 manages the directory structure of the optical disc 5, which was described with reference to FIG. 5 to FIG. 7.

In the interface section 6, a bus 50 is for example a PCI bus. The bus 50 is connected to the bus 60 through a PCI bridge 57. Connected to the bus 50 are a communication interface 51, a CPU (Central Processing Unit) 52, a ROM (Read Only Memory) 53, a RAM (Random Access Memory) 54, and an OSD (On Screen Display) section 55. Specifically, the CPU 52, the ROM 53, and the RAM 54 are connected to the bus 50 through for example a memory controller, a bus controller, and so forth. The RAM 54 is used as a work memory of the CPU 52. The ROM 53 is specifically composed of two rewritable flash memories. One flash memory is used to start the system. The other flash memory is used to store a program and data that are used when the system is started.

The communication interface 51 controls communication with an external network corresponding to a command supplied from the CPU 52. The communication interface 51 can communicate data with the Internet according to the FTP (File Transfer Protocol). Connected to the OSD section 55 is a RAM 56. The OSD section 55 generates a video signal for the user interface corresponding to a display control command supplied from the CPU 52.

The user interface section 7 has a touch panel section 42 and a mechanical switch section 92 as an operation switch section with which the operation of the record and reproduction apparatus 1 is controlled. The user interface section 7 has an LED section 91 that indicates the states of the operation switches, the operation results, and so forth. As will be described later, the touch panel section 42 is for example a capacity coupling type touch panel. The touch panel section 42 can detect whether the user's finger has touched a predetermined position or detect the position that user's finger has touched. The mechanical switch section 92 has mechanical switches, variable resistors, and so forth.

Outputs of the touch panel section 42 and the mechanical switch section 92 are supplied to the KY microcomputer 44. The KY microcomputer 44 generates a control signal corresponding to the outputs of the touch panel section 42 and the mechanical switch section 92. The control signal is supplied to the CPU 61 and the CPU 52 through the FPGA 74 corresponding to the type of the control. In addition, the KY microcomputer 44 controls light emission of LEDs (Light Emitting Diodes) disposed in a LED section 91 corresponding to the outputs of the touch panel section 42 and the mechanical switch section 92.

A flame synchronization signal corresponding to a frame period of video data is supplied from the outside of the record and reproduction apparatus 1 through an interface (not shown). The frame synchronization signal may be generated in the record and reproduction apparatus 1. When necessary, the signal process of each section of the record and reproduction apparatus 1 is synchronized with the frame synchronization signal. For example, a process command is supplied from the CPU 61 for main AV data and sub AV data in synchronization with the frame synchronization signal.

In this structure, when data are recorded, video data and audio data supplied from the outside of the record and reproduction apparatus 1 are input to an input terminal 82. For example, video data and audio data are output from a video camera (not shown) and input to the input terminal 82. The video data and audio data are temporarily buffered in the RAM 75 and supplied to the FPGA 64. Thereafter, the video data and audio data are stored in the RAM 65.

The video data and audio data stored in the RAM 65 are supplied to the sub AV data encoder/decoder 69 and the sub AV data audio DSP 73 by the FPGA 64, respectively. The sub AV data encoder/decoder 69 and the sub AV data audio DSP 73 generate sub AV data.

The sub AV data encoder/decoder 69 compression-encodes the supplied video data according to the MPEG4 system and outputs sub video data. The sub video data that have been compression-encoded by the sub AV data encoder/decoder 69 are written to the RAM 65. The sub AV data encoder/decoder 69 generates one GOP with for example one frame of an I picture and nine frames of P pictures.

The resolution of sub video data according to the NTSC system is 352 pixels×240 lines, whereas the resolution of sub video data according to the PAL system is 352 pixels×288 lines. The color space of the sub video data is the YCbCr space in which a color is represented by luminance and color difference.

When necessary, the sub AV data audio DSP 73 performs a predetermined signal process for example a level adjustment process and a compression-encoding process for audio data and outputs sub audio data. As will be described later, the sub AV data audio DSP 73 performs for example thin-out process and an A-Law encoding process for the audio data. The sampling frequency of the audio data is decreased from 48 kHz to 8 kHz. The number of quantizer bits of the audio data is decreased from 16 bits to 8 bits. Sub audio data that have been compression-encoded are written to the RAM 65. From audio data having 24 quantizer bits, the low order 8 bits are deleted for each sample. Thus, audio data having 16 bits per sample are compression-encoded 16-bit data per sample are compression-encoded.

While the sub AV data encoder/decoder 69 and the sub AV data audio DSP 73 are encoding video data and audio data, main video data and audio data are encoded. As was described above, the record and reproduction apparatus 1 according to this embodiment has two process modes for main video data. In one mode, the data rate of main video data is for example 50 Mbps. In the other mode, the data rate of main video data is for example 25 Mbps.

In the first mode of which the data rate of main video data is 50 Mbps, the main video data that are read from the RAM 65 are supplied to the encoder 66. The encoder 66 compression-encodes the main video data according to the MPEG2 system. At this point, the encoder 66 encodes the main video data as all I pictures, not performs the inter-frame compression process, so that they can be edited on frame-by-frame basis. The encoder 66 encodes the main video data by properly selecting quantizer coefficients in each frame or in each macro block of which a frame is further divided so that the data rate of the encoded data becomes 50 Mbps. The main video data that have been encoded by the encoder 66 are temporarily stored in the RAM 65.

In the second mode of which the data rate of main video data is 25 Mbps, the main video data that are read from the RAM 65 are supplied to the DV codec section 68. The DV codec section 68 performs a compression-encoding process for the supplied main video data according to for example the DV format. The main video data that have been encoded in the DV codec section 68 are temporarily stored in the RAM 65.

Main audio data of the main AV data are read from the RAM 65 by the FPGA 64 and supplied to the audio DSP 71. The main audio data that have been encoded by the audio DSP 71 are stored in the RAM 65.

The main audio data and main video data stored in the RAM 65 are mapped for a predetermined reproduction period of an annual ring to a record format and supplied to the drive section 4 corresponding to a command supplied from the CPU 61. Likewise, the sub audio data and sub video data stored in the RAM 65 are mapped for a predetermined time period of an annual ring to a sub AV data format and supplied to the drive section 4 corresponding to a command supplied from the CPU 61.

Meta data are generated by for example the CPU 61 in a predetermined manner and stored in the RAM 65. Like the main AV data and sub AV data, the meta data stored in the RAM 65 are supplied for a predetermined reproduction time period of an annual ring to-the drive section 4.

The CPU 61 supplies a command to the drive section 4 so as to write main AV data, sub AV data, and meta data as annual rings on the optical disc 5. This command is supplied to the control system 111. The control system 111 controls the ECC section 119 of the drive section 4 to add an error correction code to the main AV data, sub AV data, and meta data corresponding to the command supplied from the CPU 61. The modulation/demodulation section 116 modulates the main AV data, sub AV data, and meta data to which the error correction code has been added and outputs a record signal. The control system 111 controls a write address of the record signal. The record signal is written to the write address of the optical disc 5.

When data are reproduced, the control system 111 of the drive section 4 controls a read address corresponding to a command supplied from the CPU 61 and reads data as an annual ring from the read address of the optical disc 5. The data that have been read from the optical disc 5 are decoded with the error correction code by the ECC section 119 through the foregoing processes. The error corrected data are output-from the drive section 4. The main AV data, sub AV data, and meta data that are output from the drive section 4 are supplied to the FPGA 64 and stored in the RAM 65.

When the main video data of the main AV data stored in the RAM 65 are the 50 Mbps mode data, the main video data are supplied to the decoder 67. In contrast, when the main video data are the 25 Mbps mode data, the main video data are supplied to the DV codec section 68. The main video data decoded by the decoder 67 or the DV codec section 68 are stored in the RAM 65.

The main audio data of the main AV data are read from the RAM 65 by the FPGA 64 and supplied to the audio DSP 72. The main audio data decoded by the audio DSP 72 are stored in the RAM 65.

While the main AV data are being decoded, the sub AV data are decoded. The sub video data of the sub AV data stored in the RAM 65 are read therefrom by the FPGA 64 and supplied to the sub AV data encoder/decoder 69. The sub video data are decoded by the sub AV data encoder/decoder 69 and stored in the RAM 65. Likewise, the sub audio data are read from the RAM 65 by the FPGA 64 and supplied to the sub AV audio DSP 73. The sub audio data are decoded by the sub AV audio DSP 73 so that the number of quantizer bits is returned from 8 bits to 16 bits (or 24 bits) and samples are interpolated so that the sampling frequency becomes 48 kHz. The decoded sub audio data are stored in the RAM 65.

The CPU 61 controls timings of the main video data, main audio data, sub video data, and sub audio data that have been decoded and stored in the RAM 65 corresponding to a frame synchronization signal (not shown) and synchronously reads them from the RAM 65. The FPGA 64 controls an address pointer of the RAM 65 and reads the main audio data and sub audio data in synchronization with video data from the RAM 65 corresponding to a command supplied from the CPU 61. The main video data, sub video data, main audio data, and sub audio data that are read from the RAM 65 are supplied to the FPGA 74.

For example, the FPGA 74 supplies the main video data to the output terminal 81 and supplies the sub video data to the display section 10. In addition, the FPGA 74 selects the main and sub audio data in a predetermined manner and outputs the selected audio data to the output terminal 81. The main audio data and sub audio data can be switchably output at a predetermined timing corresponding to a command supplied from the CPU 61. It is preferred that at a switching timing from one of the main audio data and sub audio data to the other, they be cross-faded to reduce switching noise.

As was described above, the interface section 6 has the communication interface 51. The communication interface 51 receives video data and audio data that have been FTP-transferred through the Internet and sends the received video data and audio data to the drive section 4. In other words, FTP-transferred data are received by the communication interface 51, supplied to the FPGA 64 through the bus 50, the PCI bridge 57, and the bus 60, and stored in the RAM 65. For example, audio data that have been asynchronously transferred by the FTP transfer process are mapped by the RAM 65 so that they are chronologically successive.

The OSD section 55 of the interface section 6 generates image data for a GUI (Graphical User Interface) screen with the RAM 56 corresponding to a display control command supplied from the CPU 52. The generated image data are read from the RAM 56 and transferred to the FPGA 74. The image data are supplied to the graphic driver 93 by the FPGA 74 and displayed as for example a GUI screen on the display section 10. At this point, the graphic driver 93 can maps the video data supplied from the FPGA 74 and the image data for the GUI screen with the frame memory and display them on the same screen.

2. Structure of Front Panel 2-1. Layout of Front Panel

Figure 11:
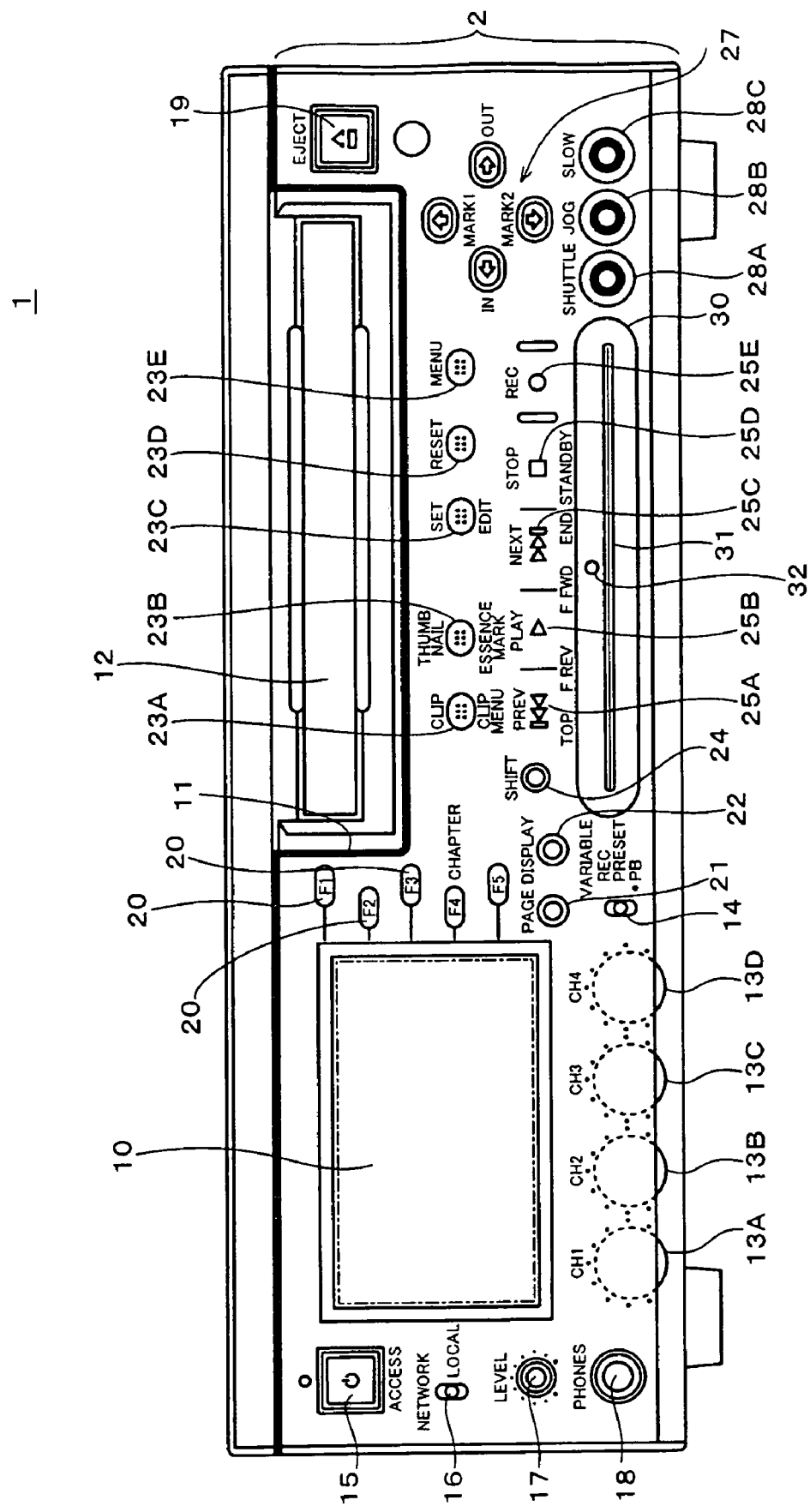
FIG. 11 is a schematic diagram showing an example of the structure of a front panel of the record and reproduction apparatus.

FIG. 11 shows an example of the structure of the front panel 2 of the record and reproduction apparatus 1. Operation switches disposed on the front panel 2 are composed of a touch panel except for some of them. The touch panel is of a capacity coupling type of which it is detected whether the user's finger has touched a predetermined portion corresponding to variation of capacitance of electrodes formed on a substrate. For example, electrodes are formed at positions corresponding to operation portions on nearly all the surface of a substrate except or the display section 10 of the front panel 2. The substrate is a file made of for example PET (Polyethylene Terephthalate) or the like. A dielectric plate such as a glass plate or an acrylic plate is adhered to the substrate. As a result, a panel surface is formed.

The dielectric plate adhered to the substrate is for example an acrylic plate. It is preferred that a transparent acrylic plate be used for an luxurious design. In the following description, as a dielectric plate adhered to the substrate is a transparent acrylic plate. This plate is called the panel plate.

Figure 12:
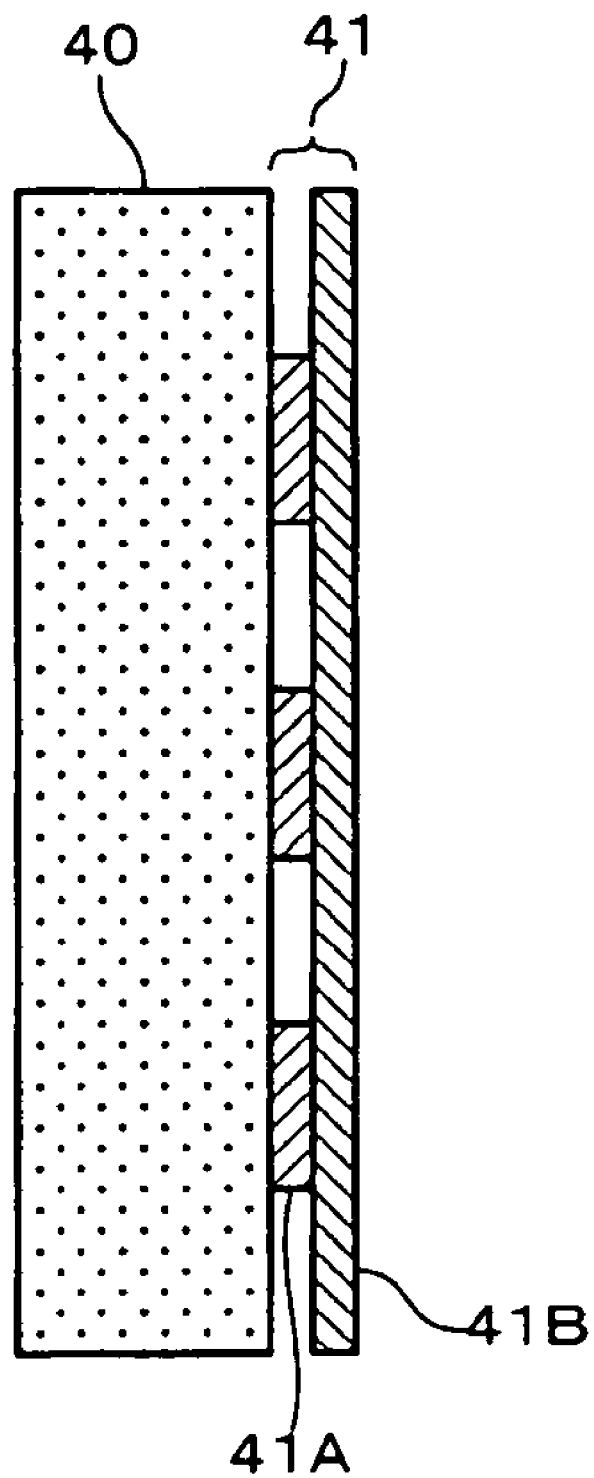
FIG. 12 is a schematic diagram showing an example of the structure of a touch panel.

More specifically, as shown in FIG. 12, a transparent electrode sheet 41 having a signal pattern and a GND (Ground) pattern made of an ITO (Iridium Tin Oxide) film 41A is adhered to a panel plate 40 made of a transparent acrylic plate.

The rear surface of the panel plate 40 is painted so that the electrode structure is concealed from the outside. Letters and symbols that represent functions of keys and so forth are printed on the panel plate 40. At this point, a transparent paint may be coated. Light emitting devices such as LEDs (Light Emitting Diodes) may be disposed on the rear surface of the transparent paint. When a light emitting device at a position corresponding to an operation of the touch panel is lit, an operations result and so forth can be indicated.

Next, the layout of individual sections of the front panel 2 will be described in brief. Disposed on the left of the front panel 2 is the display section 10 that uses for example an LCD. The display section 10 can display pictures that are input to the record and reproduction apparatus 1 and pictures reproduces from a record medium by the record and reproduction apparatus 1. In addition, the display section 10 can display various statuses of the record and reproduction apparatus 1, the functions of function keys 20, 20, ... that will be described later, and so forth.

Formed at an upper right portion of the front panel 2 is a cutout section 11 that is cut from the upper end in a horizontally elongated rectangular shape. The cutout section 11 exposes a disc loading opening 12 disposed on the main body side of the record and reproduction apparatus 1. The front panel 2 is movable from the main body of the record and reproduction apparatus 1. The lower end portion of the front panel 2 is movable in the forward direction so that the front panel 2 can be inclined. The lower end section of the front panel 2 is moved in the forward direction and the upper end portion thereof is lowered in a predetermined manner so that the inclined front panel 2 does not prevent a disc from being loaded into the disc loading opening 12.

Disposed at the lower left end portion of the front panel 2 are rotation knobs 13A, 13B, 13C, and 13D with-which the levels of for example audio input signals are adjusted. Parts of circles of the rotation knobs 13A, 13B, 13C, and 13D are exposed at the lower end of the front panel 2. The other parts of the rotation knobs 13A, 13B, 13C, and 13D are covered by the panel plate 40. The exposed portions have a space enough to allow the user to touch and rotate the rotation knobs 13A, 13B, 13C, and 13D with his or her finger. The scales of the rotation knobs 13A, 13B, 13C, and 13D are marked for example on their front surfaces so that the user can watch them through the panel plate 40. Disposed on the right of the rotation knobs 13A, 13B, 13C, and 13D is a switch 14 with which adjustment modes of the rotation knobs 13A, 13B, 13C, and 13D are set.

Disposed at the left end of the front panel 2 are a power switch 15, a remote selection switch 16, a headset level volume controller 17, and a headset jack 18. The power switch 15, the remote selection switch 16, the headset level volume controller 17, and the headset jack 18 are successively disposed from the top to the bottom of the front panel 2. Disposed on the right of the disc loading opening 12 is an eject button with which the disc loaded into the record and reproduction apparatus 1 is unloaded from the disc loading opening 12. Disposed near the center of the front panel 2 is a shift key 24.

Next, the operation switches composed of the touch panel of the front panel 2 will be described. The substances of keys and a search bar 30 that will be described in the following are sensors made of electrodes formed on the transparent electrode sheet 41 disposed through the panel plate 40. They detect whether the user's finger has touched a predetermined portion corresponding to variation of capacitance and output a predetermined control signal. The front panel 2 uses digital sensors that detect whether the user's finger has touched a predetermined portion and output a corresponding signal and an analog sensor that linearly and continuously detects positions that the user's finger has touched. In the example shown in FIG. 11, the digital sensors are used for various keys. The analog sensor is used for the search bar 30.

In the following description, an operation that the user touches a key as a digital sensor with his or her finger and detects that it has touched the key is referred to as "pressing the key".

Formed on the right of the display section 10 are function keys 20, 20, .... The function keys 20, 20, ... compose a key set of a plurality of keys (in the example shown in FIG. 11, five function keys F1 to F5). For each key set, the functions of the function keys 20, 20, ... can be changed. The functions assigned to the function keys 20, 20, ... are displayed at the right end of the display section 10 when the display mode of the display screen on the display section 10 is a function menu mode.

Formed below the function keys 20, 20, ... are a page key 21 and a display key 22. The page key 21 causes the display mode of the display section 10 to be switched to the function mode in which the function keys are displayed and a key set of the function keys 20, 20, ... to be switched. The display key 22 causes the display mode on the display section 10 to be switched.

Formed below the disc loading opening 12 are various keys 23A to 23E with which an edit operation and a system setup operation are performed. The various keys 23A to 23E each have a protrusion portion on their front surfaces so that the user can operate them without need to watch them. In the example shown in FIG. 11, the key 23A to 23E are assigned two functions each. Their functions are indicated above and below the keys 23A to 23C. While the shift key 24 is being pressed, when one of the key 23A to 23C is pressed, the function indicated below the key is selected.

In the example shown in FIG. 11, the key 23A is used to perform a simple edit operation. Namely, the key 23A causes a clip to be cut and clips to be connected. The key 23B causes a thumbnail search screen to be displayed. When the key 23B is operated along with the shift key 24, they cause an essence mark search to be performed. The essence mark is a mark that is automatically recorded corresponding to variation of a predetermined condition when a picture is recorded for example a filter of a camera is changed. The keys 23C to 23E are keys used to perform the system setup operation of the record and reproduction apparatus 1. The key 23C is also used when an edit operation is performed.

Formed below the various keys 23A to 23E are keys 25A to 25E with which various record and reproduction operations are controlled. When the key 25A is pressed for example one time, the position of the clip that is currently reproduced/selected is returned to the beginning of the clip. When the key 25A is pressed for example successively two times, the position is moved to the top clip of the disc. The key 25B is a playback key that causes the one-time speed reproduction operation to be started in the forward direction. When the key 25C is pressed for example one time, the position is moved to beginning of the next clip of the clip that is being reproduced or selected. When the key 25C is pressed for example successively two times, the position is moved to the last clip of the disc. The key 25D is a stop key that causes the reproduction operation to be stopped. The key 25E is a record key that causes the record operation to be started. Formed on both sides of the record key 25E are rod-shaped bumps as guards that prevent a miss-operation of the record key 25E. When the playback key 25B and the prev key 25A are simultaneously pressed, they cause the high speed reproduction operation to be performed in the reverse direction. When the playback key 25B and the next key 25C are simultaneously pressed, they cause the high speed reproduction operation to be performed in the forward direction.

Formed on the right of the keys 25A to 25E are four way keys 27. The four way keys 27 are composed of four keys corresponding to the four directions of up, down, left, and right directions. The four way keys 27 are used to designate a direction corresponding to the display on the display section 10. When the edit operation is performed, with the four way keys 27 and the key 23C, an IN point and an OUT point can be designated and a reproduction position can be marked. The positions corresponding to the four way keys 27 are bumped. Thus, the user can operate the four way keys 27 without need to watch them.

Formed below the keys 25A to 25E is the search bar 30 composed of an analog type sensor. The search bar 30 can linearly detect positions that the user's finger has touched. For example, the distances of the position that the user's finger has touched from the positions of two electrodes disposed on both ends of the search bar 30 are obtained corresponding to variation of capacitances of the electrodes. With these distances, the position that the user's finger has touched is determined. Since the position that the user's finger has touched is detected with the values of two points on the both ends, one position that the user's finger has touched can be determined regardless of the thickness of the user's finger and so forth. The search bar 30 is bored in a horizontally elongated oval shape. Formed at an upper center position in the horizontally elongated oval shape of the search bar 30 is a bump 32. Thus, the user can easily know the center portion of the search bar 30 with the bump 32.

Formed in the bottom of the search bar 30 is a slit shaped transparent portion 31 corresponding to a horizontal linear position detectable range. When light emitting devices such as LEDs are disposed at positions corresponding to the transparent portion on the rear side of the panel plate 40, the user can know light emission of the light emitting device from the panel side. As will be described later, a plurality of light emitting devices are disposed in the slit shaped transparent portion 31 so that they illuminate corresponding to the position that the user's finger has touched on the search bar 30.

Formed on the right of the search bar 30 are search mode keys 28A to 28C that cause an operation mode and so forth corresponding to the operation of the search bar 30 to be designated and indicated. Formed on the panel plate 40 corresponding to the search mode keys 28A to 28C are transparent portions in a predetermined manner. Disposed at the positions corresponding to the transparent portions on the rear surface of the search bar 30 are light emitting devices such as LEDs.

2-2. Circuit Structure of Front Panel

Figure 13:
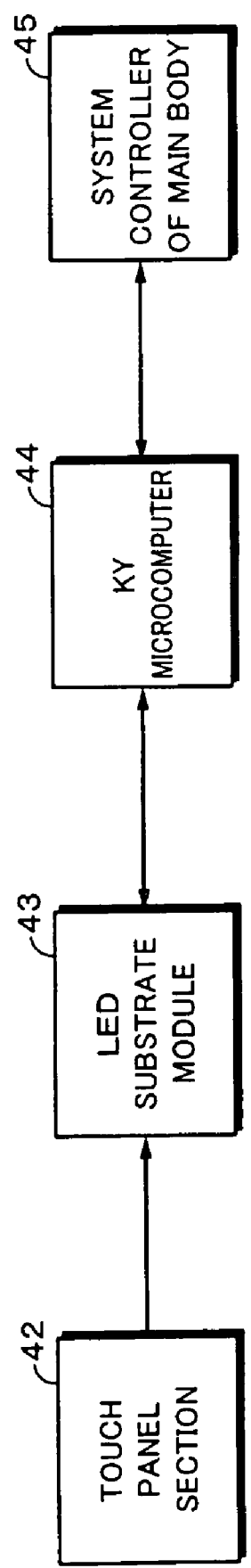
FIG. 13 is a block diagram showing an outlined circuit structure of the front panel.

FIG. 13 shows an outlined circuit structure of the front panel 2. The touch panel section 4 contains the panel plate 40, the transparent electrode sheet 41 (the panel plate 40 and the electrode sheet 41 were described with reference to FIG. 12), and a control module that converts an output signal of the transparent electrode sheet 41 into a control signal corresponding to the KY microcomputer 44 disposed downstream of the touch panel section 42. The touch panel section 42 is connected to the KY microcomputer 44 through an LED substrate module 43. The KY microcomputer 44 is connected to a system controller 45 of the main body of the record and reproduction apparatus 1. In the structure shown in FIG. 10, the system controller 45 corresponds to for example the CPU 52.

Output signals of part or all non-touch panel type keys such as the shift key 24 are directly supplied to for example the KY microcomputer 44.

The LED substrate module 43 is disposed on the far side viewed from the front of the front panel 2 of the touch panel section 42. LEDs and an LED light emission control circuit are disposed at predetermined positions of the substrate. As described above, the transparent portion is disposed on the panel plate 40 corresponding to the positions of the LEDs so that the user can know light emission of the LEDs from the front of the front panel 2. In the example shown in FIG. 11, as described above, LEDs are disposed at the positions corresponding to the search mode keys 28A to 28C. In addition, a plurality of LEDs are disposed along the slit shaped transparent portion 31 of the search bar 30.

The KY microcomputer 44 is composed of for example a microprocessor. The KY microcomputer 44 outputs a command corresponding to a control signal supplied from the touch panel section 42 to the system controller 45 of the main body of the record and reproduction apparatus 1. In addition, the KY microcomputer 44 controls the light emission control circuit of the LED substrate module 43 corresponding to an operation on the touch panel and a command supplied from the system controller 45 to light the LEDs in a predetermined manner.

Figure 14:
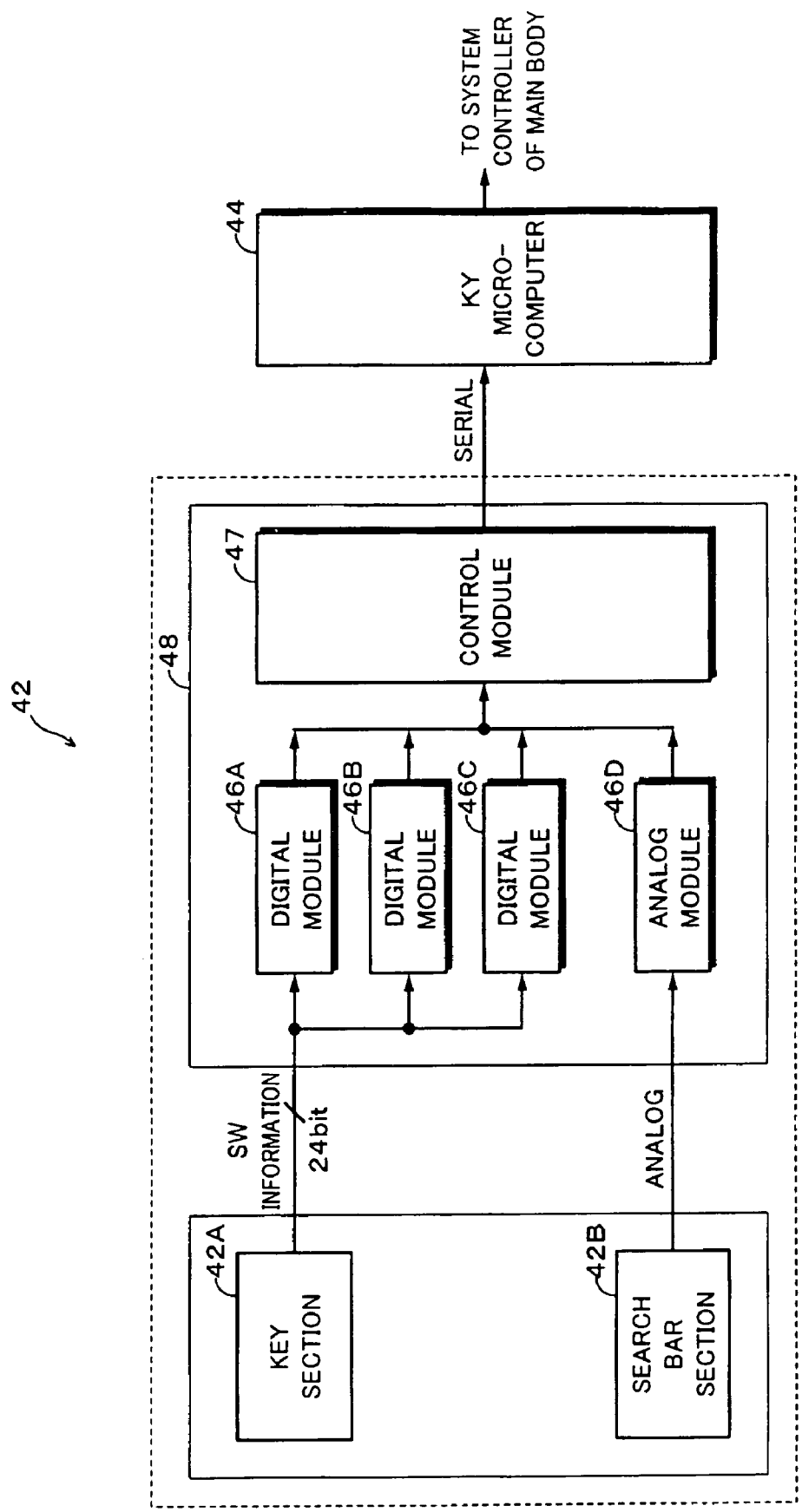
FIG. 14 is a block diagram showing an example of a detailed structure of the touch panel.

FIG. 14 shows an example of a detailed structure of the touch panel section 42. The touch panel section 42 has the transparent electrode sheet 41 (described above) and an output section 48 that converts an output signal of the transparent electrode sheet 41 into a control signal that the KY microcomputer 44 can process. With reference to FIG. 11, the transparent electrode sheet 41 is composed of a key section 42A and a search bar section 42B. The key section 42A has 24 digital type sensors disposed on the front panel 2. The search bar section 42B composes the search bar 30 that has an analog type sensor.

First of all, the key section 42A will be described. In the key section 42A, 24 keys composed of digital type sensors supply 24 output signals to the output section 48 in parallel. In the example shown in FIG. 14, sets of eight output signals of the 24 output signals are supplied to digital modules 46A, 46B, and 46C, respectively. The digital modules 46A, 46B, and 46C can process eight-bit signals each. Each of the digital modules 46A, 46B, and 46C converts eight signals into one-bit digital data and supplies the converted data to a control module 47.

The control module 47 converts one-bit data corresponding to each key supplied from the digital modules 46A, 46B, and 46C into a code corresponding to each key and outputs the code to the KY microcomputer 44 through the LED substrate module 43 (not shown). The KY microcomputer 44 converts the supplied code into data that the system controller 45 of the main body of the record and reproduction apparatus 1 can interpret and outputs the converted data to the system controller 45.

FIG. 15 shows an example of which the outputs of the 24 keys are converted into codes by the control module 47. Different codes are assigned to the state of which the user's finger has touched a key (ON) and the state of which the user's finger has physically released from the key (OFF). In the example shown in FIG. 15, different alphabet letters are assigned to the 24 keys. Upper case alphabet ASCII codes are assigned to the ON states of the keys, whereas the corresponding lower case alphabet ASCII codes are assigned to the OFF states of their keys. Since different codes are output corresponding to the ON state and the OFF state of each key, a long key operation and a simultaneous key operation can be detected.

When the function key F1 (the top key 20 of the keys 20, 20, . . . shown in FIG. 11) is in the ON state, ASCII code "0x41" that represents upper case alphabet letter "A" is output. When the function key F1 is in the OFF state, ASCII code "0x61" that represents lower case alphabet character "a" is output. Likewise, the function keys F2 to F5 are assigned upper case alphabet letters "B", "C", "D", and "E" in their ON states, respectively. The page key 21 and the display key 22 are assigned upper case alphabet letters "F" and "G" in their ON states. The key 23E is assigned upper case alphabet letter "H" in the ON state. The keys 23A to 23D are assigned upper case alphabet letter "I", "J", "K", and "L", respectively, in their ON states. The keys 25A to 25E with which record and reproduction operations are controlled are assigned upper case alphabet letters "M", "N", "O", "P", and "Q", respectively, in their ON states. The search mode keys 28A to 28C are assigned upper case alphabet letters "T", "R", and "S", respectively, in their ON states. In the four way keys 27, the up direction key, the left direction key, the right direction key, and the down direction key are assigned upper case alphabet letters "U", "V", "W", and "W", respectively, in their ON states. Each key is assigned the corresponding lower case alphabet letter in the OFF state.

The converted codes are supplied from the control module 47 to the KY microcomputer 44 by a serial communication. The KY microcomputer 44 determines the operation state of each key, namely whether each key has been pressed or released, corresponding to a code supplied from the control module 47. At this point, when different upper case ASCII codes are successively supplied from the control module 47, the KY microcomputer 44 determines that a plurality of keys corresponding to the supplied ASCII codes have been pressed.

After an upper case ASCII code that denotes that a particular key has been pressed is supplied, before a lower case ASCII code that denotes that the key has been released is supplied, if an upper case ASCII code that denotes that a different key has been pressed is supplied, the KY microcomputer 44 determines that these two keys have been pressed in combination.

3. Search Bar 3-1. Structure of Search Bar

Next, the search bar section 42B will be described. As was described above, the search bar 30 determines the position of one point between the two electrodes corresponding to detected results of the two electrodes disposed on both the ends. The search bar section 42B outputs an analog signal of potential corresponding to the position that the user's finger has touched. For example, an analog signal corresponding to the difference between the outputs of the two electrodes may be output. The analog signal that is output from the search bar section 42B is supplied to an analog module 46D of the output section 48. The analog module 46D converts the analog signal into a digital signal and supplies the digital signal to the control module 47.

The control module 47 converts the supplied digital data into 8-bit digital data corresponding to the position on the search bar 30 and outputs the digital data. The digital data are supplied to the KY microcomputer 44 through the LED substrate module 43 (not shown) by the serial communication. The KY microcomputer 44 correlates the digital data of the value of the position on the search bar 30 with position information of the search bar 30.

The KY microcomputer 44 generates a reproduction control command that causes the reproduction speed and the reproduction direction at and in which video data are reproduced from the record medium to be controlled corresponding to the position information of the search bar 30. The reproduction control command is transmitted from the KY microcomputer 44 to the system controller 45.

In addition, it can be detected that the user's finger has been released from the search bar 30. When the analog module 46D has detected that the user's finger has been released from the search bar 30 corresponding to the analog signal that is output from the search bar section 42B, the analog module 46D generates a signal that denotes that the user's finger has been released from the search bar 30 and supplies the signal along with the 8-bit data corresponding to the position on the search bar 30 to the KY microcomputer 44. For example, this signal may be an enable signal of which the level is "1" when the user's finger has touched the search bar 30 and the level is "0" when the user's finger has not touched the search bar 30.

Figure 16:
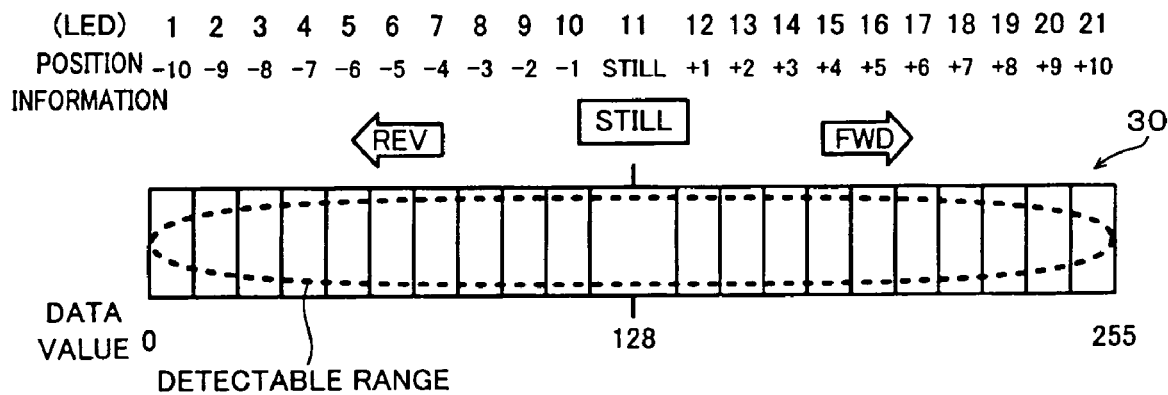
FIG. 16 is a schematic diagram showing an example of the relationship of position information and digital data of values corresponding to the positions on a search bar.

FIG. 16 shows an example of the relationship of the position information and the value of the position on the search bar 30. In the area surrounded by a dotted line shown in FIG. 16, the position on the search bar 30 can be detected. The search bar 30 is divided into for example 21 horizontal regions. One region at the center of the 21 regions is wider than the other regions. The center region is assigned position information "STILL." Position information "+1", "+2", . . . , and "+10" are assigned to the ten regions rightward from the center region "STILL". Likewise, position information "−1", "−2", . . . , and "−10" are assigned to the ten regions leftward from the center region "STILL".

Data value "128" supplied from the control module 47 corresponds to the nearly center position of the search bar 30. Data values "0" and "255" supplied from the control module 47 correspond to the left end and the right end of the search bar 30, respectively.

The ranges of digital data values corresponding to the positions on the search bar 30 are assigned to the regions of the position information of the search bar 30. FIG. 17 shows an example of which position information and data values corresponding to the positions on the search bar 30 are correlated. 11-bit data value ranges are assigned to the position information "−10" to "−2" and the position information "+2" to "+10". Regions change every 11 bits.

Wider data value ranges are assigned to regions denoted by position information "STILL" and position information "−1" and "+1" adjacent thereto than the regions denoted by position information "−10" to "−2" and position information "+2" to "+10". In particular, the widest data value range is assigned to the region denoted by position information "STILL". In the example shown in FIG. 17, 26 bits of data values "115" to "140" including data value "128" that denotes the nearly center are assigned to the region denoted by position information "STILL". In contrast, a 16-bit data value range is assigned to each of regions denoted by position information "−1" and "+1".

The data value ranges assigned to the position information are just an example. Thus, this embodiment of the present invention is not limited to this example. In other words, data value ranges may be gradually narrowed in proportion to the distance to the region of the position information "STILL". In the foregoing example, the detectable range of the search bar 30 is divided into 21 regions. However, this embodiment of the present invention is not limited to this example. In other words, the detectable range of the search bar 30 may be more finely or more coarsely divided.

The assignment of the data value ranges of the position information is designated as software by for example the KY microcomputer 44. Thus, depending on the application of the search bar 30, the divided positions of regions on the search bar 30 may be changed.

The KY microcomputer 44 correlates the position information on the search bar 30 with reproduction speed and the reproduction direction of video data reproduced from the record medium. The still reproduction operation that fixedly reproduces one frame is correlated with the position information "STILL" at the center portion on the search bar 30. The right side of the position information "STILL" is correlated with the reproduction operation in the forward direction, whereas the left side of the position information "STILL" is correlated with the reproduction operation in the reverse direction. The reproduction speed is correlated with the distance from the region corresponding to the position information "STILL".

3-2. Reproduction Control Using Search Bar

Reproduction control modes of the search bar 30 will be described in brief. According to an embodiment of the present invention, as reproduction control modes using the search bar 30, there are three operation modes that are a jog mode, a shuttle mode, and a slow mode.

In the jog mode, the reproduction operation is performed at the speed and in the direction corresponding to the position that the user's finger has touched the search bar 30. When the user's finger has been released from the search bar 30 and does not operate it, the still reproduction operation is performed. A frame that was reproduced immediately before the user's finger has been released from the search bar 30 is fixedly reproduced. According to this embodiment of the present invention, in the jog mode, the reproduction operation can be performed in both the forward and reverse directions. The reproduction speed can be gradually changed from the still reproduction operation to ±one-time reproduction operation. In other words, in the jog mode, the reproduction speed can be gradually changed from 0 speed (still reproduction operation) to one-time speed in both the forward and reverse directions.

In the shuttle mode, the reproduction operation is performed at the speed and in the direction corresponding to the position that the user's finger has touched on the search bar 30. When the user's finger has been released from the search bar 30 and does not operate it, the reproduction operation is performed at the reproduction speed and in the direction corresponding to the position from which the user's finger has been just released on the search bar 30. According to this embodiment of the present invention, in the shuttle mode, the reproduction operation can be performed in both the forward and reverse directions. The reproduction operation can be performed at a speed higher than one-time speed in both the forward and reverse directions. For example, the reproduction speed can be gradually changed from the still reproduction operation to ±20-time reproduction operation. In other words, the reproduction speed can be gradually changed from the 0 speed to 20-time speed.

In the jog mode and the shuttle mode, low resolution video data that are generated and recorded along with high resolution main video data are used as reproduction video data.

In the slow mode, the reproduction operation is performed at the speed and in the direction corresponding to the position that the user's finger has touched on the search bar 30. When the user's finger has been released from the search bar 30 and does not operate it, the reproduction operation is performed at the speed corresponding to the position from which the user's finger has been just released on the search bar 30. According to this embodiment of the present invention, in the slow mode, the reproduction operation is performed in the forward direction. The reproduction speed can be gradually changed from the still reproduction operation to one-time speed reproduction operation.

In the slow mode, high resolution main video data are used as reproduction video data. In the slow mode, the reproduction operation can be performed in the reverse direction.

FIG. 18A, FIG. 18B, and FIG. 18C show an example of the relationship of the position on the search bar 30 and the reproduction speed in each of the jog mode, the shuttle mode, and the slow mode. In FIG. 18A to FIG. 18C, "+" of the reproduction speed represents the reproduction operation in the forward direction, whereas "−" of the reproduction speed represents the reproduction operation in the reverse direction. "STILL" of the reproduction speed represents the still reproduction of which one frame is fixedly reproduced at 0 reproduction speed.

In the jog mode exemplified in FIG. 18A, the still reproduction operation is performed in the region corresponding to position information "STILL". For example, the reproduction operation is performed in the forward direction at "+0.03" time reproduction speed in the region corresponding to position information "+1". The reproduction speed is gradually increased in proportion to the distance to the region corresponding to position information "STILL". The reproduction speed in the regions corresponding to position information "+9" and "+10" is one-time speed. Like the reproduction operation in the forward direction, when the reproduction operation is performed in the reverse direction, the reproduction speed is changed corresponding to position information.

In the shuttle mode exemplified in FIG. 18B, the still reproduction operation is performed in the region corresponding to position information "STILL". For example, the reproduction operation is performed in the forward direction at "+0.03" time reproduction speed in the region corresponding to position information "+1". The reproduction speed is gradually increased in proportion to the distance to the region corresponding to position information "STILL". The reproduction speed in the region corresponding to position information "+6" is one-time speed. The reproduction speed in the region corresponding to position information "+10" is 20-time speed. Like the reproduction operation in the forward direction, when the reproduction operation is performed in the reverse direction, the reproduction speed is changed corresponding to position information.

In the slow mode exemplified in FIG. 18C, the still reproduction operation is performed in the region corresponding to position information "STILL". Like the foregoing jog mode, when the reproduction operation is performed in the forward direction, the reproduction speed is changed. However, according to this embodiment of the present invention, in the slow mode, the reproduction operation cannot be performed in the reverse direction. Thus, all position information that represents the reproduction operation in the reverse direction is correlated with the still reproduction operation. Thus, while the reproduction operation is being performed in the forward direction, if the user's finger touches a position that represents the reproduction operation in the reverse direction, the reproduction operation in the forward direction is changed to the still reproduction operation. While the still reproduction operation is being performed in the still mode, if the user' finger touches a position that represents the reproduction operation in the reverse direction, the still reproduction operation is kept. At this point, it is preferred that the user be informed that he or she has performed an improper operation with for example beep sound.

The relationship of the position information and the data value of digital data that is output from the control module 47 shown in FIG. 17 and the relationship of the position information and the reproduction speed and the reproduction direction shown in FIG. 18A to FIG. 18C are pre-stored for example in the ROM (Read Only Memory) (not shown) of the KY microcomputer 44. Instead, a plurality of different relationships may be pre-stored in the ROM and one of them may be selected for example on the setup menu screen.

When the position information that represents the position on the search bar 30 is correlated with the reproduction speed and the reproduction direction, the following operations can be performed. When the user's finger touches a particular position on the search bar 30, the reproduction operation can be performed at the speed and in the direction corresponding to the position that the user's finger has touched. In the shuttle mode, after the user's finger has touched a particular position, if it touches another position, the reproduction speed and the reproduction direction can be quickly changed. When the user touches the search bar 30 with his or her finger and horizontally slides it thereon, the reproduction speed can be gradually increased or decreased.

In addition, as described with reference to FIG. 17, according to this embodiment of the present invention, the regions corresponding to the position information at the center and near the center of the search bar 30 are wider than other regions. Thus, the detection sensitivity of the regions at the center and near the center of the search bar 30 is low. As a result, the stop operation and the frame operation as the reproduction control can be easily performed.

3-3. Indications of Search Bar

As described above, according to an embodiment of the present invention, in the LED substrate module 43, a plurality of light emitting devices such as LEDs are disposed along the search bar 30. With the light emitting devices, operations on the search bar 30 can be indicated. For example, in the LED substrate module 43, the KY microcomputer 44 controls light emission of the LEDs with the position information generated corresponding to the detected result of the position on the search bar 30.

Next, with reference to FIG. 19A, FIG. 19B, FIG. 19C, and FIG. 19D, the light emission control of the LEDs will be described. As exemplified in FIG. 19A, when the position detectable range of the search bar 30 is surrounded by a dotted line, a total of 21 LEDs that are 10 LEDs 34, 34, . . . , 34, one LED 35, and 10 LEDs 36, 36, . . . , 36 are disposed. For example, the 10 LEDs 34, 34, . . . , 34 correspond to the position information "−10" to "−1" in the reverse direction. Likewise, the 10 LEDs 36, 36, . . . , 36 correspond to the position information "+1" to "+10" in the forward direction. The center LED 35 corresponds to the position information "STILL".

In addition, backlight LEDs 33 and 37 are disposed on the left and right of the position detectable range of the search bar 30. The backlight LEDs 33 and 37 correspond to the reproduction operation in the reverse direction and the reproduction operation in the forward direction, respectively. The backlight LEDs 33 and 37 indicate the direction in which the reproduction control can be performed on the search bar 30.

Figure 19A:
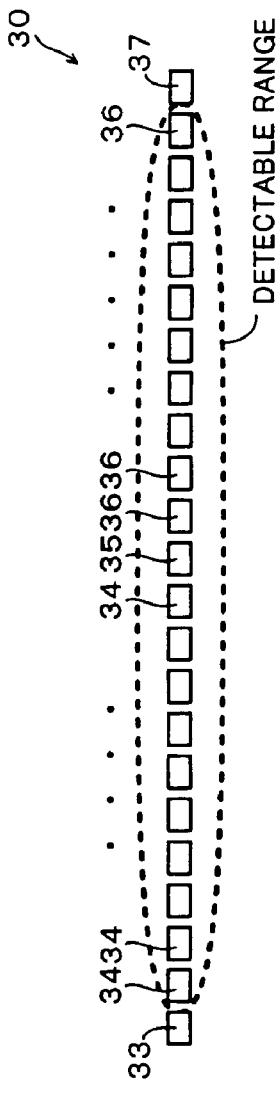
FIG. 19A, FIG. 19B, FIG. 19C, and FIG. 19D are schematic diagrams describing indications on the search bar.

When the function of the search bar 30 has been tuned off, as exemplified in FIG. 19A, all the LEDs 34, 34, . . . , 34, the LED 35, the LEDs 36, 36, 36, and the LEDs 33 and 37 disposed on the search bar 30 are turned off.

Figure 19B:
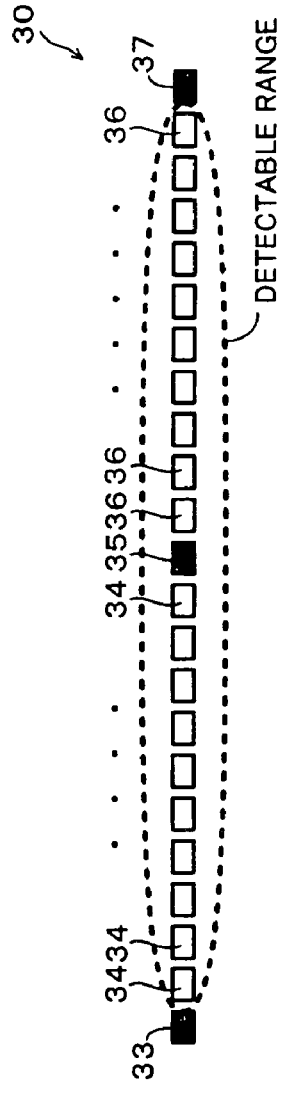

FIG. 19B shows an example of the state of the LEDs in which the search bar 30 can be used and the still reproduction operation is performed. When the still reproduction operation is performed, the center LED 35 is turned on, which indicates that the still reproduction operation is performed. In addition, the backlight LEDs 33 and 37 are turned on, which indicate that the current state can be changed to the reproduction operation in the forward direction and the reproduction operation in the reverse direction.

Figure 19C:
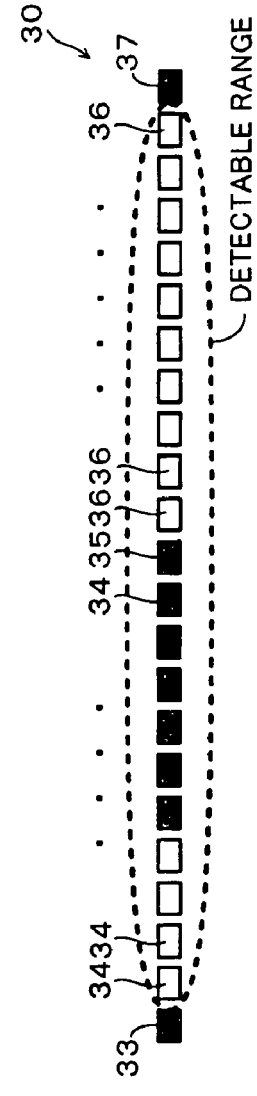

FIG. 19C shows an example of the state of the LEDs in which the search bar 30 is operated in the jog mode or the shuttle mode and the user's finger is touching the search bar 30. In the jog mode and the shuttle mode, a plurality of LEDs from the center LED 35 to the LED at the position that the user's finger has touched on the search bar 30 are simultaneously turned on. In the example shown in FIG. 19C, the user's finger has touched the position corresponding to position information "−6" on the search bar 30.

Depending on whether the LEDs 34, 34, . . . , 34 or the LEDs 36, 36, . . . , 36 are turned on, the user can know the reproduction direction. The reproduction speed is indicated with the number of LEDs 34, 34, . . . , 34 or LEDs 36, 36, . . . , 36 that are turned on against the center LED 35. Thus, the user can intuitively know the reproduction speed and the reproduction direction with the indications of the LEDs.

In the jog mode and the shuttle mode, when the user's finger touches any position on the search bar 30, the reproduction control is performed so that the reproduction operation is performed at the reproduction speed and the reproduction direction corresponding to the position that the user's finger has touched on the search bar 30. When the state of the LEDs is as shown in FIG. 19C, if the user's finger touches the position corresponding to the position information "+10" in the shuttle mode, the reproduction control is performed so that the reproduction operation at one-time speed in the reverse direction is quickly changed to the reproduction operation at 20-time speed in the forward direction. In other words, in the jog mode and the shuttle mode, since the reproduction operation can be performed in both the forward and reverse directions, both the backlight LEDs 33 and 37 are simultaneously turned on.

When the user's finger is released from the search bar 30, the indications of the LEDs depend on whether the mode is the jog mode or the shuttle mode. In other words, in the jog mode, when the user's finger is released from the search bar 30, the still reproduction operation is performed. Thus, the LEDs indicates that the still reproduction operation is performed as shown in FIG. 19B. As a result, the center LED 35 and the backlight LEDs 33 and 37 are turned on.

On the other hand, in the shuttle mode, when the user's finger is been released from the search bar 30, the reproduction operation at the reproduction speed in the reproduction direction corresponding to the position from which the user's finger has been released on the search bar 30 is kept. Thus, the indications of the LEDs are kept in the state corresponding to the position from which the user's finger has been released on the search bar 30. When the user's finger has been released from the search bar 30 in the shuttle mode in the state shown in FIG. 19C, until the user's finger touches the search bar 30, the state shown in FIG. 19C is kept. The reproduction operation is performed at the reproduction speed in the reproduction direction in the state shown in FIG. 19C.

Figure 19D:
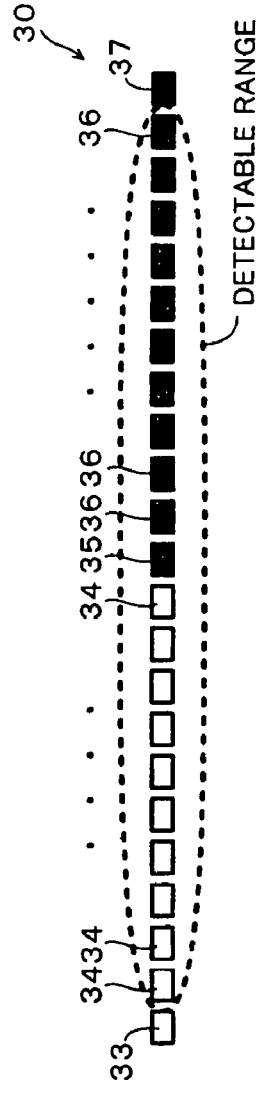

FIG. 19D shows an example of the state of the LEDs in which the search bar 30 is operated in the slow mode. According to this embodiment of the present invention, in the slow mode, the reproduction operation is performed only in the forward direction. Thus, only the backlight LED 37, which indicates the reproduction operation in the forward direction, is turned on and the LED 33 is turned off. Like the foregoing jog mode and shuttle mode, the LED 35 and the LEDs 36, 36, ..., 36 corresponding to the reproduction speed are turned on.

3-4. Switching of Operation Modes of Search Bar

Three operation modes of the search bar 30 can be selected with the search mode keys 28A, 28B, and 28C shown in FIG. 11, respectively. The search mode key 28A causes the search bar 30 to operate in the shuttle mode. The search mode key 28B causes the search bar 30 to operate in the jog mode. The search mode key 28C causes the search bar 30 to operate in the slow mode.

While the search bar 30 is operating in any operation mode, it is preferred that the operation mode of the search bar 30 not be switched with the search mode keys 28A, 28B, and 28C. In this example, when the user's finger is released from the search bar 30 and then touches it again, the operation mode is switched to a new operation mode.

For example, when the operation mode of the search bar 30 is the shuttle mode and the user's finger is released from the search bar 30, if the reproduction operation is kept at the reproduction speed and in the reproduction direction corresponding to the position that the user's finger has touched on the search bar 30, even if the user operates the search mode key 28B, the operation mode of the search bar 30 is not switched to the jog mode. After the user operates the search mode key 28B, when the user's finger touches the search bar 30 again, the operation mode of the search bar 30 is switched to the jog mode.

Each of the search mode keys 28A, 28B, and 28C has two light emission devices that are composed of for example LEDs. In combination of the ON states of these LEDs of the search mode keys 28A, 28B, and 28C, the current operation mode of the search bar 30 and the new operation mode of the search bar 30 selected by the search mode keys 28A, 28B, and 28C are indicated.

The indications of the operation modes of the search bar 30 will be described with reference to FIG. 20A, FIG. 20B, FIG. 20C, and FIG. 20D. Since the shapes of the search mode keys 28A, 28B, and 28C are the same in FIG. 20A to FIG. 20C, these keys are generally referred to as the search mode key 28. As exemplified in FIG. 20A, the search mode key 28 has an LED 29A that illuminates the outside of the key and an LED 29B that illuminates the center portion of the key.

Figure 20A:
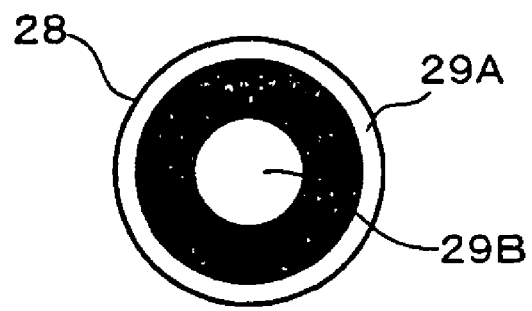
FIG. 20A, FIG. 20B, FIG. 20C, and FIG. 20D are schematic diagrams describing indications of a search mode key.
Figure 20B:
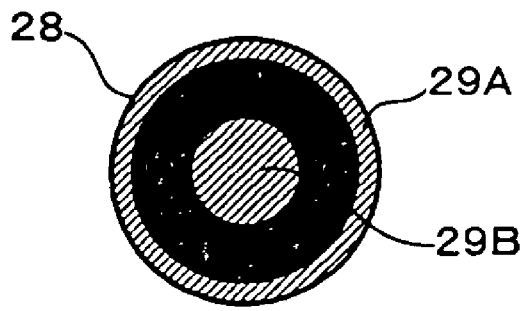
Figure 20C:
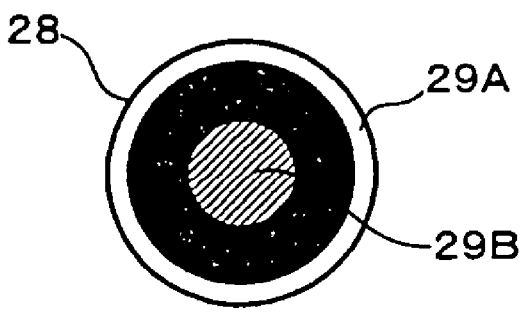
Figure 20D:
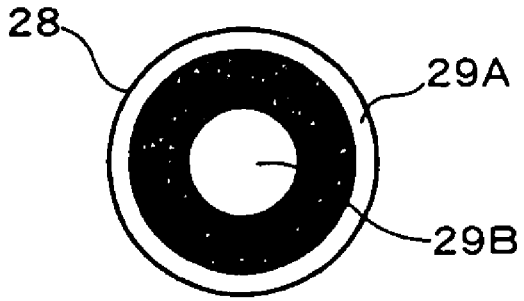

When the operation mode of the search bar 30 has not been selected, as shown in FIG. 20B, both the LED 29A and the LED 29B are turned off. When the operation mode of the search mode key has been selected and the operation mode of the search bar 30 is not the operation mode of the search mode key, as shown in FIG. 20C, the LED 29A outside the key is turned on, but the LED 29B at the center portion of the key is not turned on. When the current operation mode of the search bar 30 is the operation mode selected by the search mode key, as shown in FIG. 20D, both the LED 29A and the LED 29B are turned on.

It is preferred that when the user's finger touches each key and the search bar 30 composed of the touch panel, predetermined sound be output. For example, in the structure shown in FIG. 13, a sound output section (not shown) is connected to the KY microcomputer 44. When the touch panel section 42 has detected that the user's finger has touched a key or the search bar 30, the KY microcomputer 44 controls the sound output section to generate a predetermined sound. For example, when a key on the touch panel is pressed one time, a beep sound is generated one time. When two or more keys are pressed in combination, a beep sound is generated two times. Likewise, when the touch panel section 42 has detected that the user's finger has touched the search bar 30, a beep sound is generated one time. The sound may be other than a beep sound. It is more preferred that the sound level and sound tone be adjustable. For example, with respect to the sound level, one of "HIGH" level, "LOW" level, and OFF (no sound) may be selected. The sound level and sound tone may be changed with keys.

4. Display Screens of Display Section 4-1. Display Screens

Next, display screens displayed on the display section 10 of the front panel 2 will be described. There are three types of screens on which pictures corresponding to video data reproduced from an optical disc and pictures corresponding to video data that are input from the outside of the apparatus are monitored. In the following description, video data reproduced from the optical disc and video data that are input from the outside of the apparatus are generally referred to as video data.

As the three types of screens, there are a status screen as the first screen, a function screen as the second screen, and a monitor screen as the third screen. The monitor screen is a screen on which pictures corresponding to video data are displayed. The status screen is a screen on which pictures corresponding to video data, information about the video data, and information about audio data are displayed. The function screen is a screen on which pictures corresponding to video data, information about video data, information about audio data, and functions and states of the function keys 20, 20, . . . are displayed Next, with reference to FIG. 21A, FIG. 21B, FIG. 22A, FIG. 22B, FIG. 23A, and FIG. 23B, examples of the monitor screen, the status screen, and the function screen will be described.

Figure 21A:
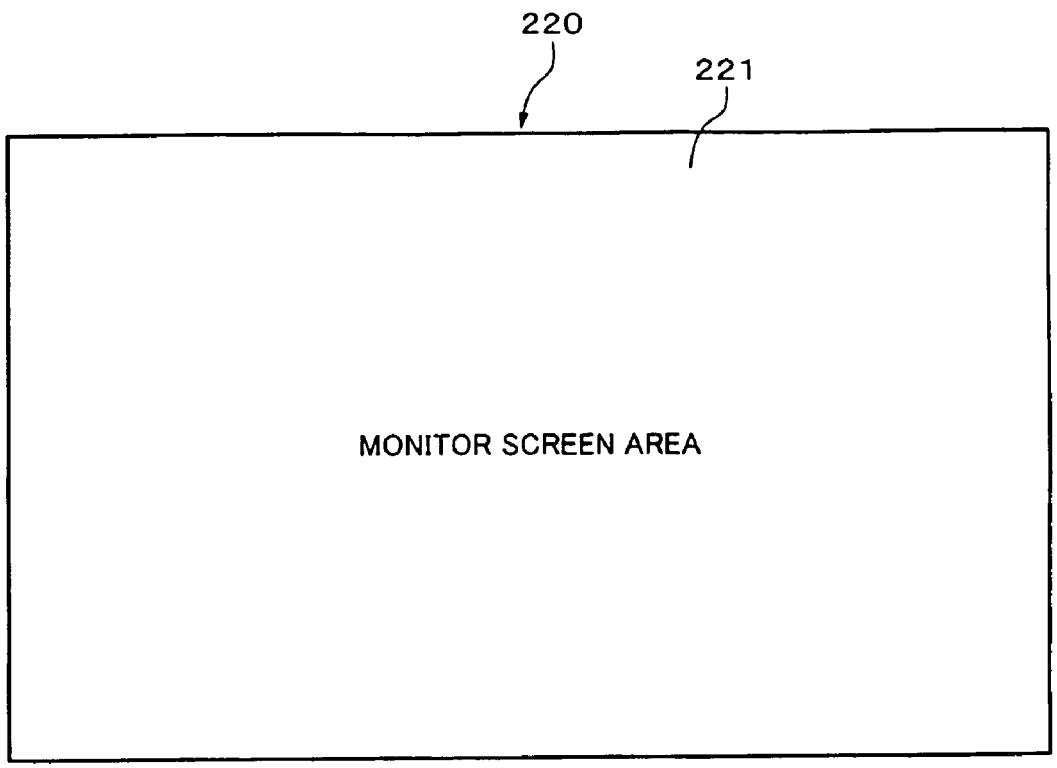
FIG. 21A and FIG. 21B are schematic diagrams showing an example of a screen frame on a monitor screen.
Figure 21B:
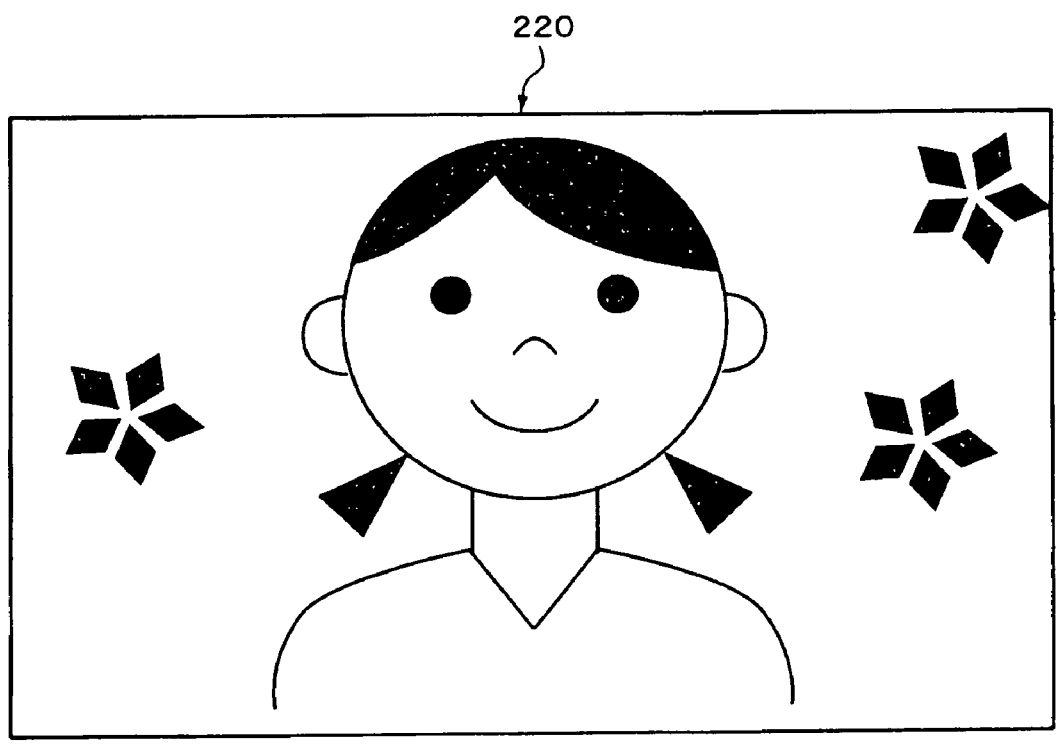

FIG. 21A shows an example of a screen frame of the monitor screen. FIG. 21B shows an example of the monitor screen. A monitor screen 220 has a monitor screen area 221. Displayed on all the monitor screen area 221 are pictures corresponding to video data.

Figure 22A:
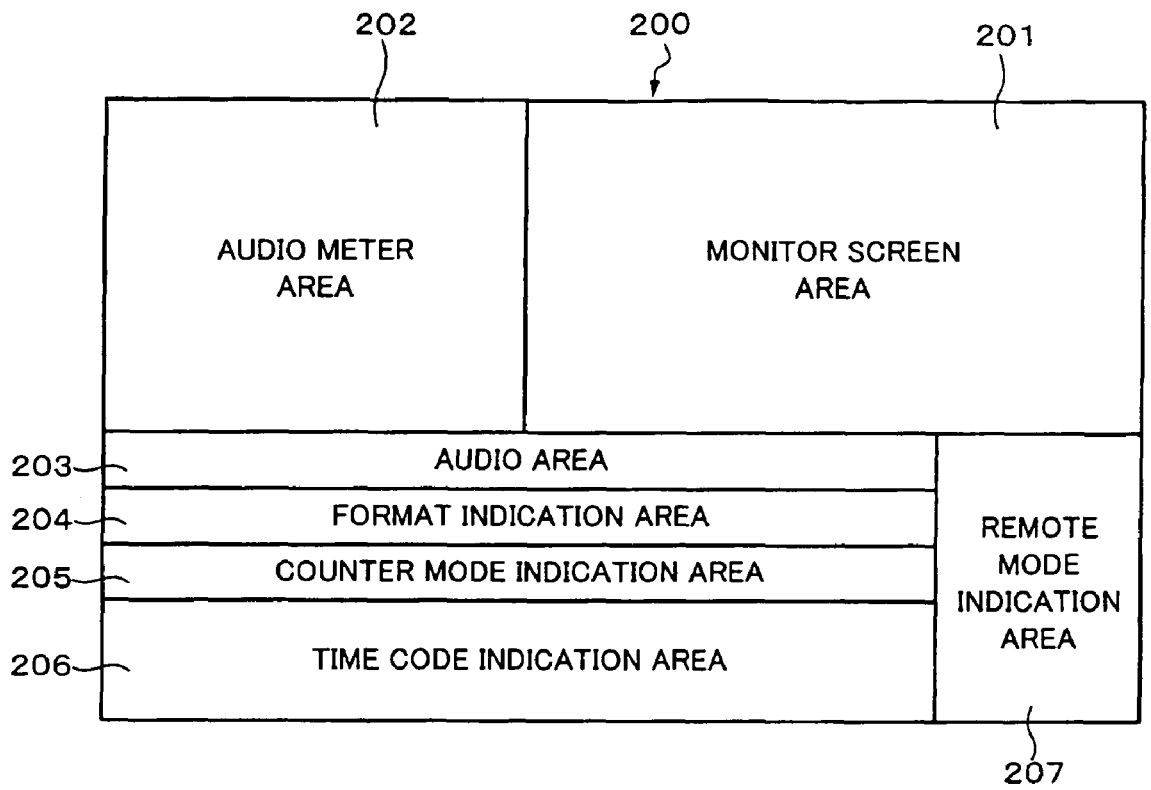
FIG. 22A and FIG. 22B are schematic diagrams showing an example of a screen frame on a status screen.
Figure 22B:
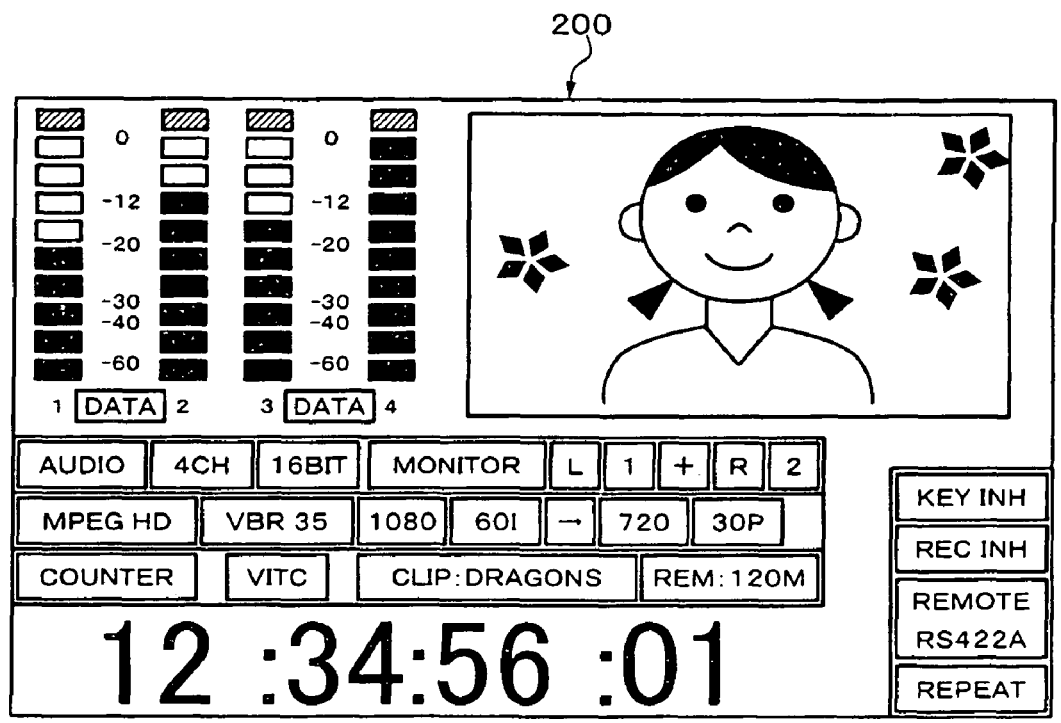

FIG. 22A shows an example of a screen frame of the status screen. FIG. 22B shows an example of the status screen. A status screen 200 has a monitor screen area 201, an audio meter area 202, an audio area 203, a format indication area 204, a counter mode indication area 205, a time code indication area 206, and a remote mode indication area 207.

The monitor screen area 201 is an area in which pictures corresponding to video data are displayed. In the monitor screen area 201, pictures smaller than those displayed on the monitor screen 220 are displayed. The audio meter area 202 is an area in which information about audio levels is indicated. In the audio meter area 202, the levels of up to four currently selected channels of audio signals are indicated.

The audio area 203 is an area in which information about audio signals is indicated. In the audio area 203, the number of channels of audio signals, the number of quantizer bits, channels selected as the L channel and R channel of audio input channels, and so forth are indicated.

The format indication area 204 is an area in which information about a video signal is indicated. In the format indication area 204, MPEG mode, information about variable bit rate of video data compression-encoding process, information about video data display system, and so forth are indicated.

The counter mode indication area 205 is an area in which information about a counter mode is indicated. In the counter mode indication area 205, the type of a time code, a clip name, and so forth are indicated. The time code indication area 206 is an area in which a time code is indicated. The remote mode indication area 207 is an area in which information about a remote mode is indicated. In the remote mode indication area 207, various types of information about a remote mode are indicated.

Figure 23A:
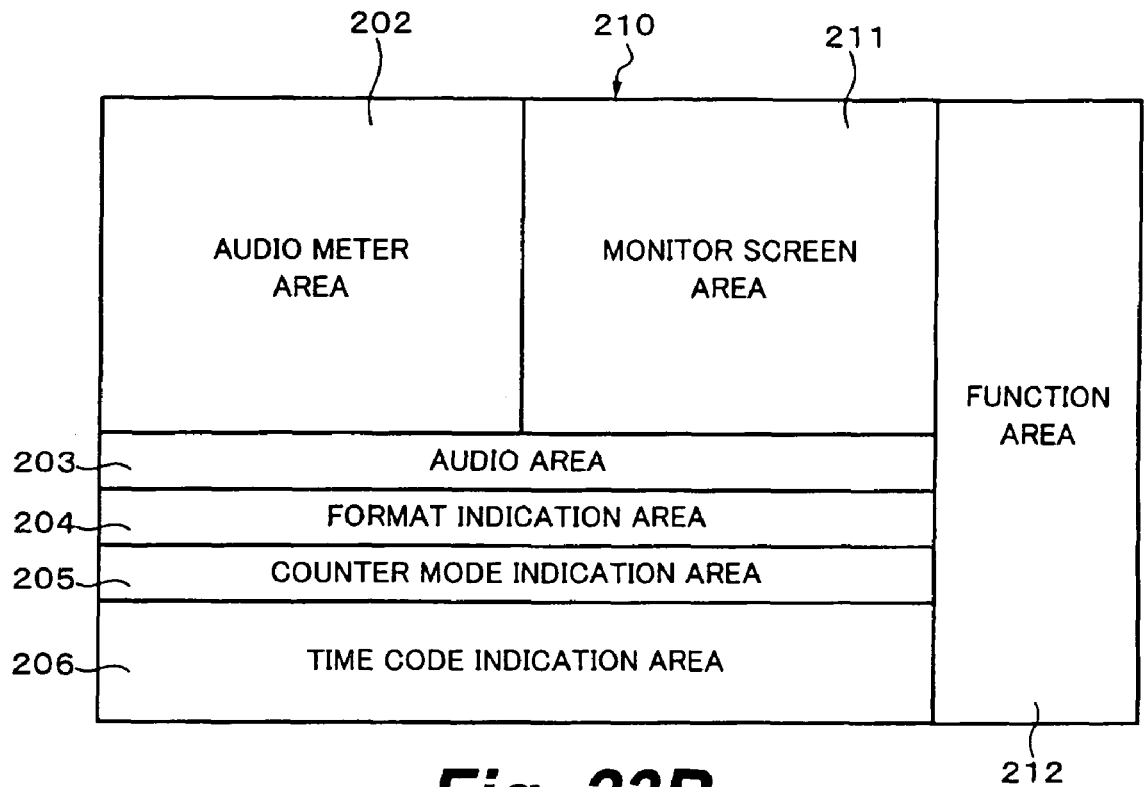
FIG. 23A and FIG. 23B are schematic diagrams showing an example of a screen frame on a function screen.
Figure 23B:
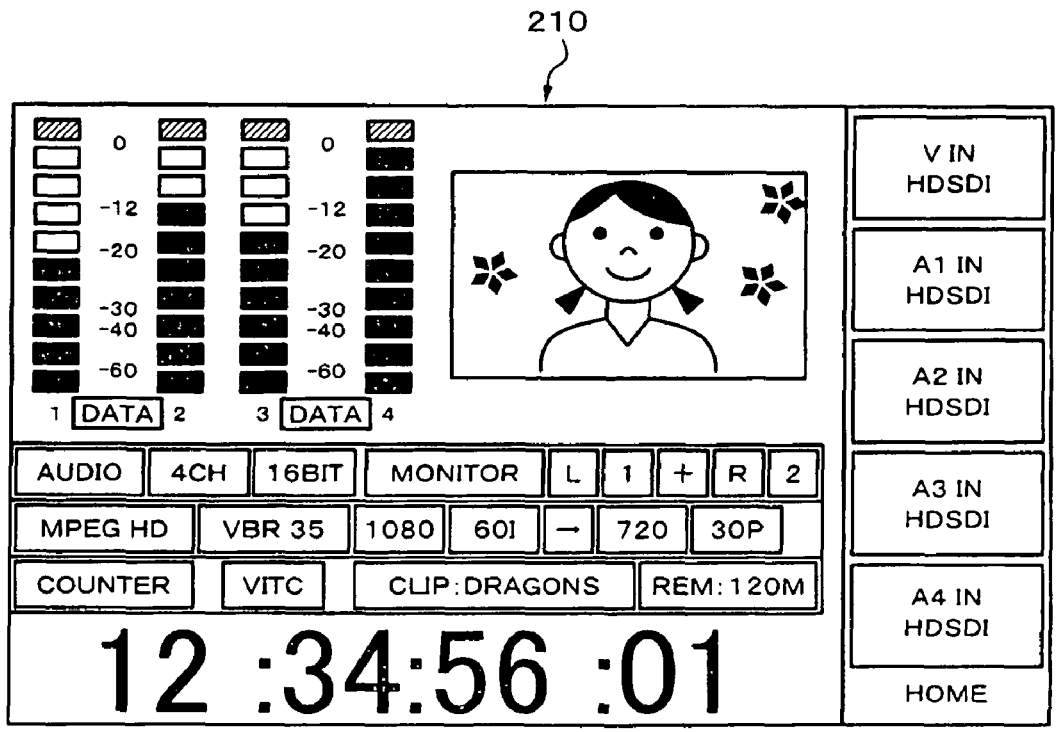

FIG. 23A shows an example of a screen frame of the function screen. FIG. 23B shows an example of the function screen. A function screen 210 has a monitor screen area 211, an audio meter area 202, an audio area 203, a format indication area 204, a counter mode indication area 205, a time code indication area 206, and a function area 212. Since the areas other than the monitor screen area 211 and the function area 212 in the function screen 210 are the same as those of the status screen 200, they are denoted by similar reference numerals and their description will be omitted.

Formed at the right end of the function screen 210 is the function area 212. In the audio meter area 202, the functions and the states of the function keys 20, 20, . . . formed on the right of the function area 212 are indicated. In this example, as the functions of the function keys 20, 20, . . . , in the function area 212, functions "V IN", "A1 IN", "A2 IN", "A3 IN", and "A4 IN" with which input sources of video and four channels of audio are selected are indicated. In the function area 212, "HDSDI" that represents an input source as a state that has been set by the function keys 20, 20, . . . is indicated. In this example, when the function key 20, 20, . . . is pressed, an input source corresponding to the pressed function key 20 is selected. As a result, a corresponding setup state is indicated.

When the page key 21 is pressed, the current set of the function keys 20, 20, . . . is changed to another set of the function keys 20, 20, . . . . In addition, the functions and states of the changed set of the function keys 20, 20, . . . are indicated.

Since the function screen 210 has the function area 212, the monitor screen area 211 of the function screen 210 is narrower than the monitor screen area 201 of the status screen 200. In the monitor screen area 211, pictures smaller than those displayed on the status screen 200 are displayed.

Images displayed in other than the monitor screen area 201 of the status screen 200 and the monitor screen area 211 of the function screen 210 are composed of predetermined graphics data and character data. These graphics data and character data are stored in for example the ROM 53. These data are read when they are displayed on the status screen 200 and the function screen 210. Instead, graphics data and character data may be supplied from the outside of the apparatus through the communication interface 51 or the like.

4-2. Switching Operation of Display Screens

Figure 24:
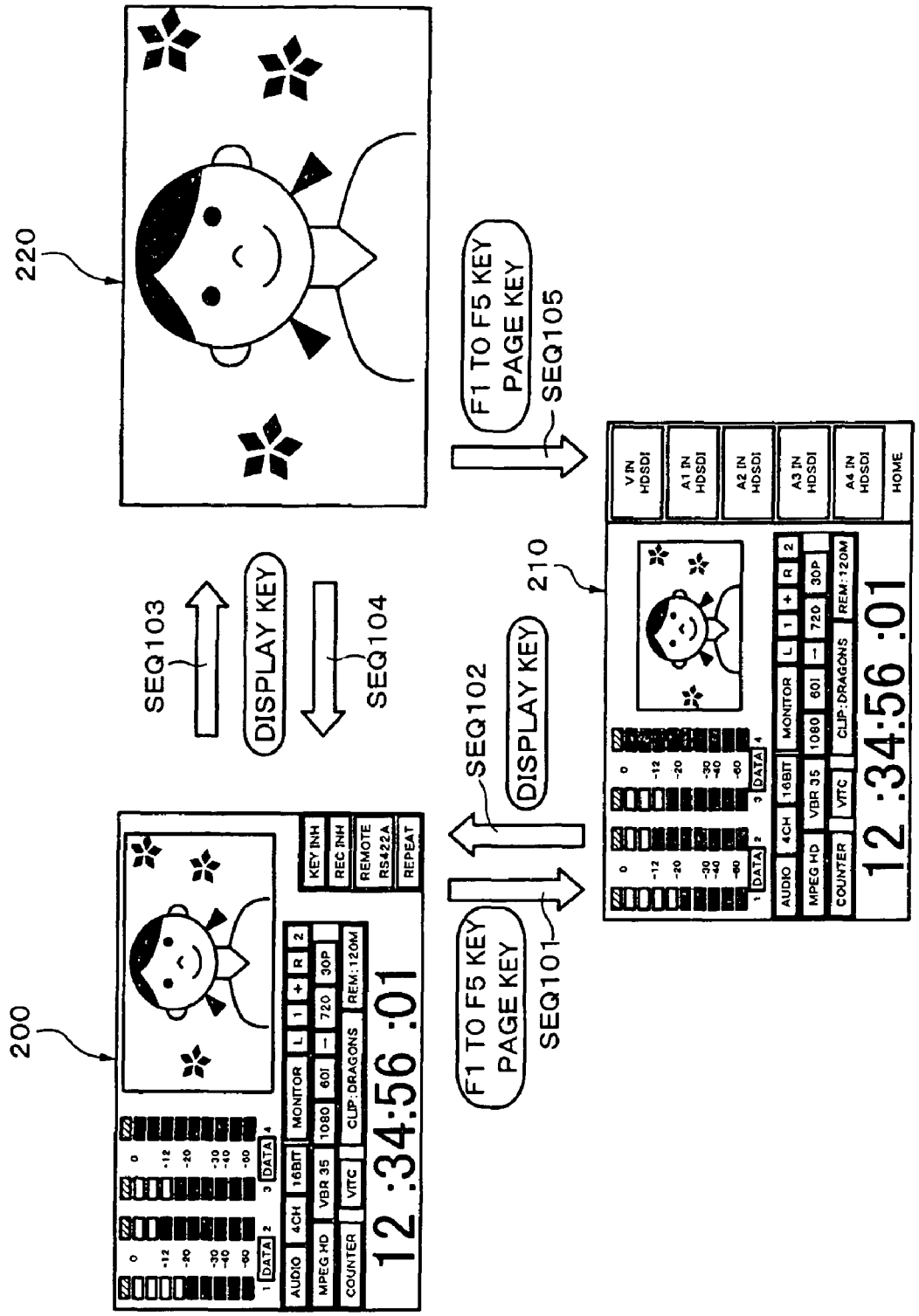
FIG. 24 is a schematic diagram describing an example of a switching operation on a display screen.

Next, with reference to FIG. 24. an example of a screen switching operation thai switches among the status screen 200, the function screen 210. and the monitor screen 220 will be described. FIG. 24 describes an example of the switching operation of the display screens. The default screen of the status screen 200. the function screen 210. and the monitor screen 220 is the status screen 200.

When any key of the function keys 20, 20, . . . or the page key 21 is pressed, the function screen 210 is displayed. Thus, when any key of the function keys 20, 20, . . . is pressed, the function screen 210 can be displayed.

While any screen other than the status screen 200 is displayed, when the display key 22 is pressed, the screen is returned to the status screen 200. When the display key 22 is pressed, the status screen 200 and the monitor screen 220 are alternately displayed Next, an example of the switching operation of the display screens will be described more specifically. While the status screen 200 is displayed, when any key of the function keys 20, 20, . . . or the page key 21 is pressed, the function screen 210 is displayed (at SEQ 101). While the function screen 210 is displayed, when the display key 22 is pressed, the status screen 200 is displayed (at SEQ 102).

While the status screen 200 is displayed, when the display key 22 is pressed, the monitor screen 220 is displayed (at SEQ 103). When the display key 22 is pressed once again, the monitor screen is returned to the status screen 200 (at SEQ 104). While the monitor screen 220 is displayed, when any key of the function keys 20, 20, . . . or the page key 21 is pressed, the function screen 210 is displayed (at SEQ 105).

According to this embodiment of the present invention, when the function screen 210 is switched to the monitor screen 220, the monitor screen 220 is always displayed through the status screen 200. Instead, the function screen 210 may be directly switched to the monitor screen 220.

Figure 25:
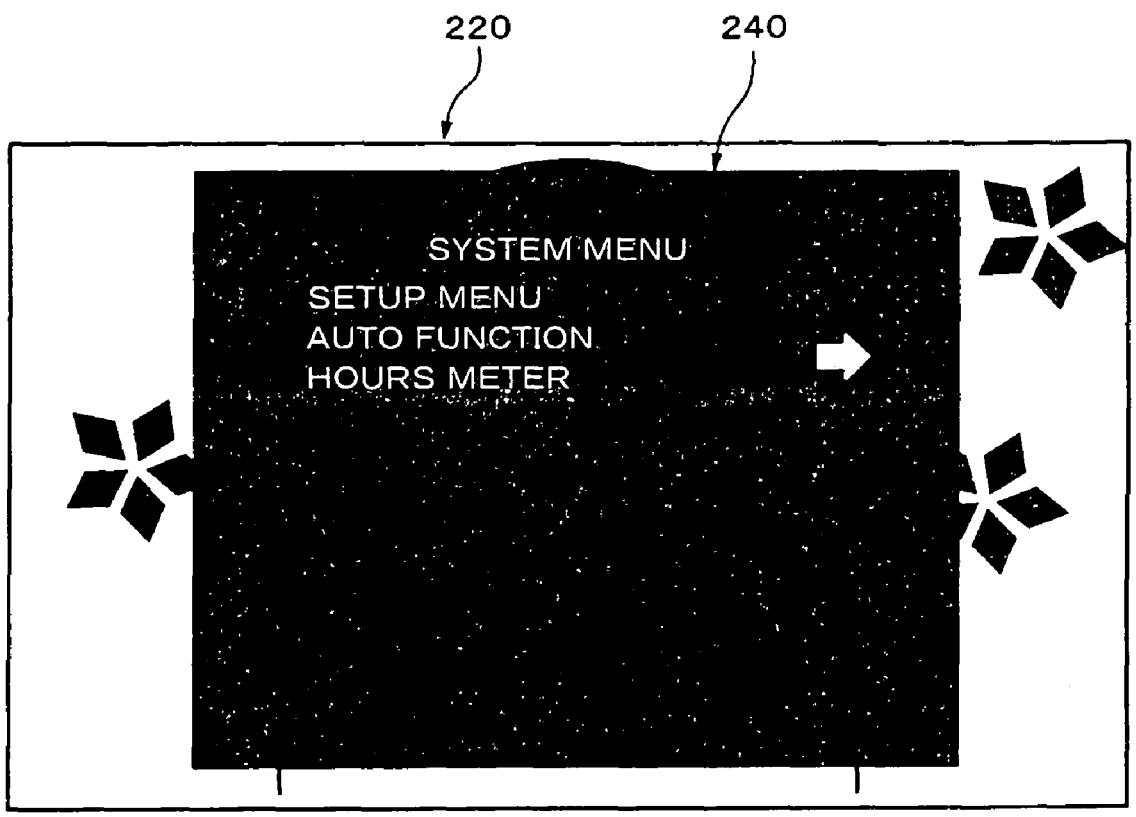
FIG. 25 is a schematic diagram showing an example of which a system menu is displayed while the monitor screen is displayed.
Figure 26:
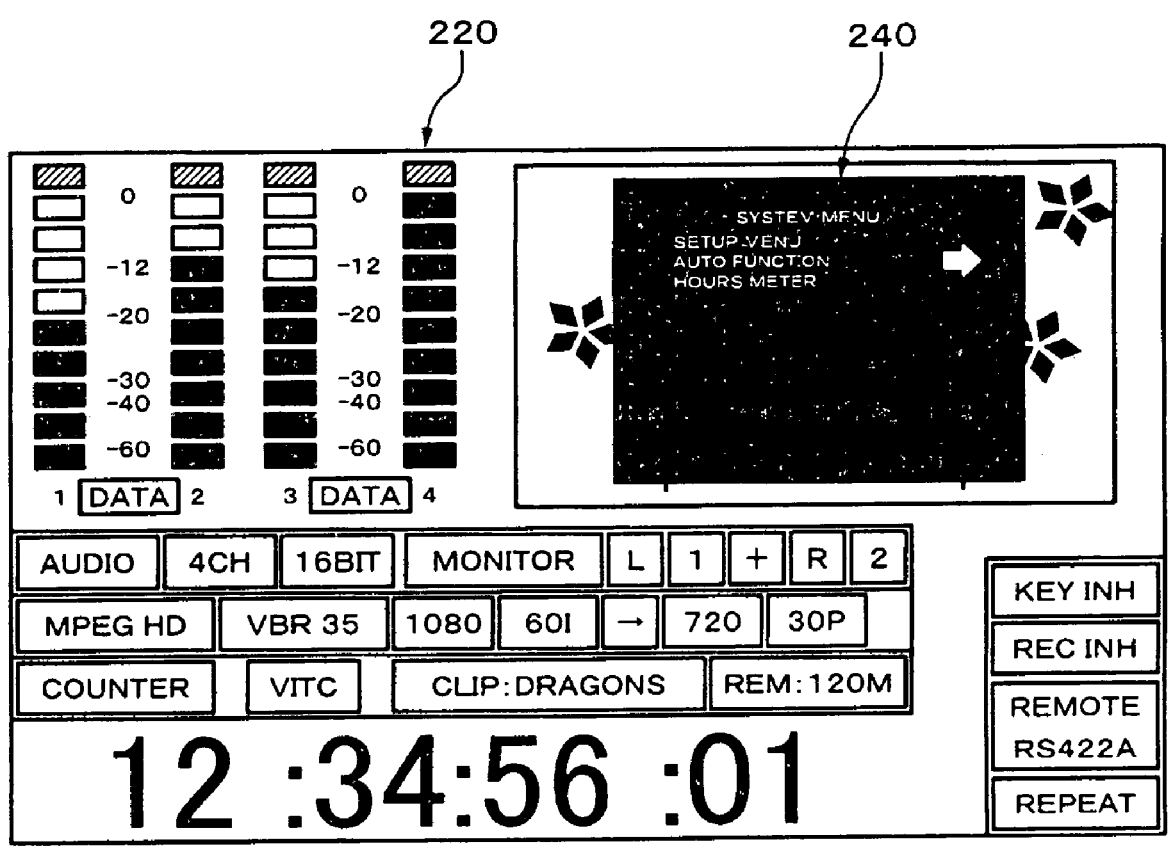
FIG. 26 is a schematic diagram showing an example of which the system menu is displayed while the status screen is displayed.

While the status screen, the function screen, or the monitor screen is displayed, the system menu can be displayed. FIG. 25 shows an example of which while the monitor screen 220 is displayed, the system menu is displayed. FIG. 26 shows an example of which while the status screen 200 is displayed, the system menu is displayed. In this example, while the function screen (not shown) is displayed, the system menu can be displayed.

A system menu screen 240 is superimposed on for example an original picture. The system menu screen 240 indicates a list of system menu items of the record and reproduction apparatus 1. The list of the system menu items includes for example "SETUP MENU", "AUTO FUNCTION", "HOURS METER", and so forth.

With for example the four way keys 27, a desired menu item can be selected from the system menu. When "SETUP MENU" is selected with for example the four way keys 27, the system menu screen is switched to the setup menu screen (not shown). The setup menu screen tabulates items that can be set for the record and reproduction apparatus 1. With for example the four way keys 27, the numeric values of these items and so forth can be set. For example, with the up direction key and the down direction key, an item is selected. With the right direction key and the left direction key, the value of the selected item is increased and decreased, respectively.

With the search bar 30, an item can be selected on the system menu screen 240 and the setup menu screen and the numeric value of the selected item can be set on the setup menu. For example, items on the system menu screen 240 and the setup menu screen are correlated with position information of the search bar 30. In this case, when the user's finger touches a predetermined position on the search bar 30, an item corresponding to the position can be selected. With respect to numeric value setting, when the user's finger touches a position on the right of the center portion (the position corresponding to position information "STILL"), the numeric value is increased. When the user's finger touches a position on the left of the center portion, the numeric value is decreased. When the user's finger touches the center portion, the numeric value is not changed. When the numeric value is increased or decreased, with position information "±1" to "±5", the numeric value may be "finely" set and with the position information "±6" to "±10", the numeric value may be "coarsely" set.

4-3. Structure of Video Process Circuit

Figure 27:
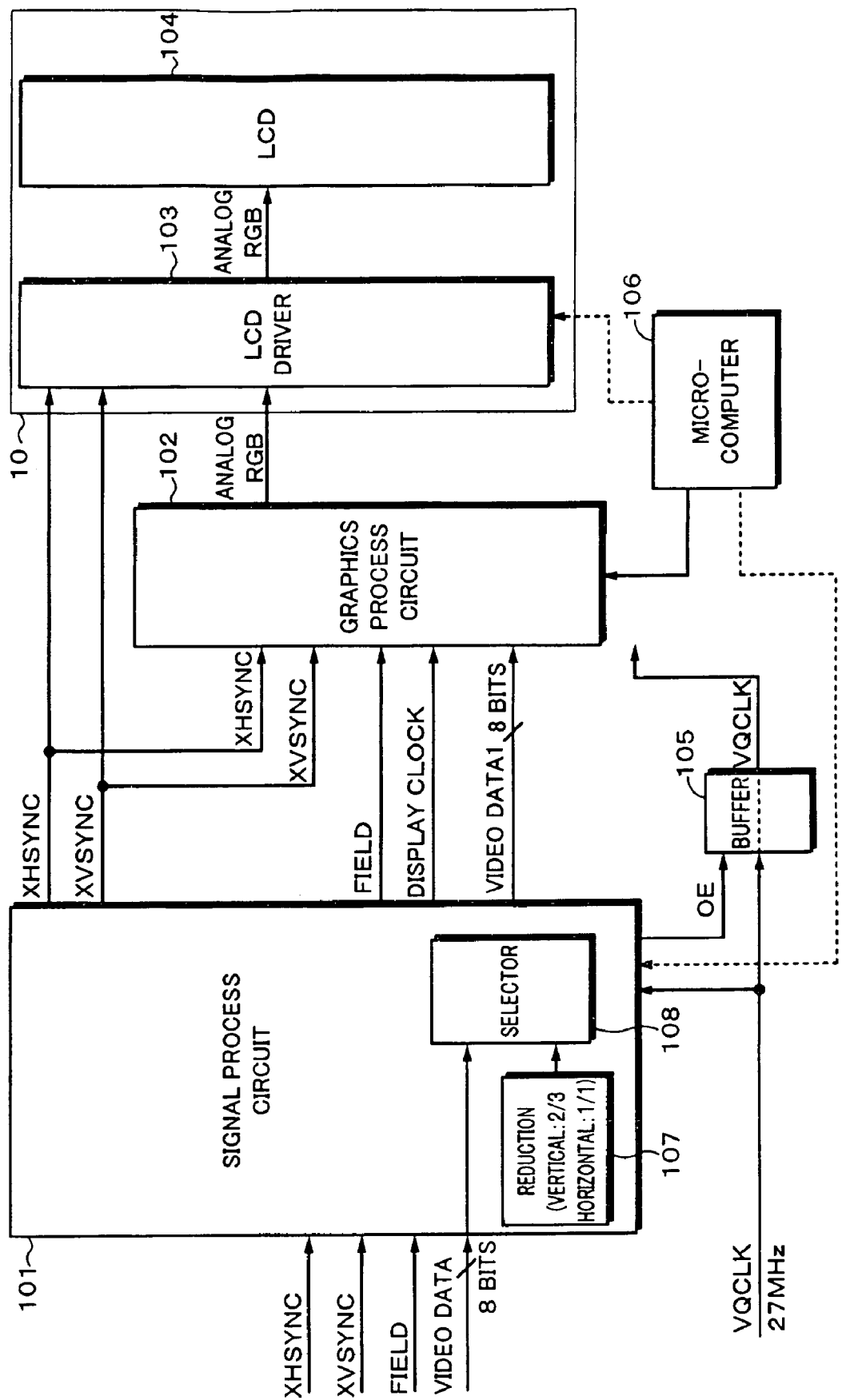
FIG. 27 is a block diagram showing an example of the structure of a video process circuit according to an embodiment of the present invention.

FIG. 27 is a block diagram showing an example of the structure of a video process circuit according to an embodiment of the present invention. The video process circuit has a signal process circuit 101, a graphics process circuit 102, and a display section 10. The graphics process circuit 102 corresponds to for example the graphic driver 93 shown in FIG. 10. The display section 10 has an LCD 104 and a corresponding LCD driver 103. The effective display size of the LCD 104 is for example 373 pixels×224 lines. A microcomputer 106 controls individual sections of the video process circuit. The microcomputer 106 is for example the CPU 52 shown in FIG. 10.

The signal process circuit 101 is for example a PLD (Programmable Logic Device) composed of a programmable logic circuit IC (Integrated Circuit). The PLD is for example an FPGA (Field Programmable Gate Array). The signal process circuit 101 corresponds to for example a part of the FPGA 74 shown in FIG. 10.

A horizontal synchronization signal (XHSYNC), a vertical synchronization signal (XVSYNC), and a field signal that are generated with a reference synchronization signal supplied from the outside of the apparatus are supplied to the signal process circuit 101. The horizontal synchronization signal (XHSYNC) and the vertical synchronization signal (XVSYNC) that are output from the signal process circuit 101 are supplied to the graphics process circuit 102 and the LCD driver 103. The field signal that is output from the signal process circuit 101 is supplied to the graphics process circuit 102. A clock (VQCLK) that has a clock frequency of around 27 MHz is supplied to the signal process circuit 101 and the graphics process circuit 102 through a buffer 105.

For example, HD format video data are down-converted and horizontally expanded to 1440 pixels×480 lines. The horizontally expanded video data are supplied to the graphics process circuit 102 through the signal process circuit 101. When the signal process circuit 101 receives a reduction process command from the microcomputer 106, the signal process circuit 101 performs a reduction process for the supplied video data and supplies the reduced video data to the graphics process circuit 102. More specifically, the signal process circuit 101 has a reduction circuit 107 and a selector 108. The selector 108 reduces the video data under the control of the reduction circuit 107 and supplies the reduced video data to the graphics process circuit 102. For example, the reduction circuit 107 controls the selector 108 corresponding to a command supplied from the microcomputer 106. The selector 108 thins out lines of the video data corresponding to a command received from the reduction circuit 107 and supplies the thinned-out video data to the graphics process circuit 102.

The signal process circuit 101 outputs a display clock and supplies it to the graphics process circuit 102. The display clock is generated by for example the signal process circuit 101 corresponding to the clock (VQCLK). The signal process circuit 101 has for example a PLL (Phase Locked Loop). The PLL of the signal process circuit 101 multiplies the display clock supplied to the graphics process circuit 102 corresponding to a command received from the microcomputer 106.

The graphics process circuit 102 has a frame memory. Video data supplied from the signal process circuit 101 are written to the frame memory corresponding to a capture enable signal supplied from the microcomputer 106. Video data are read from the frame memory corresponding to the display clock. The video data are converted into analog data and supplied as an RGB signal to the LCD driver 103. Video data are input and output to and from the graphics process circuit 102 corresponding to the capture enable signal and the display enable signal supplied from the microcomputer 106.

The graphics process circuit 102 has a reduction function for video data supplied from the signal process circuit 101. For example, the graphics process circuit 102 reduces the vertical size and horizontal size of video data supplied from the signal process circuit 101 to ¼ and ¼ or ⅙, respectively. The reduction function can be accomplished by thinning out video data that are read from the frame memory in a predetermined manner. The graphics process circuit 102 maps character data and graphics data supplied from the microcomputer 106 and reduced video data supplied from the signal process circuit 101 to the frame memory in a predetermined manner and outputs one image. The graphics process circuit 102 reads data from the frame memory corresponding to the display enable signal supplied from the microcomputer 106 and corresponding to the display clock, converts the data into analog data, and supplies the analog data as an analog RGB signal to the LCD driver 103. The character data and the graphics data are displayed in other than the monitor display areas of the status screen and the function screen.

The display section 10 displays a screen corresponding to the RGB analog signal supplied from the graphics process circuit 102. The display section 10 has for example a LCD driver 103 and an LCD 104. The LCD driver 103 drives the LCD 104 under the control of the microcomputer 106. The LCD driver 103 thins out the analog RGB signal supplied from the graphics process circuit 102 corresponding to the size of the LCD 104 and supplies the thinned-out signal to the LCD 104. The LCD 104 displays a picture corresponding to the analog RGB signal supplied from the LCD driver 103.

4-4. Switching Operation of Display Modes

Figure 28:
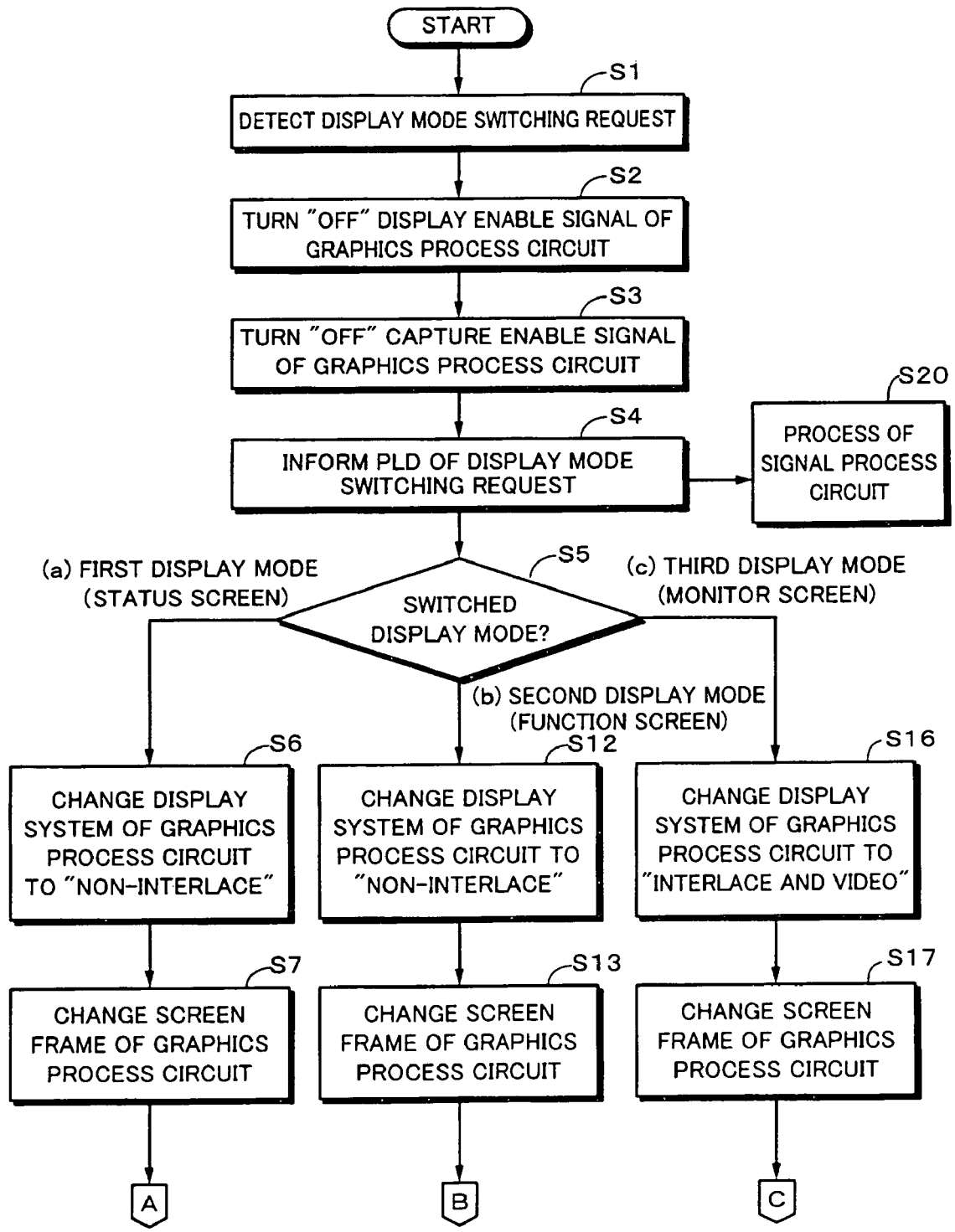
FIG. 28 is a flow chart describing an example of a display mode switching operation.
Figure 29:
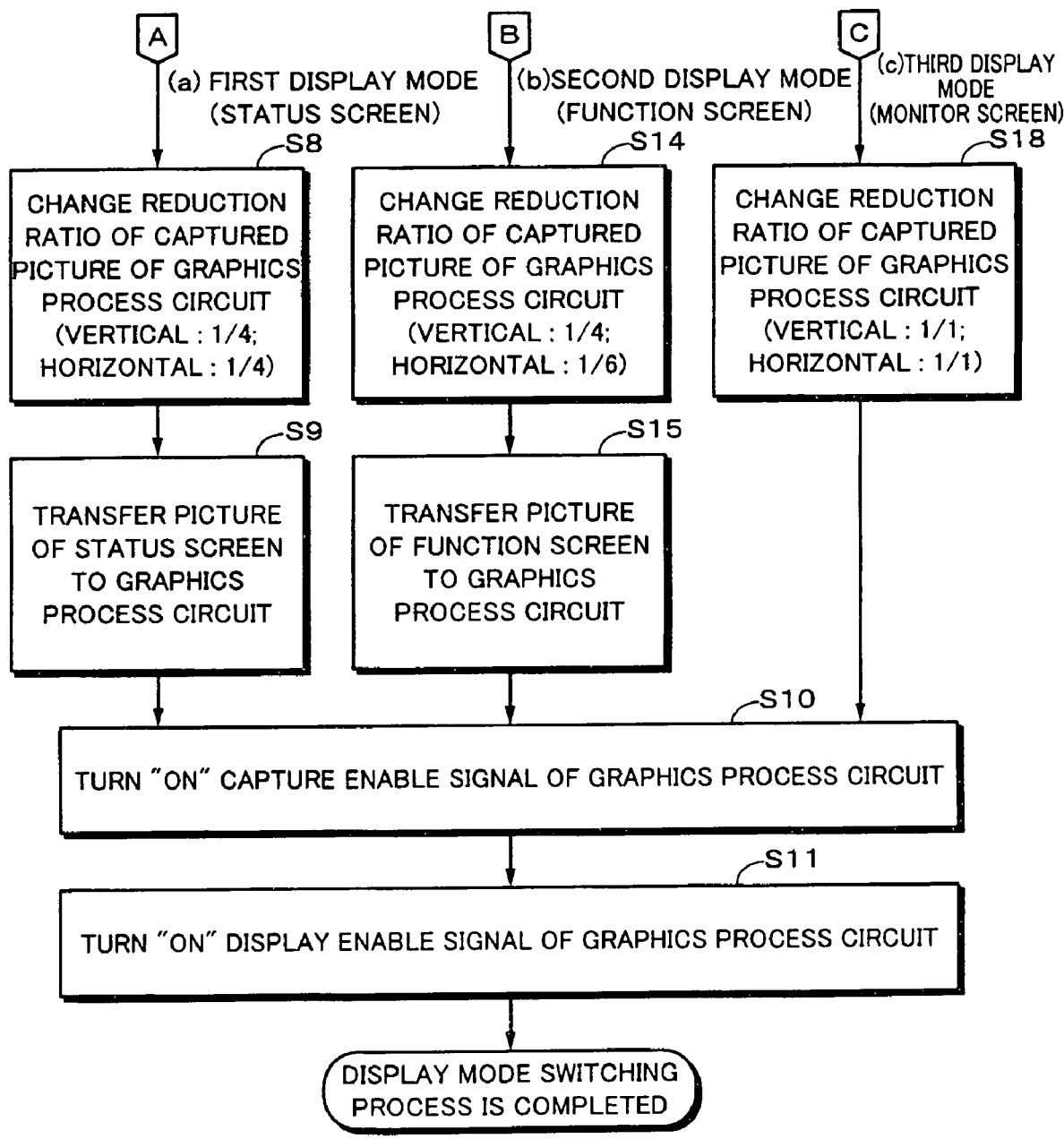
FIG. 29 is a flow chart describing the example of the display mode switching operation.

FIG. 28 and FIG. 29 are flow charts describing an example of switching operations of the display modes. In FIG. 28 and FIG. 29, a step denoted by letter "A", "B", or "C" is followed by a step denoted by the same letter.

At step S1, the microcomputer 106 detects that a display mode switching request has been received. The microcomputer 106 detects the display mode switching request with a control signal supplied from the KY microcomputer corresponding to a key and the current display mode. While the monitor screen 220 or the function screen 210 is displayed, when the display key 22 is pressed, the microcomputer 106 detects that a screen switching request for the status screen 200 has been received. While the status screen 200 or the monitor screen 220 is displayed, when one of the function keys 20, 20, . . . or the page key 21 is pressed, the microcomputer 106 detects that a screen switching request for the function screen 210 has been received. While the monitor screen 220 is displayed, when the display key 22 is pressed, the microcomputer 106 detects that a screen switching request for the status screen 200 has been received.

Thereafter, the flow advances to step S2. At step S2, the microcomputer 106 turns off the display enable signal supplied to the graphics process circuit 102 so as to prohibit video data from being output. Thereafter, the flow advances to step S3. At step S3, the microcomputer 106 turns off the capture enable signal supplied to the graphics process circuit 102 so as to prohibit video data from being captured.

Thereafter, the flow advances to step S4. At step S4, the microcomputer 106 informs the signal process circuit 101 of the display mode switching request. Thereafter, the flow advances to step S20. At step S20, the signal process circuit 101 receives the display mode switching request from the microcomputer 106. The signal process circuit 101 performs the display mode switching process.

Thereafter, the flow advances to step S5. At step S5, the flow advances to a step corresponding to the display mode switching request detected at step S1. In other words, when the screen switching request for the status screen 200 has been detected at step Si, the flow advances to step S6. When the screen switching request for the function screen 210 has been detected at step S1, the flow advances to step S12. When the screen switching request for the monitor screen 220 has been detected at step S1, the flow advances to step S16.

(A) First Display Mode

At step S6, the microcomputer 106 changes the display system of the graphics process circuit 102 to the non-interlace system. Thereafter, the flow advances to step S7. At step S7, the microcomputer 106 changes the screen frame of the graphics process circuit 102 to the screen frame of the status screen 200 as shown in FIG. 22A. Thereafter, the flow advances to step S8. At step S8, the microcomputer 106 changes the reduction ratio of the graphics process circuit 102. For example, the microcomputer 106 changes the reduction ratio so that the vertical and horizontal sizes of a captured picture are reduced to ¼, each.

Thereafter, the flow advances to step S9. At step S9, the microcomputer 106 transfers graphics data and character data corresponding to the status screen 200 to the graphics process circuit 102. Thereafter, the flow advances to step S10. At step S10, the microcomputer 106 turns on the video capture enable signal supplied to the graphics process circuit 102 so that the graphics process circuit 102 can capture video data. Thereafter, the flow advances to step S11. At step S11, the microcomputer 106 turns on the display enable signal supplied to the graphics process circuit 102 so that the graphics process circuit 102 can output video data. Thereafter, the display mode switching process is completed.

(B) Second Display Mode

At step S12, the microcomputer 106 changes the display system of the graphics process circuit 102 to the non-interlace system. Thereafter, the flow advances to step S13. At step S13, the microcomputer 106 changes the screen frame of the graphics process circuit 102 to the screen frame of the function screen 210 shown in FIG. 23A. Thereafter, the flow advances to step S14. At step S14, the microcomputer 106 changes the reduction ratio of the graphics process circuit 102 so that the vertical and horizontal sizes of a captured picture are reduced to for example ¼ and ⅙, respectively.

Thereafter, the flow advances to step S15. At step S15, the microcomputer 106 transfers graphics data and character data corresponding to the function screen 210 to the graphics process circuit 102. Like the first display mode, thereafter, the flow advances to step S10 and S11. Thereafter, the display mode switching process is completed.

(C) Third Display Mode

First of all, at step S16, the microcomputer 106 changes the display system of the graphics process circuit 102 to the interlace and video system. Thereafter, the flow advances to step S17. At step S17, the microcomputer 106 changes the screen frame of the graphics process circuit 102 to the screen frame of the status screen 200 shown in FIG. 21A. Thereafter, the flow advances to step S18. At step S18, the microcomputer 106 changes the reduction ratio of the graphics process circuit 102 so that the vertical and horizontal sizes of a captured picture are reduced to for example ½, each.

Thereafter, like the first display mode, the flow advances to step S10 and step S11. Thereafter, the display mode switching process is completed.

Figure 30:
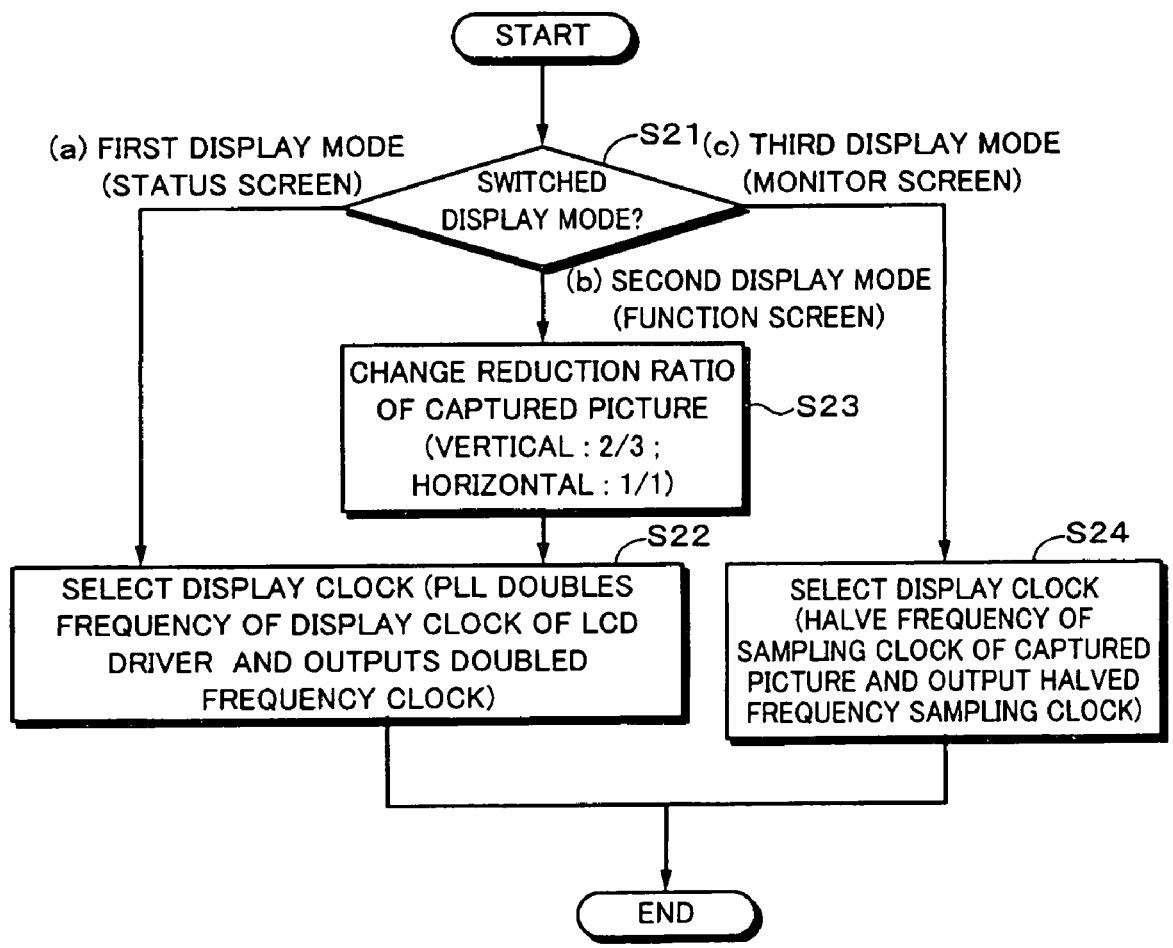
FIG. 30 is a flow chart describing the example of the display mode switching operation.

FIG. 30 is a flow chart describing an example of the display mode switching operation at step S20. First of all, at step S21, the flow advances to a step corresponding to the display mode switching request supplied from the microcomputer 106. When the display mode switching request supplied from the microcomputer 106 is the first display mode, the flow advances to step S22. When the display mode switching request supplied from the microcomputer 106 is the second display mode, the flow advances to step S23. When the display mode switching request received from the microcomputer 106 is the third display mode, the flow advances to step S24.

(a) First Display Mode

At step S22, the signal process circuit 101 selects the display clock and supplies it to the graphics process circuit 102. The PLL of the signal process circuit 101 doubles the frequency of the display clock and outputs the doubled frequency display clock to the graphics process circuit 102.

(b) Second Display Mode

At step S23, the signal process circuit 101 changes the reduction ratio of the captured picture. The signal process circuit 101 controls the selector 108 corresponding to a command received from the microcomputer 106. The selector 108 changes the reduction ratio so that the vertical size and the horizontal size of the captured picture are reduced to for example 2/3 and 1/1 , respectively. Thereafter, the signal process circuit 101 perform the process of step S22.

(c) Third Display Mode

At step S24, the signal process circuit 101 selects the display clock ad supplies it to the graphics process circuit 102. The signal process circuit 101 halves the frequency of the sampling clock of a captured picture and supplies the halved-frequency sampling clock as the display clock to the graphics process circuit 102.

5. Thumbnail Display 5-1. Example of Thumbnail Display and Display Method

Screens displayed on the display section 10 are not limited to the status screen 200, the function screen 210, and the monitor screen 220. For example, as exemplified in FIG. 31A, a thumbnail search screen 230 on which representative pictures of clips recorded on the optical disc 5 are displayed as thumbnail pictures can be displayed on the display section 10 so that the user can easily select a clip.

Thumbnail pictures are mainly used as an index. Since they do not need to have high quality, they can be generated by sub AV data. Since sub AV data have low resolution and low data rate, they can be generated without need to impose a heavy load on the apparatus in comparison with the case that they are generated by main AV data.

When the user performs an operation for the user interface section 7, index file "INDEX.XML" is read from the optical disc 5 so as to obtain information about all clips recorded on the optical disc 5. With reference to clip directories, thumbnail pictures are automatically generated by sub AV data. A thumbnail picture is generated by reading a frame at a predetermined position of sub AV data and performing a picture size conversion process and a color space conversion process for the frame that has been read. As a result, a thumbnail picture is generated.

FIG. 31A shows an example of the thumbnail search screen 230. The thumbnail search screen 230 may be displayed on an external monitor through the output terminal 81, not displayed on the display section 10. The thumbnail search screen 230 tabulates a predetermined number of thumbnail pictures 231, 231, . . . . Displayed at the right end of the thumbnail search screen 230 is a scroll bar 236. A scroll box 237 in the scroll bar 236 indicates a rough position of a selected thumbnail picture 232 in all clips recorded on the optical disc 5.

When the key 23B on the front panel 2 is pressed, a display command for the thumbnail search screen 230 is issued. When the display command for the thumbnail search screen 230 has been issued, the drive system of the spindle motor 112 of the drive section 4 is switched from the CLV drive system to the CAV drive system. The optical disc 5 is accessed corresponding to the CAV drive system and sub AV data are read therefrom in a predetermined manner. Thumbnail pictures 231, 231, . . . displayed on one page of the thumbnail search screen 230 are generated by the sub AV data. The thumbnail pictures 231, 231, . . . are tabulated on the thumbnail search screen 230. In the example shown in FIG. 31A, a total of 12 thumbnail pictures 231 in an array of 3 lines×4 rows are displayed on one page of the thumbnail pictures 231, 231 . . .The thumbnail pictures 231, 231, . . . are arranged and displayed for example in the order they were recorded.

For example, sub AV data are decoded by the sub AV data encoder/decoder 69 and frames used as the thumbnail pictures 231, 231, . . . (for example, first frames of clips) are extracted. The extracted frames are thinned out so that they fit the size of the thumbnail pictures 231, 231 . . .The thinned-out frames are temporarily written to the RAM 65. When frames to be displayed on the thumbnail search screen 230, namely the thumbnail pictures 231, 231 . . . , have been written to the RAM 65, the thumbnail pictures 231, 231, . . . are read from the RAM 65 and supplied to the FPGA 74 through the FPGA 64. On the other hand, the OSD section 55 generates character data displayed on the thumbnail search screen 230 and frame data that compose the selected thumbnail picture 232 and supplies them to the FPGA 74. The FPGA 74 combines them in a predetermined manner and supplies the combined data as video data to the signal process circuit 101.

The frame of a selected thumbnail picture 232 is different from that of a non-selected thumbnail picture 231, 231, . . .

An indication 233 at the upper right of the thumbnail search screen 230 indicates the total number of clips recorded on the optical disc 5 and a clip number of the selected thumbnail picture 232. In the example shown in FIG. 31A, the indication 233 indicates that 300 clips have been recorded on the optical disc 5 and the 234-th clip has been selected.

Indicated above and below the selected thumbnail picture 232 are information about a clip corresponding the selected thumbnail picture 232. An indication 234 indicates a photographed time of the clip corresponding to the selected thumbnail picture 232. An indication 235 indicates the length of the clip.

While the clip corresponding to the selected thumbnail picture 232 has been selected, when for example the playback key 25B of the front panel 2 is pressed, a reproduction command for the clip is issued. When the reproduction command for the clip has been issued, the drive system of the spindle motor 112 of the drive section 4 is switched from the CAV drive system to the CLV drive system. As exemplified in FIG. 31B, the display section 10 displays the monitor screen 220. The reproduction operation for the clip is started. While the monitor screen is displayed, when a thumbnail display command is issued by pressing the key 23B, the monitor screen on the display section 10 is switched to the thumbnail search screen 230.

The currently selected thumbnail picture 232 can be changed by operating the four way keys 27 on the front panel 2 in a predetermined manner. In other words, when any key of the four way keys 27 is pressed, the selected thumbnail picture 232 is changed to a thumbnail picture 231 adjacent to the selected thumbnail picture 232 in the direction that the pressed key indicates.

When an operation switch on the front panel 2 is operated in a predetermined manner, the page of the thumbnail search screen 230 can be changed. For example, when the selected thumbnail picture 232 is a thumbnail picture 231 at the lower left corner of the thumbnail search screen 230, by pressing the down direction key or the right direction key of the four way keys 27, a page change command is issued.

While the thumbnail search screen 230 is displayed, when the page change command is issued, the optical disc 5 is accessed still in the CAV drive system. Thumbnail pictures 231, 231, . . . preceded by these displayed on the thumbnail search screen 230 are read for one screen of the next page from the optical disc 5.

5-2. Selection of Thumbnail Picture Using Search Bar

According to an embodiment of the present invention, a thumbnail picture 231 displayed on the thumbnail search screen 230 can be selected using the search bar 30. In other words, the position on the search bar 30 and the selection operation of the thumbnail pictures 231 are correlated. An operation corresponding to the position that the user's finger has touched on the search bar 30 is executed. For example, a thumbnail picture 231 that is jumped from the currently selected thumbnail picture 232 for the number of thumbnail pictures corresponding to the detected position that the user's finger has touched on the search bar 30 is designated as a newly selected thumbnail picture 232.

FIG. 32 shows an example of the relationship of the position information of the search bar 30 described with reference to FIG. 16 and FIG. 17 and the number of jumped thumbnail pictures from the currently selected thumbnail picture 232 to the newly selected thumbnail picture 232. The position information "STILL" is correlated with the number of jumped thumbnail pictures "0" that is the currently selected thumbnail picture 232.

When the detected position that the user's finger has touched on the search bar 30 is in the region corresponding to the position information "STILL", the current screen on the display section 10 is switched to the monitor screen 220. The reproduction operation for the clip corresponding to the selected thumbnail picture 232 is started. Video data that are reproduced may be any of sub video data and main video data. The still reproduction operation for the frame corresponding to the selected thumbnail picture 232 may be reproduced. At this point, when the user's finger touches the center portion of the search bar 30, the monitor screen 220 may be returned to the thumbnail search screen 230.

The position information "+1" to "+3" are correlated with the number of jumped thumbnail pictures "+1". In other words, when the detected position that the user's finger has touched on the search bar 30 is in the region corresponding to the position information "+1" to "+3", the next thumbnail picture 231 is selected as the selected thumbnail picture 232. Likewise, the position information "−1" to "−3" are correlated with the number of jumped thumbnail pictures "−1". In this case, the thumbnail picture 231 immediately preceded by the currently selected thumbnail picture 232 is selected as the newly selected thumbnail picture 232.

The position information "+4" to "+6" are correlated with the number of jumped thumbnail pictures "+12". In the example shown in FIG. 31, 12 thumbnail pictures 231 are displayed on the thumbnail search screen 230. Thus, when the detected position that the user's finger has touched on the search bar 30 is in the range of the position information "+4" to "+6", the position on the thumbnail search screen 230 of the selected thumbnail picture 232 is not changed. Instead, the page of the thumbnail search screen 230 is changed to the next page. A thumbnail picture 231 that is followed by the currently selected thumbnail picture 232 with 12 thumbnail pictures is selected as the newly selected thumbnail picture 232.

Likewise, the position information "−4" to "−6" are correlated with the number of jumped thumbnail pictures "−12". In this case, the position of the selected thumbnail picture 232 is not changed on the thumbnail search screen 230. Instead, the page of the thumbnail search screen 230 is changed to the immediately preceding page. A thumbnail picture 231 that is preceded by the currently selected thumbnail picture 232 with 12 thumbnail pictures is selected as the newly selected thumbnail picture 232.

The position information "+7" to "+9" are correlated with the number of jumped thumbnail pictures "+24". In this case, the page of the thumbnail search screen 230 is changed to the two later page. A thumbnail picture 231 that is followed by the currently selected thumbnail picture 232 with 24 thumbnail pictures is selected as the newly selected thumbnail picture 232. Likewise, the position information "−7" to "−9" are correlated with the number of jumped thumbnail pictures "−24". In this case, the page of the thumbnail search screen 230 is changed to the two earlier page. A thumbnail picture 231 that is preceded by the currently selected thumbnail picture 230 with 24 thumbnail picture is selected as the newly selected thumbnail picture 232.

Both the ends of the search bar 30, namely the position information "+10" and "−10", are correlated with thumbnail pictures 231 corresponding to the top and end clips of the clips recorded on the optical disc 5, respectively. When it has been detected that the user's finger has touched the right end of the search bar 30, the region corresponding to the position information "+10", a thumbnail picture 231 corresponding to the most newly recorded clip on the currently loaded optical disc 5 is the selected thumbnail picture 232. The selected thumbnail picture 232 is displayed at the upper left corner on the thumbnail search screen 230.

When it has been detected that the user's finger has touched the left end of the search bar 30, the region corresponding to the position information "−10", a thumbnail picture 231 corresponding to the most early recorded clip on the currently loaded optical disc 5 is the selected thumbnail picture 232. The selected thumbnail picture 232 is displayed on the thumbnail search screen 230 at the position corresponding to the remainder of which the total number of clips recorded on the currently loaded optical disc 5 is divided by 12. Instead, the selected thumbnail picture 232 may be displayed at the lower right corner of the thumbnail search screen 230.

The relationship of the position information of the search bar 30 and the number of jumped thumbnail pictures from the currently selected thumbnail picture 232 is just an example. This embodiment of the present invention is not limited to this example.

In the foregoing example, the position information "−1" to position information "−9" and position information "+1" to position information "+9" are equally divided. Equally divided sets of the position information are correlated with the same number of jumped thumbnail pictures. Instead, the size of a set of position information may be reversely proportional to the distance from the position information "STILL". For example, with reference to FIG. 32, the position information "+1" to "+3" are correlated with the number of jumped thumbnail pictures "+1". The position information "+4" to "+6" are correlated with the number of jumped thumbnail pictures "+12". The position information "+7" to "+8" are correlated with the number of jumped thumbnail pictures "+24". The position information "+9" is correlated with the number of jumped thumbnail pictures "+36".

In addition, as exemplified in FIG. 33, the position information may be coarsely assigned corresponding to the number of jumped thumbnail pictures. The position information may be assigned different data value ranges. In the example shown in FIG. 33, the data value range assigned to one region is reversely proportion to the distance from the position information "STILL", the region corresponding to the center portion of the search bar 30. In this example, ranges for 40 bits each are assigned to the center regions and adjacent regions. On the other hand, ranges for 10 bits each are assigned to regions for the number of jumped thumbnail pictures "+36" and "−36".

These relationships are pre-stored for example in the ROM (Read Only Memory) (not shown) of the KY microcomputer 44. A plurality of different relationships may be pre-stored. One of these relationships may be properly selected for example on the setup menu.

6. Reproduction Control Using Search Bar by Another Method 6-1. Outline of Reproduction Control by Another Method In the foregoing example, when the reproduction operation for video data is controlled using the search bar 30, reproduction speed information corresponding to the position that the user's finger has touched on the search bar 30 is output. The output method of the reproduction speed information corresponding to the position detection output of the search bar 30 is not limited to that example. In other words, reproduction speed information may be output corresponding to the moving speed of the user's finger when it horizontally moves while it keeps touching the search bar 30. In the following description, the operation "the user's finger moves while it keeps touching the search bar 30" is referred to as "trace".

Next, the method of outputting the reproduction speed information corresponding to the moving speed of the user's finger when it traces the search bar 30 will be described. The moving speed of the user's finger when it traces the search bar 30 is obtained with the position and time at which the user's finger has touched the search bar 30 and the position at which the user's finger has touched after a predetermined time period has elapsed.

In addition, corresponding to the obtained moving speed, the operation mode of the reproduction stop process performed when the user's finger has been released from the search bar 30 is decided. For the moving speed at which the user's finger has been just released from the search bar 30, a first threshold value is designated.

If the moving speed at which the user's finger has been just released from the search bar 30 is lower than the first threshold value, the still stop mode is performed. In the still stop mode, while a frame is being reproduced, when the user's finger is released from the search bar 30, the still reproduction operation for the frame is performed.

If the moving speed at which the user's finger has been just released from the search bar 30 exceeds the first threshold value, the flywheel stop mode is performed. In the flywheel stop mode, when the user's finger is released from the search bar 30, the reproduction speed is gradually decreased and after a predetermined time period has elapsed, the still reproduction operation is performed. In other words, in the flywheel stop mode, for a predetermined time period after the user's finger has been released from the search bar 30, the reproduction operation is performed with negative acceleration. More specifically, in the flywheel stop mode, while the reproduction operation is being performed, when the user's finger is released from the search bar 30, the reproduction speed is gradually decreased. After a predetermined time period has elapsed, the reproduction operation is performed at 0 reproduction speed, namely the still reproduction operation is performed. The deceleration is for example [−one-time speed]/sec. In other words, when the reproduction operation is being performed at five-time reproduction speed, the reproduction speed is decreased in five seconds. Thereafter, the still reproduction operation is performed.

For the moving speed at which the user's finger is tracing the search bar 30, a second threshold value can be designated. When the moving speed at which the user's finger is tracing exceeds the second threshold value, the reproduction operation is performed at a predetermined fixed speed higher than one-time reproduction speed (for example, five-time reproduction speed).

The speed that is designated as the second threshold value is higher than the speed that is designated as the first threshold value. For example, the first threshold value is around 0.5 cm/1 sec, whereas the second threshold value is around 5 cm/0.2 sec.

Of course, the reproduction direction is correlated with the tracing direction. When the search bar 30 is traced rightward, the reproduction operation is performed in the forward direction. When the search bar 30 is traced leftward, the reproduction operation is performed in the reverse direction.

Figure 34:
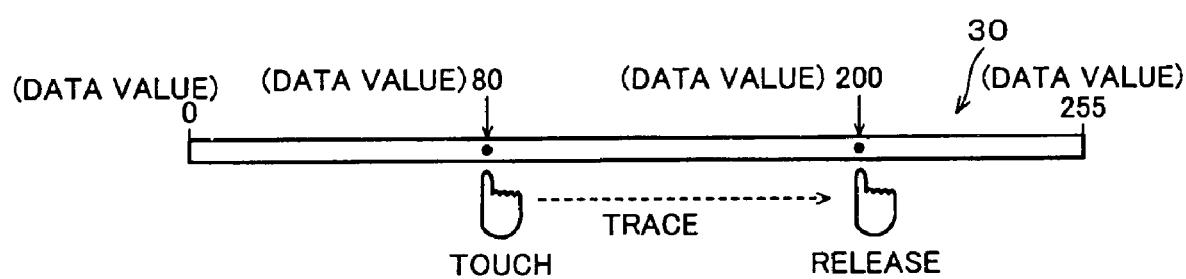
FIG. 34 is a schematic diagram describing a reproduction control using the search bar by another method.

As exemplified in FIG. 34, it is assumed that the search bar 30 is traced from the position corresponding to data value "80" on the search bar 30 (referred to as the position "80") to the position corresponding to the data value "200" (referred to as the position "200"). While the search bar 30 is being traced from the position "80" to the position "200", the reproduction speed is stepwise or gradually varied from the frame reproduction operation to a high speed reproduction operation for example five-time speed reproduction operation corresponding to the speed at which the user's finger traces the search bar 30.

When the user's finger has traced up to the position "200" and has been released from the search bar 30, if the moving speed at which the user's finger has been just released from the search bar 30 is smaller than the first threshold value, the reproduction stop operation is performed in the still stop mode. The still reproduction operation is performed for the frame corresponding to the position "200" from which the user's finger has been released.

On the other hand, when the user's finger has traced up to the position "200" and released from the search bar 30, if the moving speed at which the user's finger has been released from the search bar 30 is larger than the first threshold value, the reproduction stop operation is performed in the flywheel stop mode. The reproduction speed is decreased from the reproduction speed at which the user's finger has traced the position "200" for a predetermined time period. After a predetermined time period has elapsed from the position "200" that the user's finger has traced, the reproduction operation is stopped. Thereafter, the still reproduction operation is performed.

In such a manner, corresponding to the moving speed of the user's finger on the search bar 30 immediately before the user's finger has been just released from the search bar 30, the stop mode is switched between the still stop mode and the flywheel stop mode. Thus, as if the user manually moved a film, he or she can search for his or her desired frame.

In the example shown in FIG. 34 where the reproduction operation is performed in the forward direction, when the user's finger is released from the search bar 30 at the position "200", if the user releases his or her finger from the search bar 30 while moving his or her finger rightward, the reproduction stop operation is performed in the flywheel stop mode. In the flywheel stop mode, while the reproduction speed is gradually decreased, the reproduction operation is continued. After a predetermined time period has elapsed, the still reproduction operation is performed at 0 reproduction speed. When the user's finger is released from the search bar 30, if he or she temporarily stops his or her finger at the position "200", the reproduction stop operation is performed in the still stop mode.

6-2. Example of More Specific Process of Reproduction Control by Another Method

Figure 35:
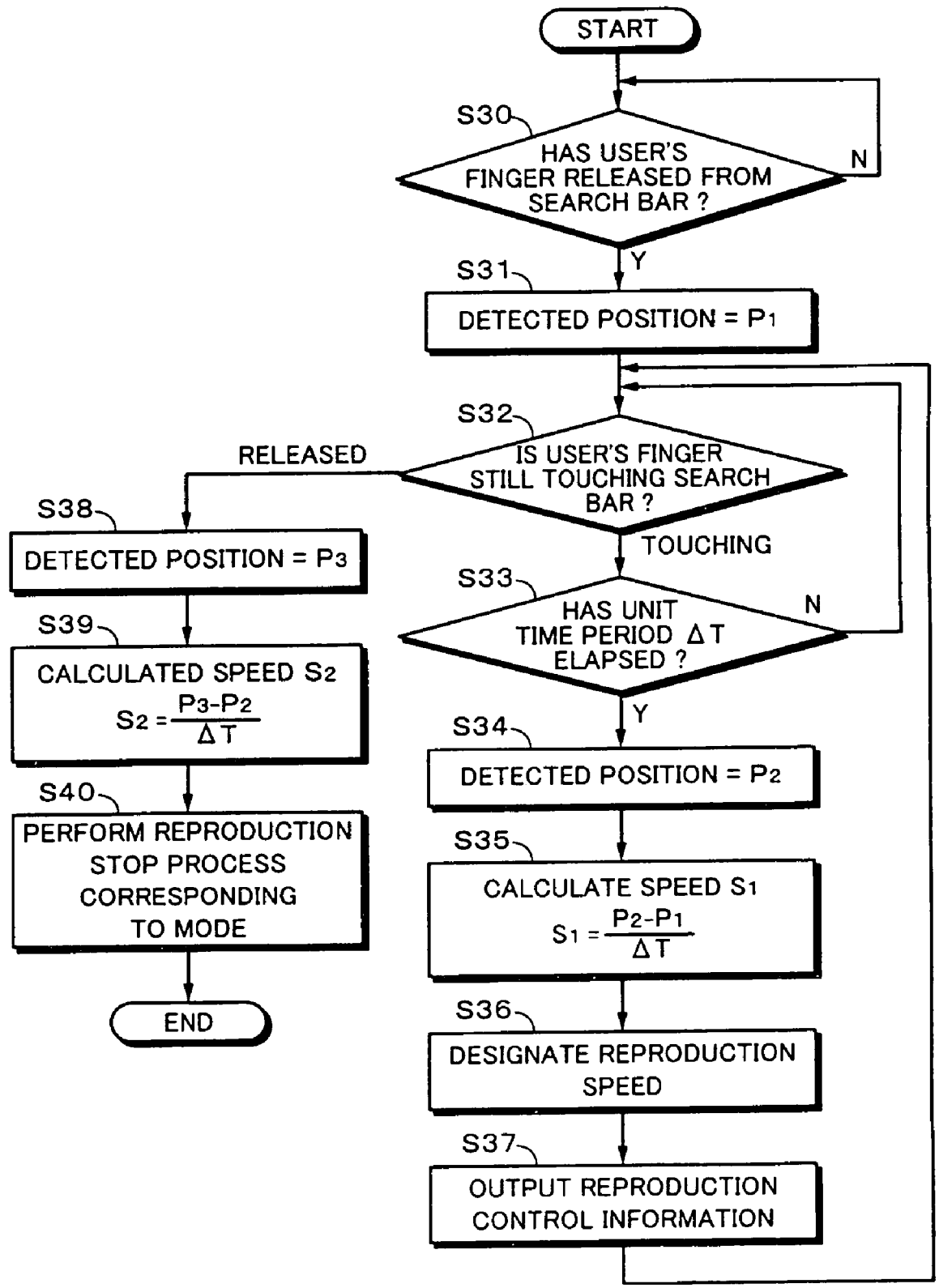
FIG. 35 is a flow chart showing an example of a process for performing a reproduction control corresponding to a tracing speed of the search bar.

FIG. 35 is a flow chart showing an example of a process for performing a reproduction control corresponding to the tracing speed on the search bar 30. The process of the flow chart is executed for example by the KY microcomputer 44. The process of the flow chart shown in FIG. 35 is a method that accomplishes the reproduction control corresponding to the tracing speed on the search bar 30. Thus, the reproduction control according to an embodiment of the present invention is not limited to the process of the flow chart.

When it has been detected that the user's finger has touched the search bar 30 at step S30, the flow advances to step S31. At step S31, position $P_1$ that the user's finger has touched on the search bar 30 is detected. The position $P_1$ is detected as digital data that are output from for example the search bar 30.

When the position that the user's finger has touched has been detected, the flow advances to step S32. At step S32, it is determined whether the user's finger be touching the search bar 30. When the determined result denotes that the user's finger is touching the search bar 30, the flow advances to step S33. At step S33, it is determined whether a unit time period $\Delta T$ has elapsed after the position has been detected at step S31 or step S34 that will be described later. When the determined result denotes that the unit time period $\Delta T$ has elapsed, the flow returns to step S32. The unit time period $\Delta T$ is for example in the range from several milliseconds to several ten milliseconds.

When the determined result at step S33 denotes that the unit time period $\Delta T$ has elapsed after the former position has detected, the flow advances to step S34. At step S34, position $P_2$ at which the user's finger has touched the search bar 30 is detected. Thereafter, the flow advances to step S35. At step S35, speed $S_1$ at which the user's finger traces the search bar 30 is calculated by the following formula (1).

$$S_1 = (P_2 - P_1)/\Delta T \quad (1)$$

When the speed $S_1$ has been calculated at step S35, the flow advances to step S36. At step S36, the reproduction speed is designated corresponding to the calculated speed $S_1$. When the absolute value of the speed $S_1$ is equal to or lower than the second threshold value, the reproduction speed corresponding to the speed $S_1$ is designated. When the absolute value of the speed S1 exceeds the second threshold value, a fixed reproduction speed, for example five-time reproduction speed, is designated. Thereafter, the flow advances to step S37. At step S37, a reproduction control signal is generated corresponding to the designated reproduction speed and supplied to the system controller 45. When the speed $S_1$ is a positive value, it denotes the reproduction operation in the forward direction. When the speed $S_1$ is a negative value, it denotes the reproduction operation in the reverse direction. When the reproduction control signal is generated, the flow returns to step S32.

In contrast, when the determined result at step S32 denotes that the user's finger has been released from the search bar 30, the flow advances to step S38. At step S38, position $P_3$ at which the user's finger has been released from the search bar 30 is detected. Thereafter, the flow advances to step S39. At step S39, speed $S_2$ at which the user's finger has traced the search bar 30 immediately before the user's finger has been released from the search bar 30 is calculated by the following formula (2).

$$S_2=(P_3-P_2)/\Delta T \quad (2)$$

At step S40, the operation mode of the reproduction stop process is decided corresponding to the speed $S_2$. The speed $S_2$ is compared with the first threshold value. When the determined result denotes that the speed $S_2$ is smaller than the first threshold value, the reproduction stop process is performed in the still stop mode. In contrast, when the determined result denotes that the speed $S_2$ is larger than the first threshold value, the reproduction stop process is performed in the flywheel stop mode.

In the foregoing example, when the user's finger is released from the search bar 30, the stop process is performed corresponding to the moving speed at which the user's finger has traced the search bar 30. However, this embodiment is not limited to this example. In other words, the distance for which the user's finger has touched and traced the search bar 30 and has been released from it is used. Corresponding to the moving distance and the moving speed, the reproduction stop process performed when the user's finger has been released from the search bar 30 can be controlled. The distance for which the user's finger has touched and traced the search bar 30 and has been released from it is the distance for which the moving speed of the user's finger on the search bar 30 is detected.

For the moving distance, a third threshold value is designated. When the moving distance for which the user's finger has been released from the search bar 30 exceeds the third threshold value and the speed $S_2$ at which the user's finger has been released from the search bar 30 exceeds the first threshold value, the reproduction stop process is performed in the flywheel stop mode. In contrast, when the moving distance does not exceed the third threshold value or the speed $S_2$ does not exceed the first threshold value, the reproduction stop process is performed in the still stop mode.

More specifically, corresponding to the position $P_3$ detected at step S38 and the position $P_1$ detected at step S31 of the foregoing flow chart, the moving distance D for which the user's finger has moved is obtained. It is determined whether the moving distance D exceeds the third threshold value and whether the speed $S_2$ calculated at step S39 exceeds the first threshold value. Corresponding to the determined results, the operation mode of the reproduction stop process is decided.

In the example of which the reproduction control is performed corresponding to the speed at which the user's finger has traced the search bar 30, an LED at which the user's finger has touched the search bar 30 and LEDs adjacent thereto can be turned on.

7. Others

Figure 36:
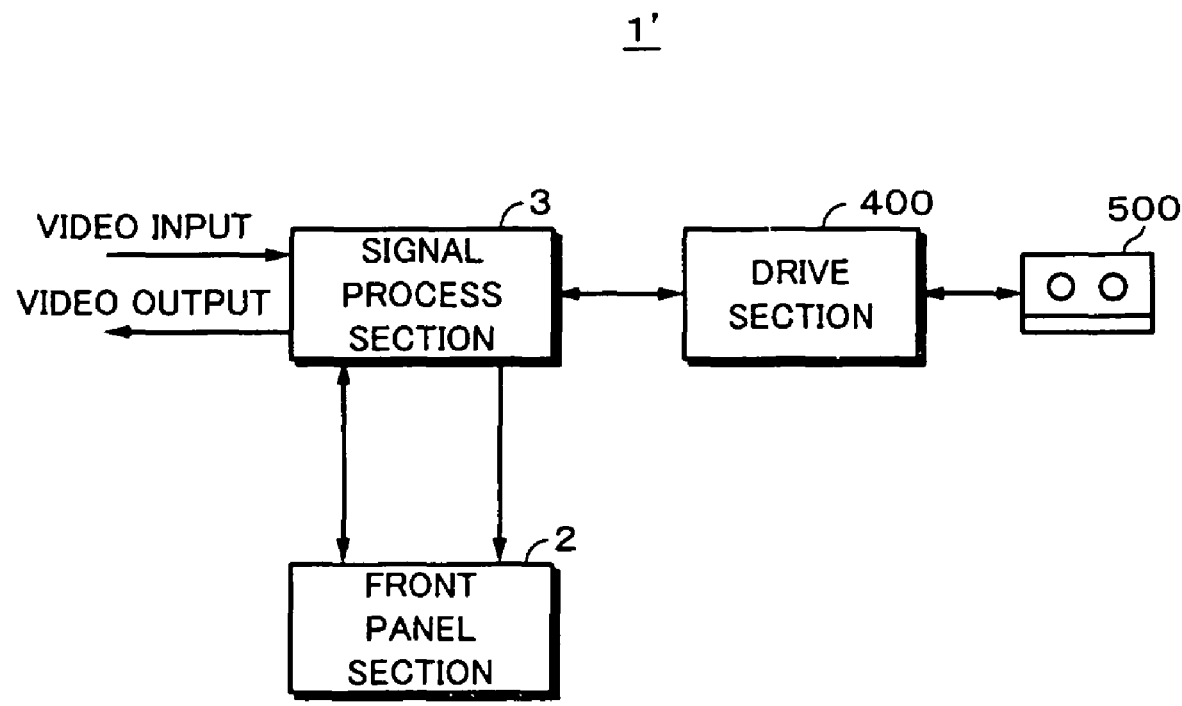
FIG. 36 is a block diagram showing an example of the structure of a record and reproduction apparatus that uses a magnetic tape as a record medium.

In the foregoing examples, the record and reproduction apparatus 1 according to an embodiment of the present invention uses the optical disc 5 as the record medium. However, an embodiment of the present invention is not limited to this example. In other words, as exemplified in FIG. 36, an embodiment of the present invention can be applied to a record and reproduction apparatus 1' that uses a magnetic tape 500 as a record medium. In FIG. 36, similar sections to those in FIG. 8 are denoted by similar reference numerals and their description will be omitted.

Main AV data and sub AV data that are output from a signal process section 3 are supplied to a drive section 400. The drive section 400 maps data so that main AV data and sub AV data for one frame are placed on a predetermined number of tracks. Predetermined processes such as an error correction code encoding process are performed for the mapped data. As a result, record data are obtained. The record data are modulated in a predetermined manner. As a result, a record signal is obtained. The record signal is recorded on helical tracks formed on a magnetic tape by a rotation head (not shown). When data are reproduced, a signal is reproduced as a reproduction signal from the magnetic tape 500. The reproduction signal is demodulated and reproduction data are obtained. Predetermined processes such as an error correction code decode process are performed for the reproduction data. As a result, main AV data and sub AV data are reproduced. Corresponding to the reproduced sub AV data, thumbnail pictures displayed on a thumbnail search screen 230 and a detailed thumbnail search screens 230A and 230B are generated.

Figure 37:
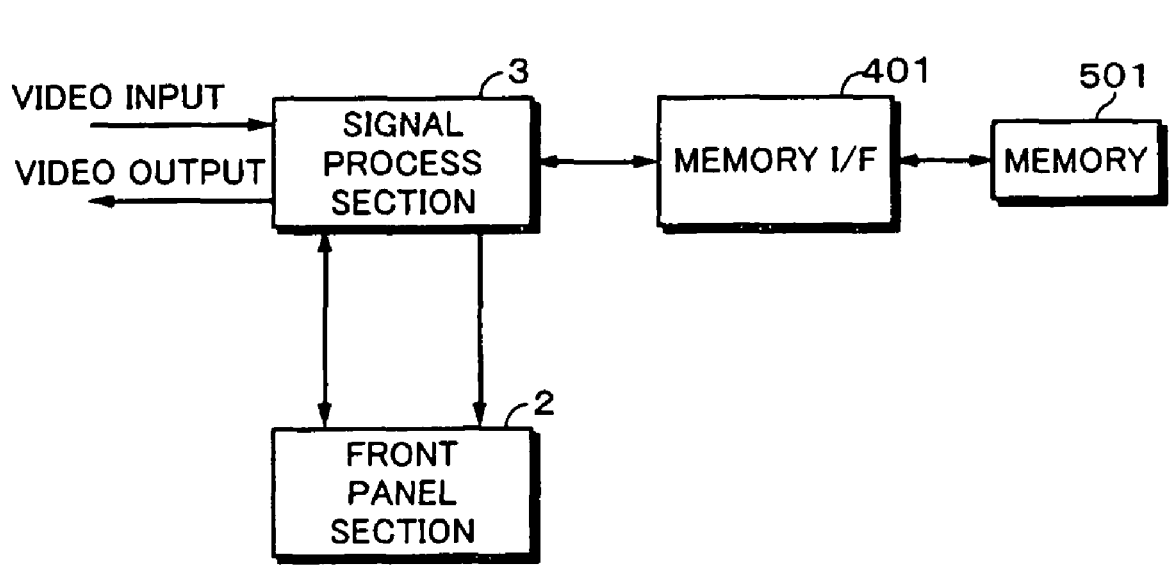
FIG. 37 is a block-diagram showing an example of the structure of a record and reproduction apparatus that uses a semiconductor memory as a record medium.

In addition, as exemplified in FIG. 37, an embodiment of the present invention can be applied to a record and reproduction apparatus 1" that uses a semiconductor memory 501 as a record medium. As shown in FIG. 37, similar sections to those in FIG. 8 are denoted by similar reference numerals and their description will be omitted. The semiconductor memory 501 may be a data rewritable, non-volatile flash memory.

Main AV data and sub AV data that are output from a signal process section 3 are supplied to a memory I/F section 401. The memory I/F section 401 performs a predetermined process such as an error correction code encoding process for the main AV data and sub AV data. The processed data are written to a memory 501. A write unit for the memory 501 may be the foregoing annual ring unit. When data are reproduced, the memory I/F section 401 reads data from the memory 501, decodes error correction code, and reproduces main AV data and sub AV data. Corresponding to the reproduced sub AV data, thumbnail pictures displayed on a thumbnail search screen 230 and detailed thumbnail search screen 230A and 230B are generated.

It should be understood by those skilled in the art that various modifications, combinations, sub-combinations and alternations may occur depending on design requirements and other factors insofar as they are within the scope of the appended claims or the equivalents thereof.

What is claimed is:

1. An input apparatus that inputs a reproduction speed of a video signal, comprising:

a position detection section that linearly detects a position that a user's finger has touched; and a control section that detects a moving speed of the user's finger performing tracing, by the user's finger touching the position detection section corresponding to a first position and a second position detected by the position detection section, and outputs reproduction speed information corresponding to the moving speed, wherein, after the position detection section has detected that the user's finger has been released from the position detection section and after a predetermined time period has elapsed, the control section is configured to output, based on the moving speed and according to a still control mode, the reproduction speed information of the video signal that denotes the reproduction speed of the video signal is immediately changed to a still reproduction operation, and the control section is configured to output, based on the moving speed and according to a reproduction control mode, the reproduction speed information of the video signal that causes the reproduction speed of the video signal to be gradually decreased, from the reproduction speed at which the user's finger has touched the position detection section, to the still reproduction operation.

2. The input apparatus as set forth in claim 1, wherein when the position detection section has detected that the user's finger has been physically released therefrom, the control section outputs, in the still control mode, the reproduction speed information that denotes that the reproduction speed is the still reproduction operation when the moving speed at which the user's finger has moved on the position detection section is equal to or lower than a predetermined first threshold value, and the control section outputs the reproduction speed information in the reproduction control mode when the moving speed is larger than the first threshold value.

3. The input apparatus as set forth in claim 1, wherein when the position detection section has detected that the user's finger has been physically released therefrom, the control section outputs, in the still control mode, the reproduction speed information that denotes that the reproduction speed is the still reproduction operation when a moving distance for which the user's finger has moved when the position detection section has detected that the user's finger has been released therefrom is equal to or lower than a predetermined third threshold value, and the control section outputs the reproduction speed information in the reproduction control mode when the moving distance is larger than the third threshold value.

4. The input apparatus as set forth in claim 1, wherein when the position detection section detects the user's finger as tracing, prior to the position detection section detecting the user's finger as being released from the position detection section, the control section outputs, in a fast speed mode, the reproduction speed information that denotes a predetermined fixed reproduction speed higher than a one-time reproduction speed when the detected moving speed is equal to or larger than a predetermined second threshold value, the second threshold value higher than the first threshold value.

5. An input method of inputting a reproduction speed of a video signal, comprising:

linearly detecting a user's finger touching a position detection section and a position of the touching on the position detection section;

determining a moving speed of a tracing performed by the user's finger touching the position detection section; and outputting reproduction speed information of the video signal corresponding to the determined moving speed according to the following process after detecting that the user's finger has been released from the position detection section and after a predetermined time period has elapsed:

determining whether to output the reproduction speed information of the video signal, based on the moving speed and according to a still control mode, that denotes the reproduction speed is immediately changed to a still reproduction operation or to output the reproduction speed information, based on the moving speed and according to a reproduction control mode, that causes the reproduction speed to be gradually decreased, from the reproduction speed at which the user's finger has touched the position detection section, to the still reproduction operation; and outputting the determined reproduction speed information of the video signal.

6. A storage device including an input control program recorded thereon that causes a computer device to execute an input method of inputting a reproduction speed of a video signal, the input method comprising:

linearly detecting a user's finger touching a position detection section and a position of the touching on the position detection section;

determining a moving speed of a tracing performed by the user's finger touching the position detection section; and outputting reproduction speed information of the video signal corresponding to the determined moving speed according to the following process after detecting that the user's finger has been released from the position detection section and after a predetermined time period has elapsed:

determining whether to output the reproduction speed information of the video signal, based on the moving speed and according to a still control mode, that denotes the reproduction speed is immediately changed to a still reproduction operation or to output the reproduction speed information, based on the moving speed and according to a reproduction control mode, that causes the reproduction speed to be gradually decreased, from the reproduction speed at which the user's finger has touched the position detection section, to the still reproduction operation; and outputting the determined reproduction speed information of the video signal.

7. A reproduction apparatus, comprising:

a reproduction section that reproduces at least a video signal recorded on a record medium;

a position detection section that linearly detects a position that a user's finger has touched;

a control section that detects a moving speed of the user's finger performing tracing, by the user's finger touching the position detection section corresponding to a first position and a second position detected by the position detection section and outputs reproduction speed information for the video signal corresponding to the moving speed; and a reproduction control section that controls a reproduction speed of the video signal reproduced by the reproduction section corresponding to the reproduction speed information that is output from the control section, wherein, after the position detection section has detected that the user's finger has been released from the position detection section and a predetermined time period has elapsed, the control section is configured to output, based on the moving speed and according to a still control mode, the reproduction speed information that denotes the reproduction speed is immediately changed to a still reproduction operation, and the control section is configured to output, based on the moving speed and according to a reproduction control mode, the reproduction speed information that causes the reproduction speed to be gradually decreased, from the reproduction speed at which the user's finger has touched the position detection section, to the still reproduction operation.

8. A reproduction control method, comprising:
linearly detecting a moving speed of a user's finger touching a position detection section;
outputting reproduction speed information corresponding to the detected moving speed; and
controlling a reproduction speed of at least a video signal recorded on a record medium corresponding to the outputted reproduction speed information, the outputting the reproduction speed information following a process performed after detecting that the user's finger has been released from the position detection section and after a predetermined time period has elapsed, the process including:
determining whether to output the reproduction speed information, based on the moving speed and according to a still control mode, that denotes the reproduction speed is immediately changed to a still reproduction operation or to output the reproduction speed information, based on the moving speed and according to a reproduction control mode, that causes the reproduction speed to be gradually decreased, from the reproduction speed at which the user's finger has touched the position detection section, to the still reproduction operation; and
outputting the determined reproduction speed information of the video signal.

9. A storage device including a reproduction control program recorded thereon that causes a computer device to execute a reproduction control method, the reproduction control method comprising:
linearly detecting a moving speed of a user's finger touching a position detection section;
outputting reproduction speed information corresponding to the detected moving speed; and
controlling a reproduction speed of at least a video signal recorded on a record medium corresponding to the outputted reproduction speed information, the outputting the reproduction speed information following a process performed after detecting that the user's finger has been released from the position detection section and after a predetermined time period has elapsed, the process including:
determining whether to output the reproduction speed information, based on the moving speed and according to a still control mode, that denotes the reproduction speed is immediately changed to a still reproduction operation or to output the reproduction speed information, based on the moving speed and according to a reproduction control mode, that causes the reproduction speed to be gradually decreased, from the reproduction speed at which the user's finger has touched the position detection section, to the still reproduction operation; and
outputting the determined reproduction speed information of the video signal.

10. An input apparatus that inputs an output speed of data corresponding to time information thereof, comprising:
a position detection section that linearly detects a position that a user's finger has touched; and
a control section that detects a moving speed of the user's finger performing tracing, by the user's finger touching the position detection section corresponding to a first position and a second position detected by the position detection section, and outputs speed information corresponding to the moving speed and the time information, wherein, after the position detection section has detected that the user's finger has been released from the position detection section and after a predetermined time period has elapsed,
the control section is configured to output, based on the moving speed and according to a still control mode, the speed information that denotes the output speed of the data is immediately changed to a still operation, and
the control section is configured to output, based on the moving speed and according to a control mode, outputs the speed information that causes the output speed of the data to be gradually decreased, from the output speed at which the user's finger has touched the position detection section, to the still operation.

11. The input apparatus as set forth in claim 10, wherein when the position detection section has detected that the user's finger has been physically released therefrom,
the control section outputs, in the still control mode, the speed information that denotes that the output speed is the still operation when the moving speed at which the user's finger has moved on the position detection section is equal to or lower than a predetermined first threshold value, and
the control section outputs the speed information in the control mode when the moving speed is larger than the first threshold value.

12. The input apparatus as set forth in claim 10, wherein when the position detection section has detected that the user's finger has been physically released therefrom,
the control section outputs, in the still control mode, the speed information that denotes that the output speed is the still reproduction operation when a moving distance for which the user's finger has moved when the position detection section has detected that the user's finger has been released therefrom is equal to or lower than a predetermined third threshold value, and
the control section outputs the speed information in the control mode when the moving distance is larger than the third threshold value.

13. The input apparatus as set forth in claim 10, wherein when the position detection section detects the user's finger as tracing, prior to the position detection section detecting the user's finger as being released from the position detection section, the control section outputs, in a fast speed mode, the speed information that denotes a predetermined fixed output speed higher than a one-time reproduction speed when the detected moving speed is equal to or larger than a predetermined second threshold value, the second threshold value higher than the first threshold value.

14. An input method of inputting an output speed of data corresponding to time information thereof, comprising:
linearly detecting a user's finger touching a position detection section and a position of the touching on the position detection section;
determining a moving speed of a tracing performed by the user's finger touching the position detection section; and
outputting speed information that denotes the time information corresponding to the determined moving speed and corresponding to the time information according to the following process after detecting that the user's finger has been released from the position detection section and after a predetermined time period has elapsed:
determining whether to output the speed information, based on the moving speed and according to a still control mode, that denotes the output speed of the data is immediately changed to a still operation or to output the speed information, based on the moving speed and according to a control mode, that causes the output speed of the data to be gradually decreased, from the output speed at which the user's finger has touched the position detection section, to the still operation; and outputting the determined speed information of the data.

15. A storage device including an input program recorded thereon that causes a computer device to execute an input method of inputting an output speed of data corresponding to time information thereof, the input method comprising:

linearly detecting a user's finger touching a position detection section and a position of the touching on the position detection section;

determining a moving speed of a tracing performed by the user's finger touching the position detection section; and outputting speed information that denotes the time information corresponding to the determined moving speed and corresponding to the time information according to the following process after detecting that the user's finger has been released from the position detection section and after a predetermined time period has elapsed:

determining whether to output the speed information, based on the moving speed and according to a still control mode, that denotes the output speed of the data is immediately changed to a still operation or to output the speed information, based on the moving speed and according to a control mode, that causes the output speed of the data to be gradually decreased, from the output speed at which the user's finger has touched the position detection section, to the still operation; and outputting the determined speed information of the data.

\* \* \* \* \*